"(12) United States Patent
Itaba et al.

(10) Patent No.: US 12,262,101 B2
(45) Date of Patent: Mar. 25, 2025

(54) GATING CAMERA

(71) Applicant: KOITO MANUFACTURING CO., LTD., Tokyo (JP)

(72) Inventors: Koji Itaba, Shizuoka (JP); Jun Kano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 643 days.

(21) Appl. No.: 17/471,707

(22) PCT Filed: Mar. 6, 2020

(86) PCT No.: PCT/JP2020/009747
§ 371 (c)(1),
(2) Date: Sep. 10, 2021

(87) PCT Pub. No.: WO2020/184447
PCT Pub. Date: Sep. 17, 2020

(65) Prior Publication Data
US 2023/0179841 A1 Jun. 8, 2023

(30) Foreign Application Priority Data

Mar. 11, 2019 (JP) .................. 2019-043563
Mar. 11, 2019 (JP) .................. 2019-043564
(Continued)

(51) Int. Cl.
H04N 23/11 (2023.01)
B60Q 1/00 (2006.01)
(Continued)

(52) U.S. Cl.
CPC .......... H04N 23/11 (2023.01); B60Q 1/0023 (2013.01); B60Q 1/04 (2013.01); B60R 1/30 (2022.01);
(Continued)

(58) Field of Classification Search
CPC .......... B60Q 1/0023; B60Q 1/04; B60R 1/22; B60R 1/30; G01S 17/18; G01S 17/87;
(Continued)

(56) References Cited

U.S. PATENT DOCUMENTS 9,720,089 B2 * 8/2017 Katz ................. G01S 17/10
10,445,896 B1 * 10/2019 Bills ................. G01B 11/24
(Continued)

FOREIGN PATENT DOCUMENTS

JP 2009-257981 A 11/2009
JP 2010-054461 A 3/2010
(Continued)

OTHER PUBLICATIONS

Office Action (Communication pursuant to Rules 164(1) EPC/The Partial Supplementary European Search Report) dated Apr. 13, 2022, issued in corresponding European Application No. 20769205.4. (12 pages).
(Continued)

Primary Examiner — Kathleen M Walsh
(74) Attorney, Agent, or Firm — Sughrue Mion, PLLC

(57) ABSTRACT

A gating camera divides a field of view in a depth direction into multiple ranges, and generates multiple slice images that correspond to the multiple ranges. An illumination apparatus emits probe light. A controller controls a timing of emission of the probe light L1 by the illumination apparatus and a timing of image capture by a first image sensor and a second image sensor. The controller controls the first image sensor and the second image sensor such that they receive reflected light from different respective ranges in response to one emission of the probe light from the illumination apparatus.

7 Claims, 73 Drawing Sheets

(30) Foreign Application Priority Data

| Mar. 11, 2019 | (JP) | 2019-043565 |
|---|---|---|
| Mar. 11, 2019 | (JP) | 2019-043566 |
| Mar. 11, 2019 | (JP) | 2019-043567 |
| Mar. 26, 2019 | (JP) | 2019-058308 |

(51) Int. Cl.
| | | |
|---|---|---|
| *B60Q 1/04* | (2006.01) | |
| *B60R 1/30* | (2022.01) | |
| *G06V 10/44* | (2022.01) | |
| *G06V 20/58* | (2022.01) | |
| *H04N 23/13* | (2023.01) | |
| *H04N 23/57* | (2023.01) | |
| *H04N 23/74* | (2023.01) | |

(52) U.S. Cl.
CPC .............. *G06V 10/44* (2022.01); *G06V 20/58* (2022.01); *H04N 23/13* (2023.01); *H04N 23/57* (2023.01); *H04N 23/74* (2023.01)

(58) Field of Classification Search
CPC ...... G01S 17/89; G01S 17/931; G01S 7/4808; G01S 7/4865; G01S 7/4868; G01S 7/487; G06V 10/44; G06V 20/58; H04N 23/11; H04N 23/13; H04N 23/45; H04N 23/56; H04N 23/57; H04N 23/74; H04N 7/183
USPC .......................................................... 348/148
See application file for complete search history.

(56) References Cited

U.S. PATENT DOCUMENTS

| 10,514,256 | B1 * | 12/2019 | Kamarshi | ................ G01C 3/08 |
|---|---|---|---|---|
| 2013/0188022 | A1 | 7/2013 | Katz et al. | |
| 2015/0160340 | A1 * | 6/2015 | Grauer | .................... G01S 17/88 |
| | | | | 356/5.04 |
| 2015/0296200 | A1 * | 10/2015 | Grauer | .................... G01S 17/18 |
| | | | | 348/49 |
| 2019/0004150 | A1 | 1/2019 | Mano et al. | |
| 2019/0025432 | A1 | 1/2019 | Mano | |
| 2019/0061621 | A1 * | 2/2019 | Chae | ....................... G06T 7/174 |

FOREIGN PATENT DOCUMENTS

| JP | 2010-121995 A | 6/2010 | | |
|---|---|---|---|---|
| JP | 2015-510586 A | 4/2015 | | |
| JP | 2016-102697 A | 6/2016 | | |
| JP | 2018-156408 A | 10/2018 | | |
| WO | 2016092537 A1 | 6/2016 | | |
| WO | 2017/110417 A1 | 6/2017 | | |
| WO | WO-2017110414 A1 * | 6/2017 | .......... G01S 17/107 |
| WO | WO-2017110415 A1 * | 6/2017 | .......... B60Q 1/0023 |

OTHER PUBLICATIONS

Extended European Search Report dated Aug. 3, 2022, issued in corresponding European Application No. 20769205.4. (13 pages).
International Search Report (Form PCT/ISA/210) issued on Jun. 9, 2020, in corresponding International Application No. PCT/JP2020/009747. (11 pages).
International Preliminary Report on Patentability (Form PCT/IB/373) and the Written Opinion of the International Searching Authority (Form PCT/ISA/237) issued on Aug. 25, 2021, in corresponding International Application No. PCT/JP2020/009747. (24 pages).

\* cited by examiner

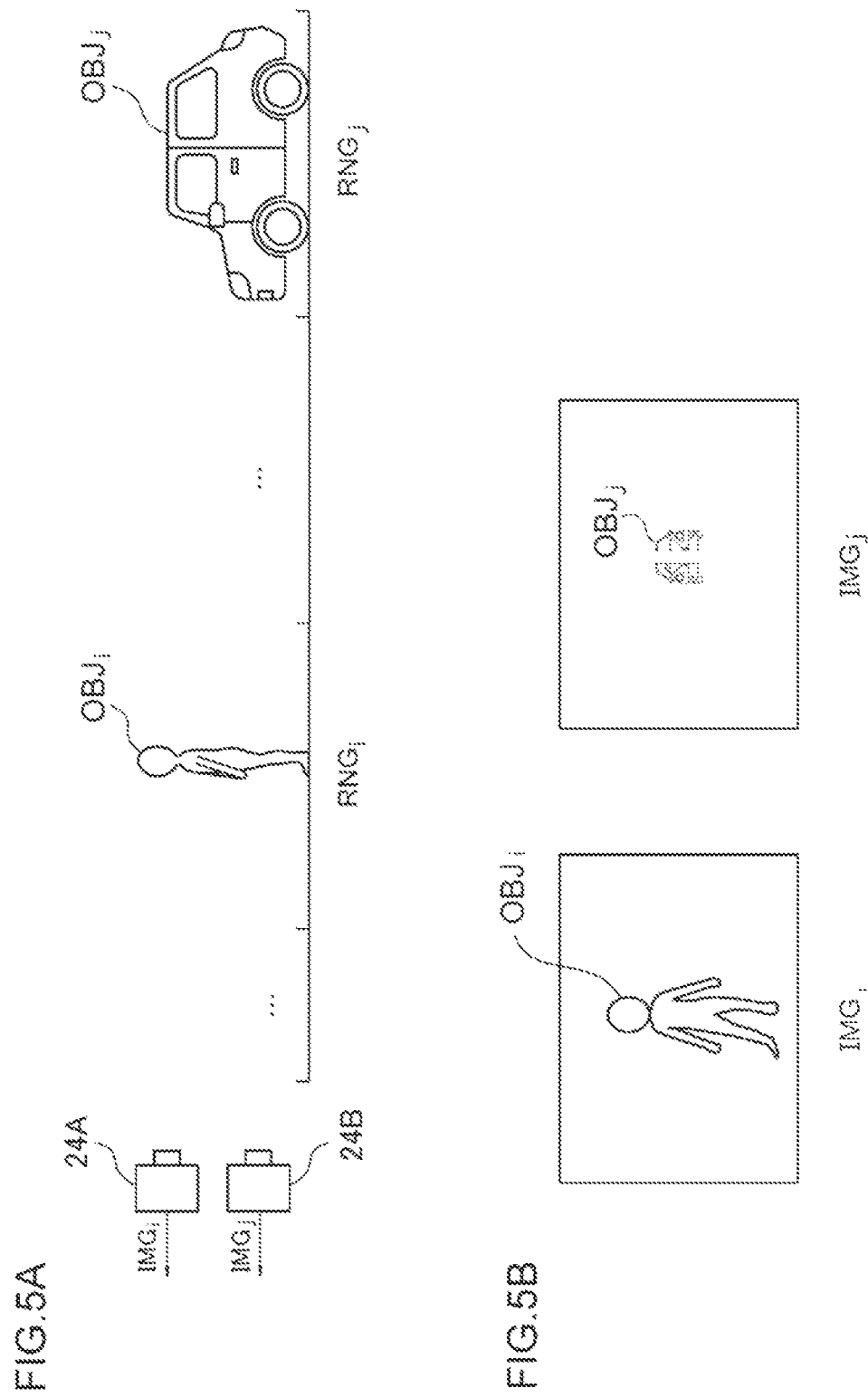

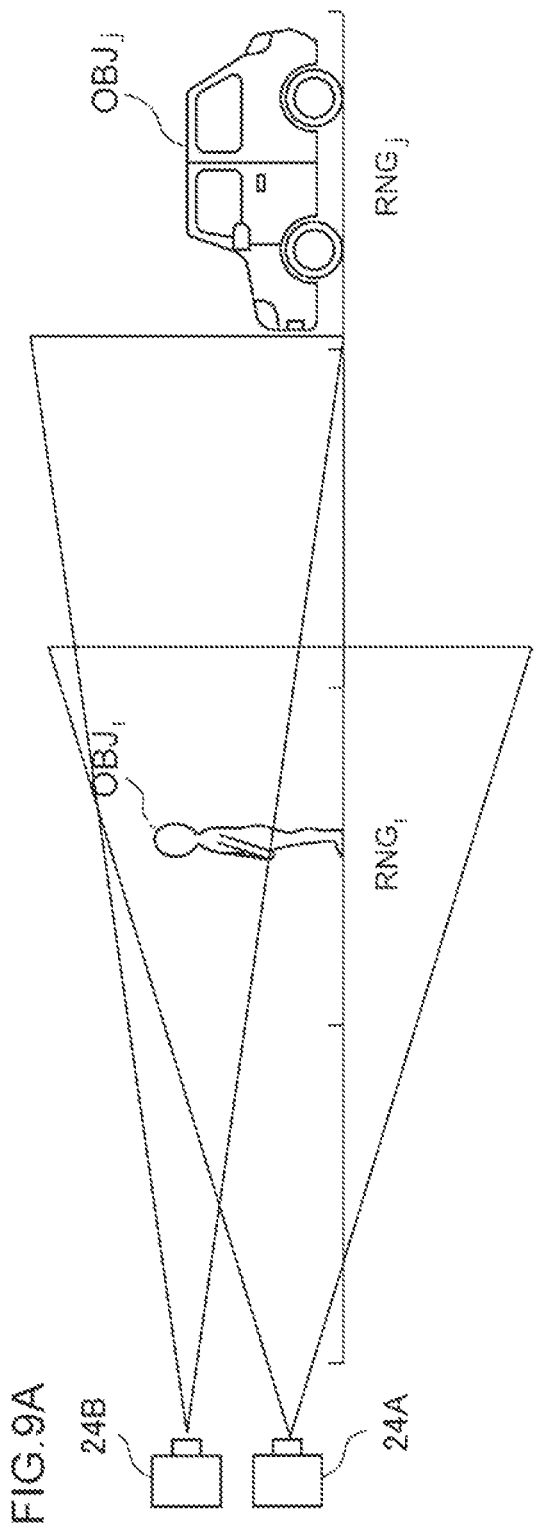
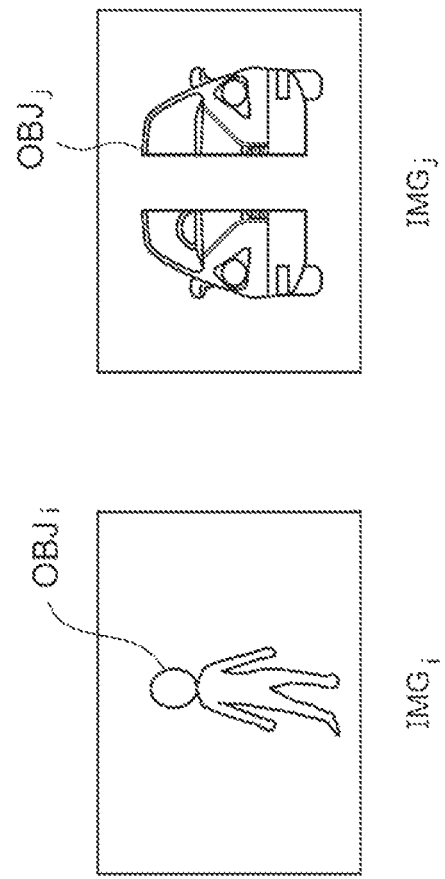
FIG.9A
FIG.9B

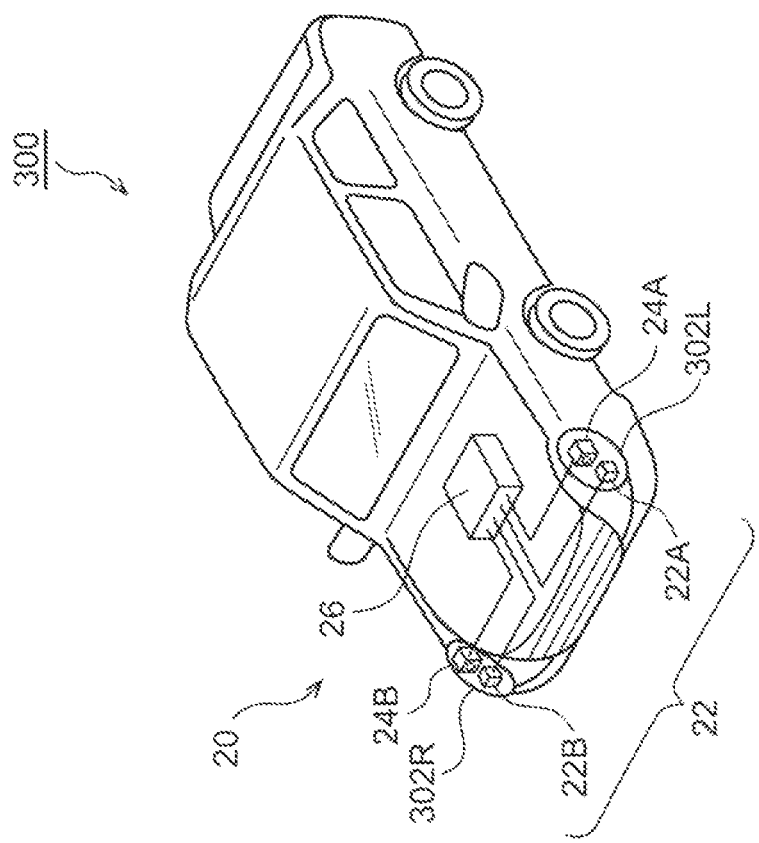
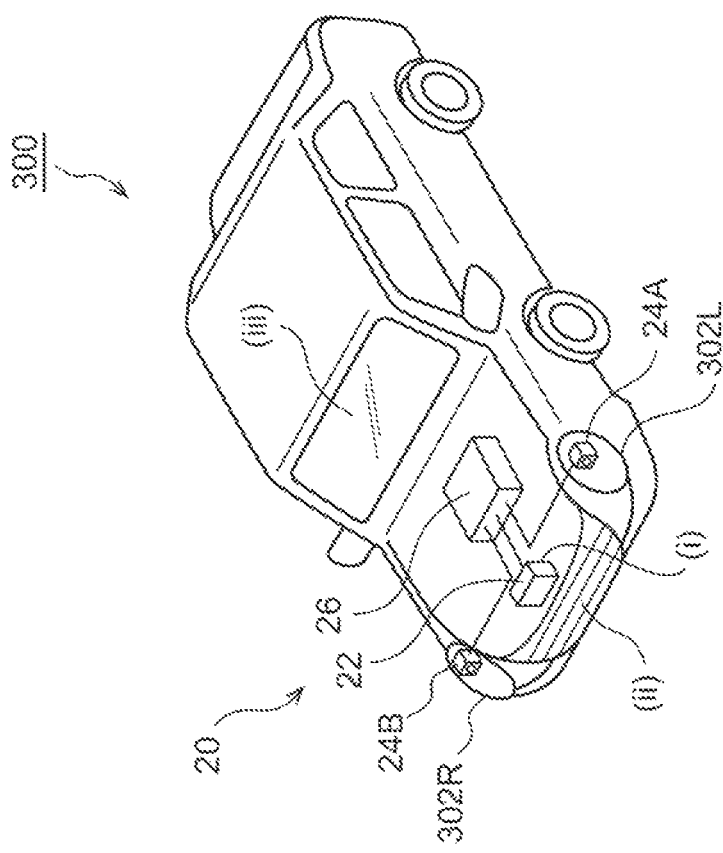

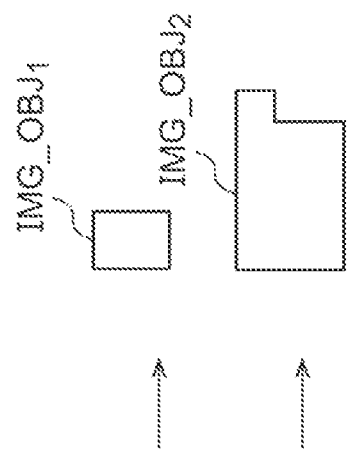
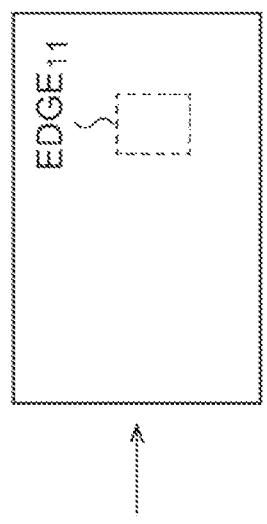
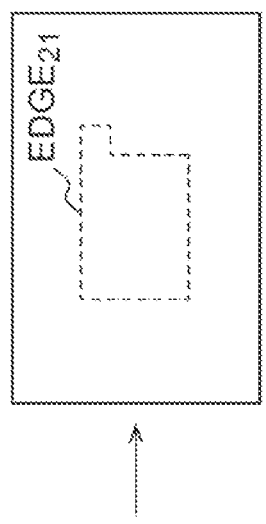
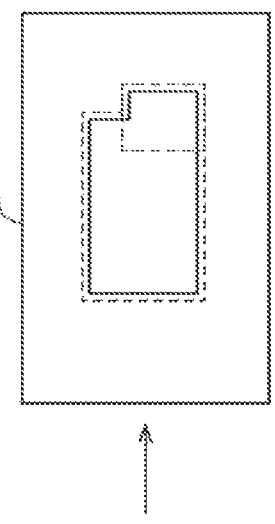
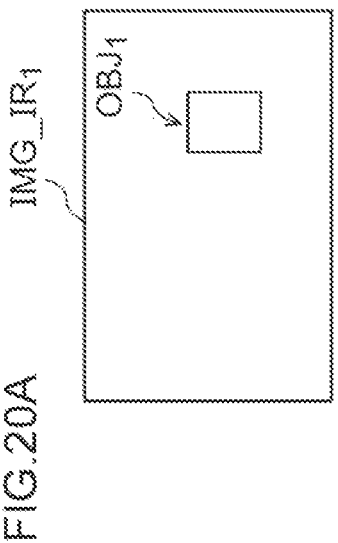
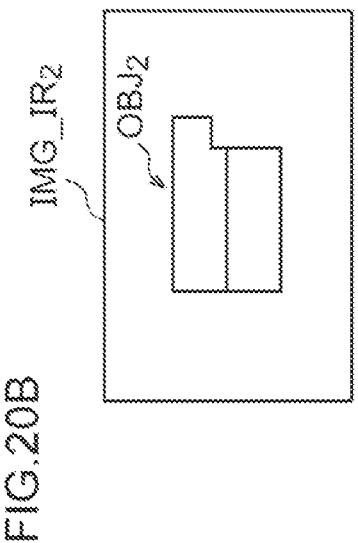
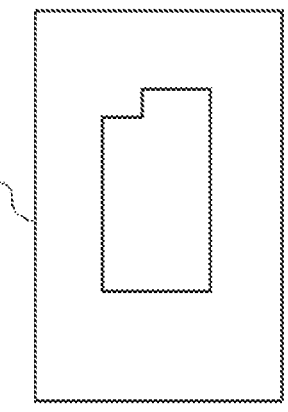
FIG.20A
FIG.20B
FIG.20C

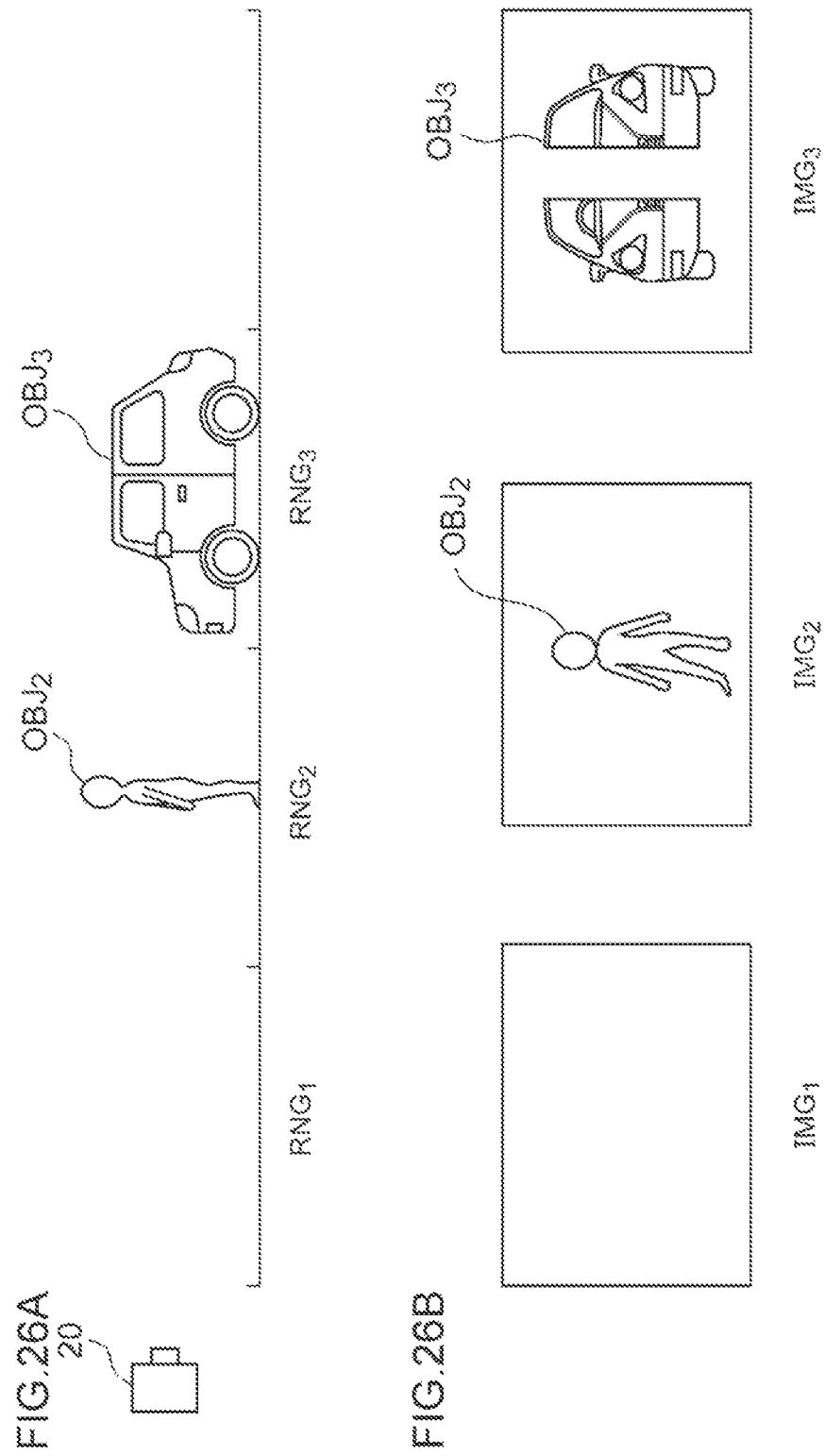

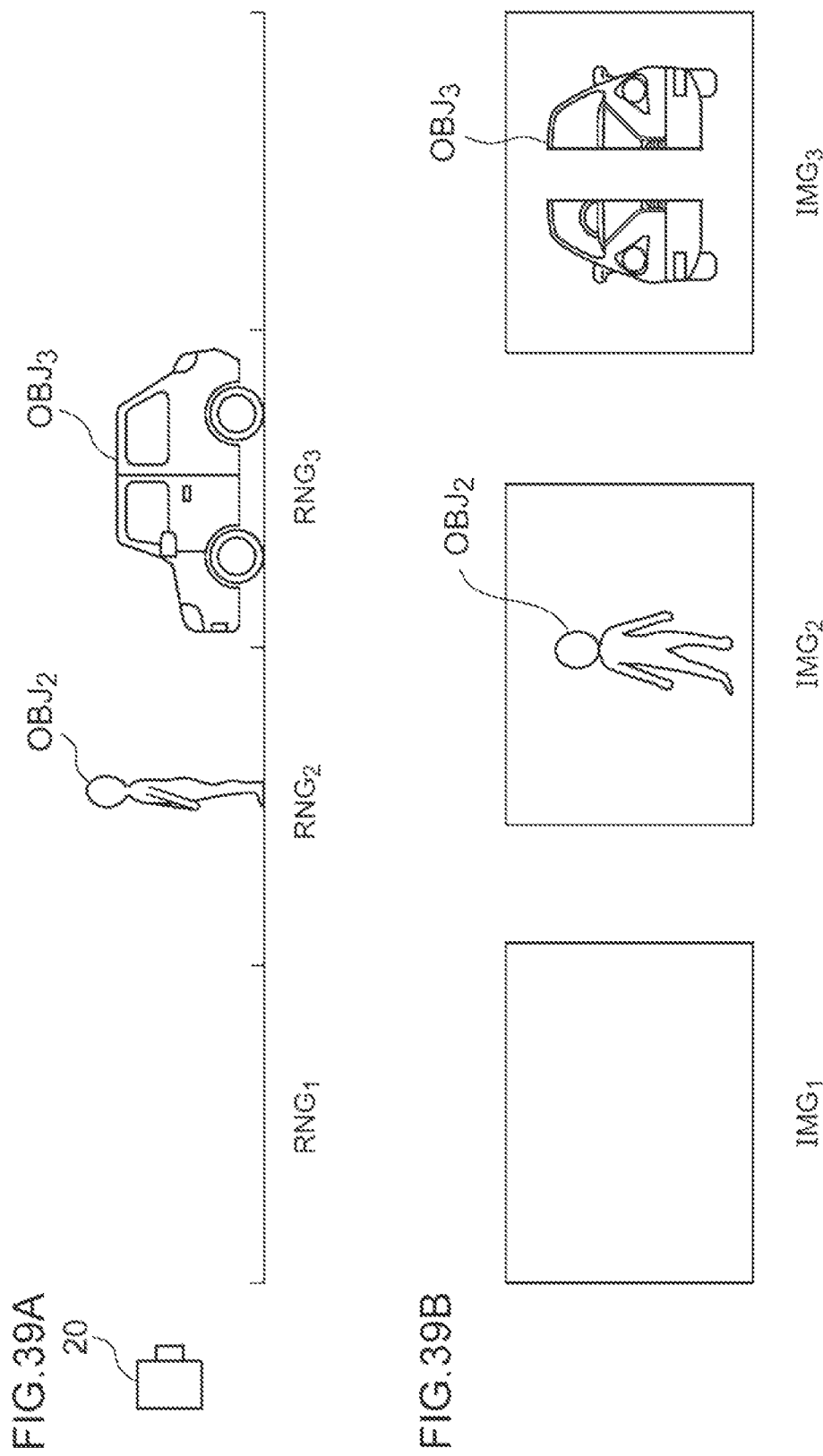

FIG.61A
FIG.61B
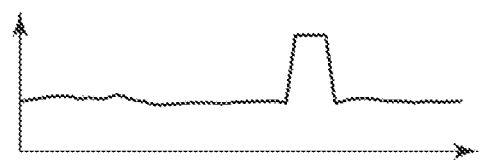
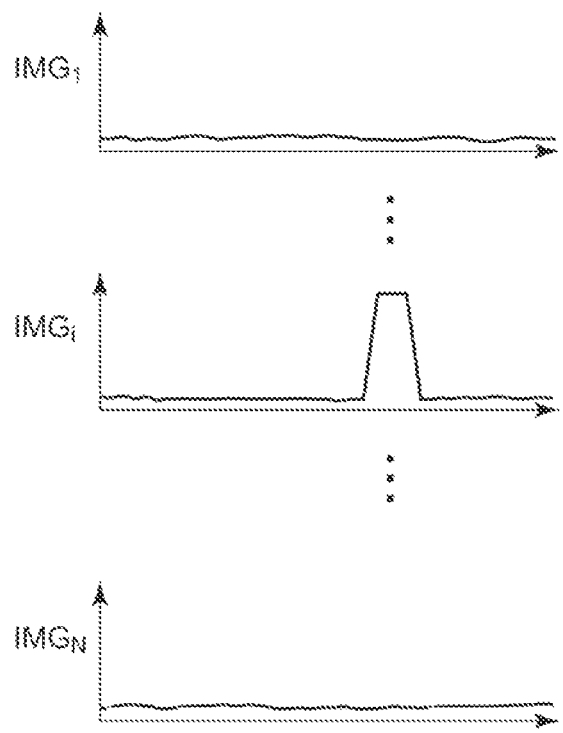

GATING CAMERA

BACKGROUND

1. Technical Field

The present disclosure relates to sensing and object identification.

2. Description of the Related Art

In order to support autonomous driving or autonomous control of the light distribution of a headlamp, an object identification system is employed for sensing the position and the kind of an object that exists in the vicinity of a vehicle. The object identification system includes a sensor and a processing device configured to analyze the output of the sensor. As such a sensor, a desired one is selected from among a camera, LiDAR (Light Detection and Ranging, Laser Imaging Detection and Ranging), millimeter-wave radar, ultrasonic sonar, etc., giving consideration to the usage, required precision, and cost.

Typical monocular cameras are not capable of acquiring depth information. Accordingly, in a case in which there is overlap between multiple objects positioned at different distances, it is difficult to separate individual objects.

As a camera that is capable of acquiring the depth information, TOF cameras are known. A TOF (Time Of Flight) camera is configured to emit infrared light by means of a light-emitting device, to measure the time of flight up to the time point at which the reflected light returns to the image sensor, and to convert the time of flight into distance information in the form of an image.

As an alternative to a TOF camera, an active sensor (which will be referred to as a "gating camera" hereafter in the present specification) has been proposed (Patent documents 1, 2). A gating camera is configured to divide its field of view into multiple ranges in a depth direction, and to capture multiple images for respective ranges at different exposure timings and different exposure periods. With this, a slice image is acquired for each target range. Each slice image includes only an object in the corresponding range.

As a result of investigating conventional gating cameras, the present inventors have recognized the following problems. Such a conventional gating system includes an illumination apparatus configured to emit probe light and a single camera set configured to measure the reflected light. When a given range is set to a measurement target (which will be referred to as a "target range"), only the reflected light from the target range is measured by the camera. On the other hand, the reflected light from an object in another, non-target range is discarded without being measured. That is to say, it can be said that such a conventional gating camera system is not able to provide high probe light use efficiency.

SUMMARY

An embodiment of the present disclosure has been made in view of such a situation.

1. An embodiment of the present disclosure relates to a gating camera structured to divide the depth direction into multiple ranges, and to generate multiple slice images that correspond to the multiple ranges. The gating camera includes: an illumination apparatus structured to emit probe light; a first image sensor; a second image sensor; and a controller structured to control a timing of emission of the probe light by the illumination apparatus and a timing of image capture by the first image sensor and the second image sensor. The controller controls the first image sensor and the second image sensor such that the first image sensor and the second image sensor receive reflected light from different respective ranges corresponding to one emission of the probe light from the illumination apparatus.

2. An embodiment of the present disclosure relates to an object identification system. The object identification system includes: a visible-light camera structured to generate a visible-light image; a gating camera structured to divide the depth direction into multiple ranges, and to generate multiple infrared images that correspond to the multiple ranges; and a processing device structured to process the visible-light image and the multiple infrared images. The processing device detects a separate object for each of the multiple infrared images, and applies the edge of the object judged for the multiple infrared images to the visible-light image so as to separate multiple object images included in the visible-light image.

3. An embodiment of the present disclosure also relates to an object identification system. The object identification system includes: a gating camera structured to divide the depth direction into multiple ranges, and to capture an image for each range while changing a time difference between light emission and exposure, so as to generate multiple slice images that correspond to the multiple ranges; and a processing device structured to have multiple first correction characteristics defined corresponding to the multiple ranges, to correct each of the multiple slice images using the corresponding first correction characteristics, and to judge the kind of an object based on the multiple slice images thus corrected.

Another embodiment of the present disclosure relates to a processing device. The processing device is used so as to form an object identification system together with a gating camera structured to divide the depth direction into multiple ranges, and to capture an image for each range while changing a time difference between light emission and exposure, so as to generate multiple slice images that correspond to the multiple ranges. The processing device includes: a first correction unit structured to have multiple first correction characteristics defined corresponding to the multiple ranges, and to correct each of the multiple slice images using the corresponding first correction characteristics; and a classifier structured to judge the kind of an object based on the multiple corrected slice images.

4. An embodiment of the present disclosure relates to an image display system. The image display system includes a gating camera structured to divide the depth direction into multiple ranges, and to capture an image for each range while changing a time difference between light emission and exposure, so as to generate multiple slice images that correspond to the multiple ranges; and a processing device structured to combine the multiple slice images so as to generate a combined image to be displayed on a display.

Another embodiment of the present disclosure relates to a processing device. The processing device is used so as to form an image display system together with a gating camera. The processing device includes: a combining unit structured to combine the multiple slice images so as to generate an image to be displayed on a display; and an output unit structured to output the image thus generated by the combining unit on the display.

5. An embodiment of the present disclosure relates to a gating camera structured to divide the depth direction into multiple ranges, and to generate multiple slice images that correspond to the multiple ranges. The gating camera includes: an illumination apparatus structured to emit probe light according to a light emission timing signal; an image sensor structured to capture an image of reflected light according to an image capture timing signal; and a controller structured to generate the light emission timing signal and the image capture timing signal with a time difference defined for each range. In a testing process, the gating camera is structured to be capable of applying an offset to the time difference between the light emission timing signal and the image capture timing signal.

Another embodiment of the present disclosure also relates to a gating camera. The gating camera includes: an illumination apparatus structured to emit probe light according to a light emission timing signal; an image sensor structured to capture an image of reflected light according to an image capture timing signal; and a controller structured to generate the light emission timing signal and the image capture timing signal with a time difference defined for each range. In a testing process, the gating camera is structured to be capable of outputting the light emission timing signal to an external reference light source via an external delay unit.

Yet another embodiment of the present disclosure also relates to a gating camera. The gating camera includes: an illumination apparatus structured to emit probe light according to a light emission timing signal; an image sensor structured to capture an image of reflected light according to an image capture timing signal; and a controller structured to generate the light emission timing signal and the image capture timing signal with a time difference defined for each range. In a testing process, the gating camera is structured to be capable of outputting the image capture timing signal to an external image sensor via an external delay unit.

6. An embodiment of the present disclosure relates to an image capture apparatus. The image capture apparatus includes: a gating camera structured to divide the depth direction into multiple ranges, to capture an image for each range while changing a time difference between light emission and exposure, and to generate multiple slice images that correspond to the multiple ranges; and an image processing device structured to combine the multiple slice images so as to generate a combined image. The image processing device is structured to detect a no-object-existing region in which no object exists for each of the multiple slice images, to apply noise reduction processing to the no-object-existing region, and to combine the multiple slice images thus subjected to the noise reduction processing.

Another embodiment of the present disclosure relates to an image processing device. The image processing device is structured to execute: processing for detecting a no-object-existing region in which no object exists for each of multiple slice images captured by a gating camera; processing for noise reduction in the no-object-existing region; and processing for combining the multiple slice images thus subjected to noise reduction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B are diagrams for explaining the slice images generated by the gating camera;

FIGS. 9A and 9B are diagrams for explaining the operation of the gating camera shown in FIG. 8;

FIGS. 11A and 11B are diagrams showing an automobile provided with the gating camera;

FIGS. 20A through 20C are diagrams for explaining the operation of an object identification system;

FIGS. 26A and 26B are diagrams for explaining the images generated by the gating camera;

FIGS. 39A and 39B are diagrams for explaining the images captured by the gating camera;

FIGS. 61A and 61B are diagrams for explaining the problems relating to image combination;

DETAILED DESCRIPTION

Overview of Embodiment 1

1. An embodiment disclosed in the present specification relates to a gating camera. The gating camera is structured to divide the depth direction into multiple ranges, and to generate multiple slice images that correspond to the multiple ranges. The gating camera includes: an illumination apparatus structured to emit probe light; a first image sensor; a second image sensor; and a controller structured to control a timing of emission of the probe light by the illumination apparatus and a timing of image capture by the first image sensor and the second image sensor. The controller controls the first image sensor and the second image sensor such that they receive reflected light from different respective ranges corresponding to one emission of the probe light from the illumination apparatus.

With a conventional gating camera provided with a single camera, when a given single range is set to a target, the light reflected by an object in a different range is not used. Accordingly, such an arrangement has a problem of poor efficiency of use of the probe light. In contrast, the gating camera according to the embodiment is capable of acquiring multiple slice images that correspond to multiple ranges in one emission of the probe light. This provides improved probe light use efficiency.

Also, the first image sensor may be assigned to a relatively near-distance range. Also, the second image sensor may be assigned to a relatively far-distance range. Also, the first image sensor may be structured to have an angle of view that is larger than that of the second image sensor. This enables a smaller difference in the size of an object image between the slice image in a far-distance range and the slice image in a near-distance range.

Description will be made below with reference to the drawings regarding an embodiment 1.

Figure 1:
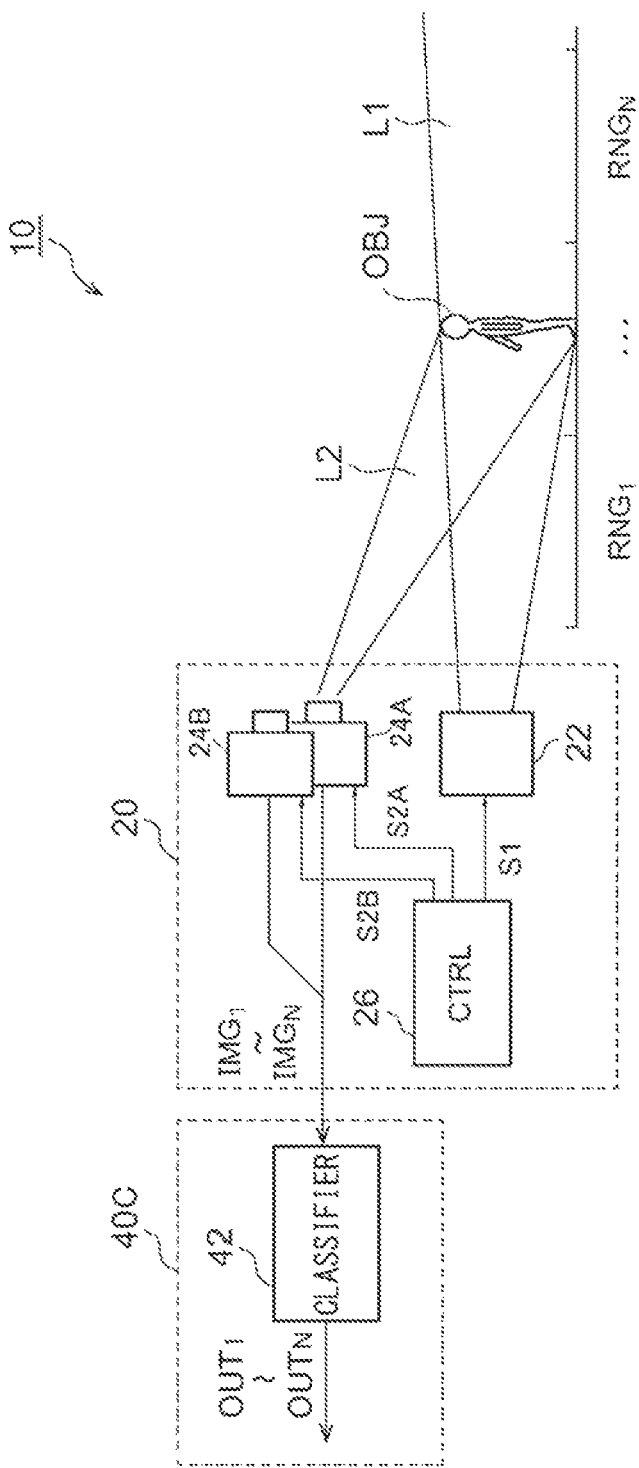
FIG. 1 is a block diagram showing an object identification system according to an embodiment 1.

FIG. 1 is a block diagram showing an object identification system 10 according to the embodiment 1. The object identification system 10 is mounted on a vehicle such as an automobile, motorcycle, or the like. The object identification system 10 judges the kind (category) of an object OBJ that exists in the vicinity of the vehicle.

The object identification system mainly includes a gating camera 20 and a processing device 40. The gating camera 20 includes an illumination apparatus 22, a first image sensor 24A, a second image sensor 24B, and a controller 26. The gating camera 20 captures images for a plurality of N (N≥2) ranges $RNG_1$ through $RNG_N$ divided in the depth direction. The ranges may be designed such that adjacent ranges overlap at their boundaries in the depth direction.

The illumination apparatus 22 emits probe light L1 in front of the vehicle in synchronization with a light emission timing signal S1 supplied from the controller 26. As the probe light L1, infrared light is preferably employed. However, the present invention is not restricted to such an arrangement. Also, as the probe light L1, visible light having a predetermined wavelength or ultraviolet light may be employed.

The first image sensor 24A and the second image sensor 24B are configured to support exposure control in synchronization with image timing signals S2A and S2B supplied from the controller 26, and to be capable of generating slice images IMGA and IMGB. The first image sensor 24A and the second image sensor 24B are sensitive to the same wavelength as that of the probe light L1. The first image sensor 24A and the second image sensor 24B capture images of reflected light (returned light) L2 reflected by the object OBJ.

The controller 26 controls the emission of the probe light L1 by the illumination apparatus 22 and timings at which the first image sensor 24A and the second image sensor 24B each capture an image.

Figure 2:
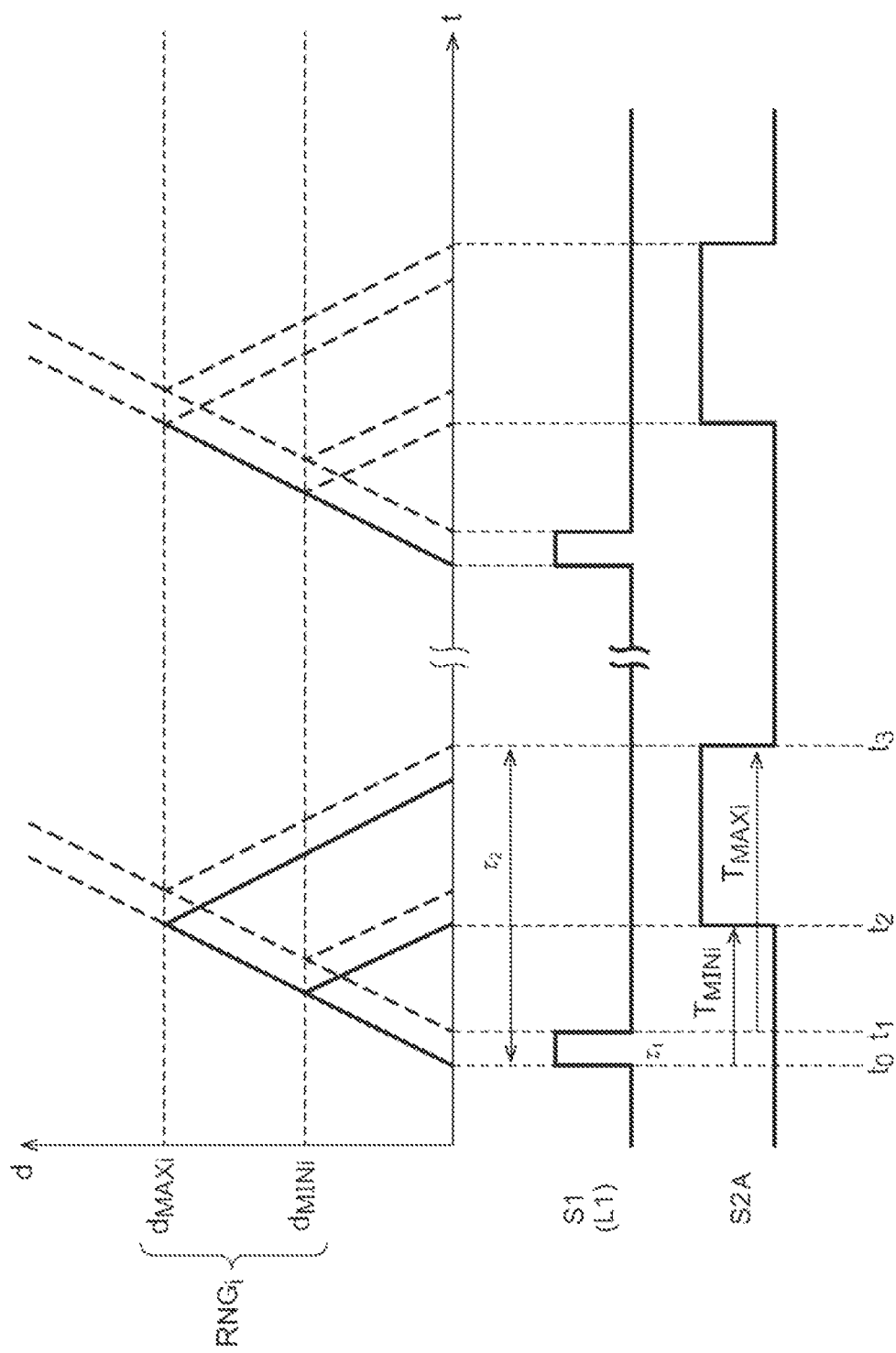
FIG. 2 is a diagram for explaining the basic operation of a gating camera.

FIG. 2 is a diagram for explaining the basic operation of the gating camera 20. For ease of understanding, description will be made directing attention to the operation of one (24A) from among the first image sensor 24A and the second image sensor 24B. FIG. 2 shows the operation when the i-th range $RNG_i$ is measured. The illumination apparatus 22 emits light during a light-emitting period $\tau_1$ from the time point $t_0$ to $t_1$ in synchronization with the light emission timing signal S1. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the illumination apparatus 22 at a given time point, to the arrival of the light at the distance $d_{MINi}$, up to the return of the reflected light to the first image sensor 24A, is represented by $T_{MINi}=2 \times d_{MINi}/c$. Here, c represents the speed of light.

Similarly, the round-trip time $T_{MAXi}$, which is a period from the departure of light from the illumination apparatus 22 at a given time point, to the arrival of the light at the distance $d_{MAXi}$, up to the return of the reflected light to the first image sensor 24A, is represented by $T_{MAXi}=2 \times d_{MAXi}/c$.

When only an image of an object OBJ included in the range $RNG_i$ is to be captured, the controller 26 generates the image capture timing signal S2A so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau 2$.

Figure 3:
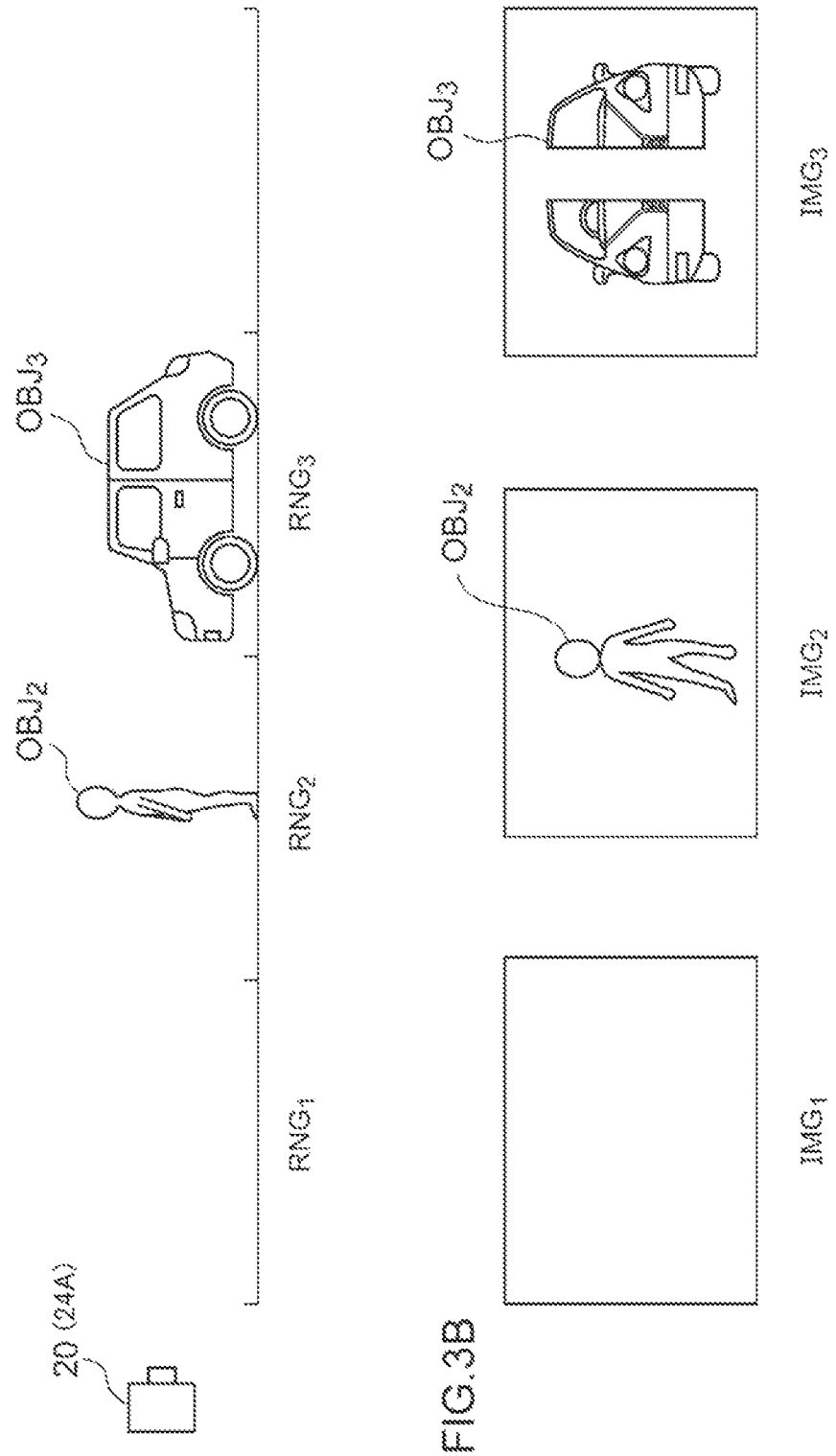
FIGS. 3A and 3B are diagrams for explaining slice images generated by a gating camera including a single camera.

FIGS. 3A and 3B are diagrams for explaining a slice image generated by the gating camera 20 including a single camera. FIG. 3A shows an example in which an object (pedestrian) $OBJ_2$ exists in the range $RNG_2$, and an object (vehicle) $OBJ_3$ exists in the range $RNG_3$. FIG. 3B shows multiple slice images $IMG_1$ through $IMG_3$ acquired in the situation shown in FIG. 3A. When the slice image $IMG_1$ is captured, the image sensor is exposed by only the reflected light from the range $RNG_1$. Accordingly, the image $IMG_1$ includes no object image.

When the slice image $IMG_2$ is captured, the image sensor is exposed by only the reflected light from the range $RNG_2$. Accordingly, the slice image $IMG_2$ includes only the object $OBJ_2$. Similarly, when the slice image $IMG_3$ is captured, the image sensor is exposed by only the reflected light from the range $RNG_3$. Accordingly, the slice image $IMG_3$ includes only the object $OBJ_3$. As described above, with the gating camera 20, this arrangement is capable of capturing object images in the form of separate images for the respective ranges.

Returning to FIG. 1, in the present embodiment, the first image sensor 24A and the second image sensor 24B are assigned to different ranges. More specifically, the controller 26 controls the first image sensor 24A and the second image sensor 24B such that they receive the reflected light from the respective different ranges in response to one emission of the probe light L1 by the illumination apparatus 22.

The gating camera 20 generates multiple slice images $IMG_1$ through $IMG_N$ that correspond to the multiple ranges $RNG_1$ through $RNG_N$. As the i-th slice image $IMG_i$, only an image of an object included in the corresponding range $RNG_i$ is acquired.

The processing device 40 is configured to identify the kind of an object based on multiple slice images $IMG_1$ through $IMG_N$ that correspond to the multiple range $RNG_1$ through $RNG_N$ generated by the gating camera 20. The processing device 40 is provided with a classifier 42 implemented based on a prediction model generated by machine learning. The algorithm employed by the classifier 42 is not restricted in particular. Examples of the algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The processing device 40 may be configured as a combination of a processor (hardware component) such as a Central Processing Unit (CPU), Micro Processing Unit (MPU), microcontroller, or the like, and a software program to be executed by the processor (hardware component). Also, the processing device 40 may be configured as a combination of multiple processors. Alternatively, the processing device 40 may be configured as a hardware component alone.

Figure 4:
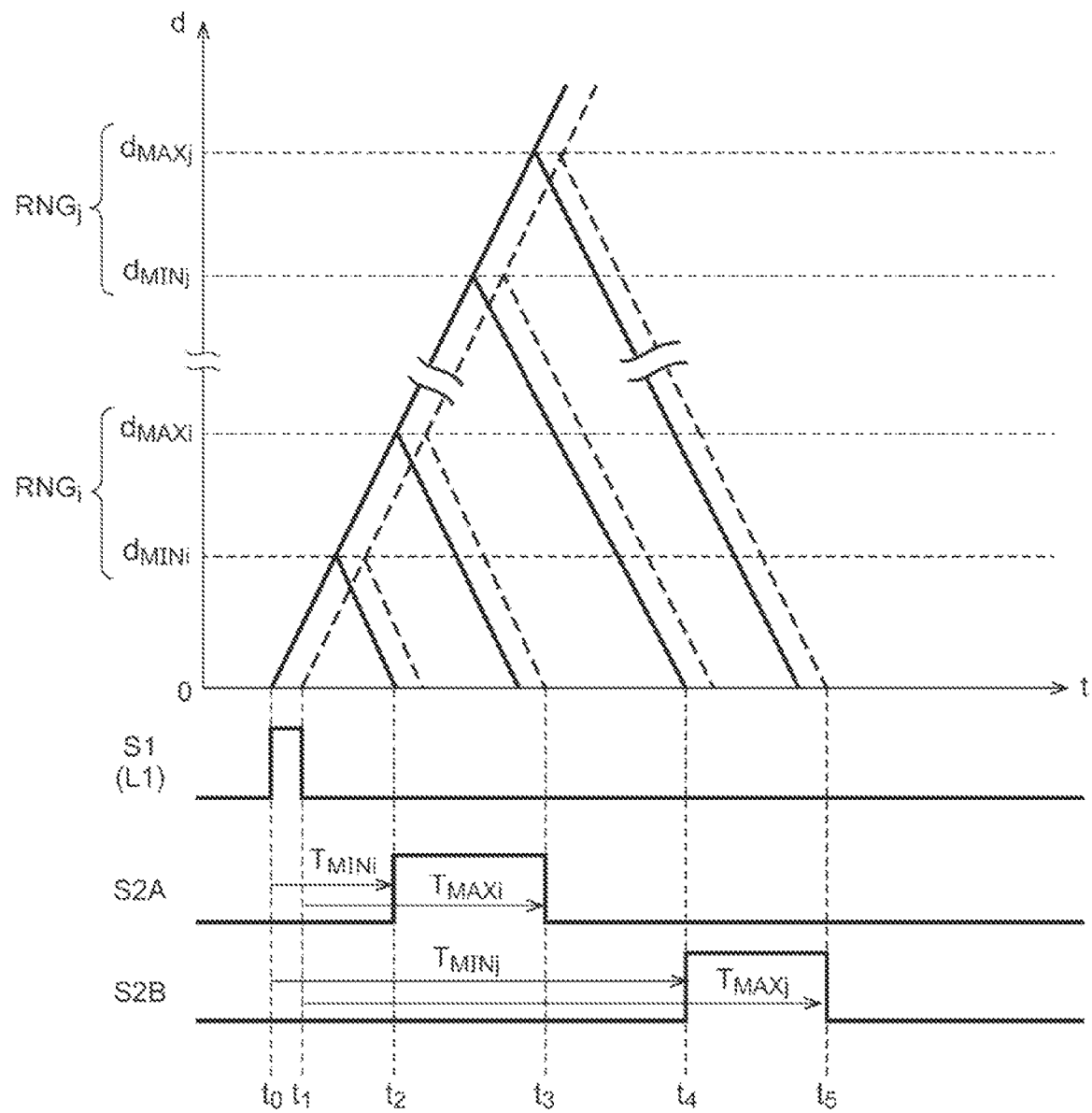
FIG. 4 is a diagram for explaining the operation of the gating camera shown in FIG. 1.

The above is the configuration of the object identification system 10 including the gating camera 20. Next, description will be made regarding the operation of the gating camera 20. FIG. 4 is a diagram for explaining the operation of the gating camera 20 shown in FIG. 1.

The first image sensor 24A is assigned to the i-th range $RNG_i$ that is arranged at a relatively near distance. The second image sensor 24B is assigned to the j-th (j>i) range $RNG_j$ arranged at a relatively far distance. The illumination apparatus 22 emits light during a light emission period $\tau_1$ from the time point to $t_0$ the time point $t_1$ in synchronization with the light emission timing signal S1. In the upper diagram, a light beam diagram is shown with the horizontal axis as time and with the vertical axis as distance d. The distance between the gating camera 20 and the near-distance boundary of the range $RNG_i$ is represented by $d_{MINi}$. Similarly, the distance between the gating camera 20 and the far-distance boundary of the range $RNG_i$ is represented by $d_{MAXi}$.

In order to acquire an image of the object $OBJ_i$ included in the range $RNG_i$, the image capture timing signal S2A is generated so as to start the exposure of the first image sensor 24A at the time point $t_2=t_0+T_{MINi}$, and so as to end the exposure of the first image sensor 24A at the time point $t_3=t_1+T_{MAXi}$.

Furthermore, in order to acquire an image of the object $OBJ_j$ included in the range $RNG_j$ using the same probe light, the image capture timing signal S2B is generated so as to start the exposure of the second image sensor 24B at the time point $t_4=t_0+T_{MINj}$, and so as to end the exposure of the second sensor 24B at the time point $t_5=t_1+T_{MAXj}$.

$$T_{MINj}=2\times d_{MINj}/c$$

$$T_{MAXj}=2\times d_{MAXj}/c$$

FIGS. 5A and 5B are diagrams for explaining slice images generated by the gating camera 20. FIG. 5A shows an example in which an object (pedestrian) $OBJ_i$ exists in the range $RNG_i$, and an object (vehicle) $OBJ_j$ exists in the range $RNG_j$. FIG. 5B shows two slice images $IMG_i$ and $IMG_j$ generated by the first image sensor 24A and the second image sensor 24B in a situation shown in FIG. 5A. It should be noted that the first image sensor 24A and the second image sensor 24B have the same angle of view. Accordingly, an image of the object $OBJ_j$ acquired in the far-distance range has a small size.

The above is the operation of the gating camera 20. Next, description will be made regarding the advantages thereof. With a conventional gating camera provided with a single camera, when a given range is an image capture target, the reflected light from an object in a different range is not used. That is to say, it can be said that such an arrangement provides low probe light use efficiency. In contrast, with the gating camera 20 according to the present embodiment, multiple slice images that correspond to the multiple ranges can be acquired in one emission of the probe light L1. That is to say, such an arrangement provides improved probe light use efficiency.

Next, description will be made regarding the assignment of multiple ranges to the first image sensor 24A and the second image sensor 24B. Description will be made based on several examples.

Example 1-1

For simplification of description, description will be made assuming that all the ranges $RNG_i$ (i=1 to N) have the same length ($d_{MAXi}-d_{MINi}$) in the depth direction, and generation of the slice image for each range $RNG_i$ requires the same number of exposures.

Figure 6A:
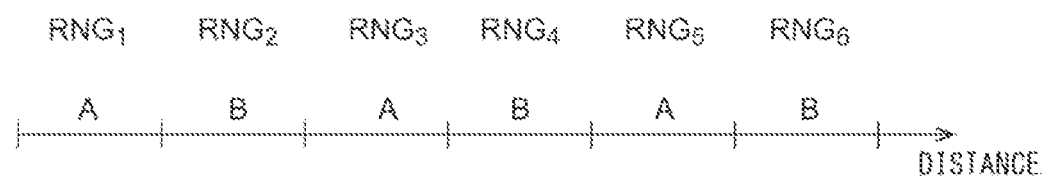
FIG. 6A is a diagram showing the correspondence relation between the range and the camera according to an example 1-1.

FIG. 6A shows the correspondence relation between the ranges and the camera according to Example 1.1. In the drawing, "A" indicates the first image sensor, and "B" indicates the second image sensor. In this example, the depth direction is divided into N(=6) ranges. However, the present invention is not restricted to such an example. In Example 1-1, the odd-numbered ranges $RNG_1$, $RNG_3$, and $RNG_5$ are assigned to the first image sensor 24A. The even-numbered ranges $RNG_2$, $RNG_4$, and $RNG_6$ are assigned to the second image sensor 24B.

Figure 6B:
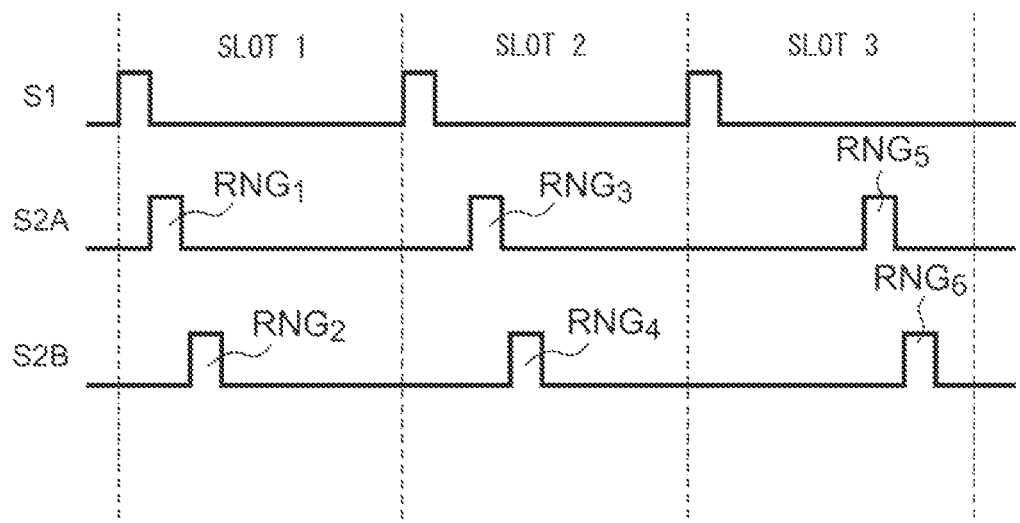
FIG. 6B is a timing chart that corresponds to the assignment shown in FIG. 6A.

FIG. 6B is a timing chart that corresponds to the assignment shown in FIG. 6A. A set of K emissions by the illumination apparatus 22 required to generate a single slice image and the accompanying K exposures by the first image sensor 24A and the second image sensor 24B will be referred to as "one slot". FIG. 6B shows an example in which one slot includes one emission and one exposure. Also, one slot may include multiple light emissions and multiple exposures. In a case of employing a single camera, image capture of N=6 ranges requires six slots. However, in a case of employing two cameras, image capture of N=6 ranges requires only three slots.

The first image sensor 24A captures images of the three ranges $RNG_1$, $RNG_3$, and $RNG_5$ assigned to the first image sensor 24A itself in a time sharing manner. In the same manner, the second image sensor 24B captures images of the three ranges $RNG_2$, $RNG_4$, and $RNG_6$ assigned to the second image sensor 24B itself in a time sharing manner.

Example 1-2

Figure 7A:
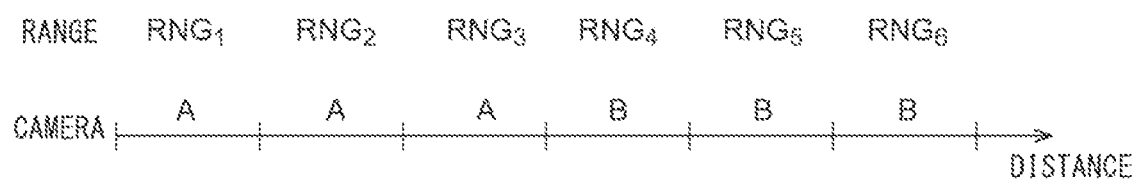
FIG. 7A is a diagram showing the correspondence relation between the range and the camera according to an example 1-2.

FIG. 7A is a diagram showing the correspondence relation between the ranges and the camera according to Example 1-2. In the drawing, "A" indicates the first image sensor, and "B" indicates the second image sensor. The first image sensor 24A, which is one from among the two cameras 24A and 24B, is assigned to multiple ranges arranged at a relatively near distance. On the other hand, the other camera, i.e., the second image sensor 24B is assigned to the ranges arranged at a relatively far distance. Specifically, the ranges $RNG_1$ through $RNG_3$ are assigned to the first image sensor 24A. The ranges $RNG_4$ through $RNG_6$ are assigned to the second image sensor 24B.

Figure 7B:
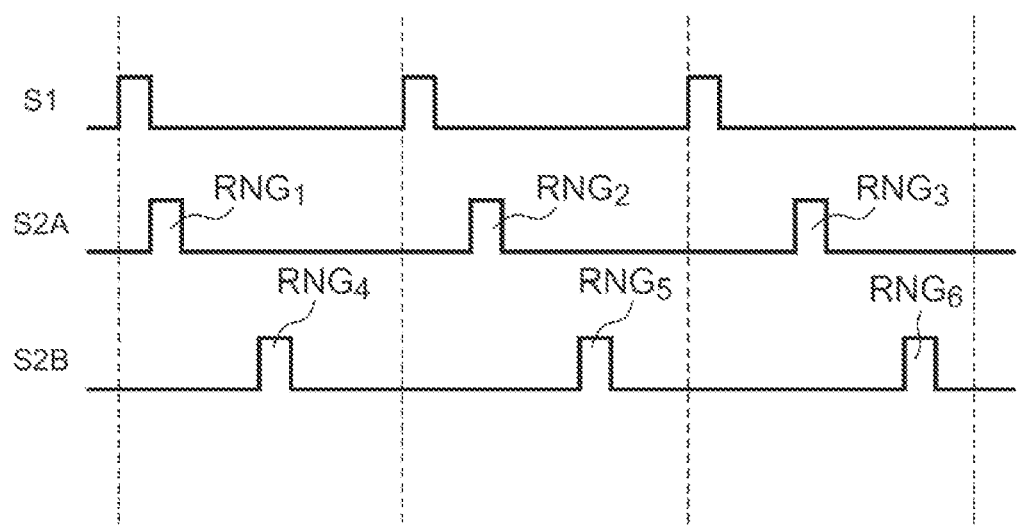
FIG. 7B is a timing chart that corresponds to the assignment shown in FIG. 7A.

FIG. 7B is a timing chart that corresponds to the assignment shown in FIG. 7A. Also in this example, one slot includes one emission and one exposure. However, the present invention is not restricted to such an example. Also, one slot may include multiple light emissions and multiple exposures. The image capture of N=6 ranges requires three slots to be completed. The first image sensor 24A captures images of the three ranges $RNG_1$ through $RNG_3$ assigned to the first image sensor 24A itself in a time sharing manner. In the same manner, the second image sensor 24B captures images of the three ranges $RNG_4$ through $RNG_6$ assigned to the second image sensor 24B itself in a time sharing manner.

The method according to Example 1-2 has the following advantage as compared with the method according to Example 1-1. That is to say, with the control according to Example 1-2, in a case in which the output image of the first image sensor 24A and the output image of the second image sensor 24B are processed in parallel by means of two classifiers, the two classifiers can be implemented by an algorithm for near distances and an algorithm for far distances.

Figure 8:
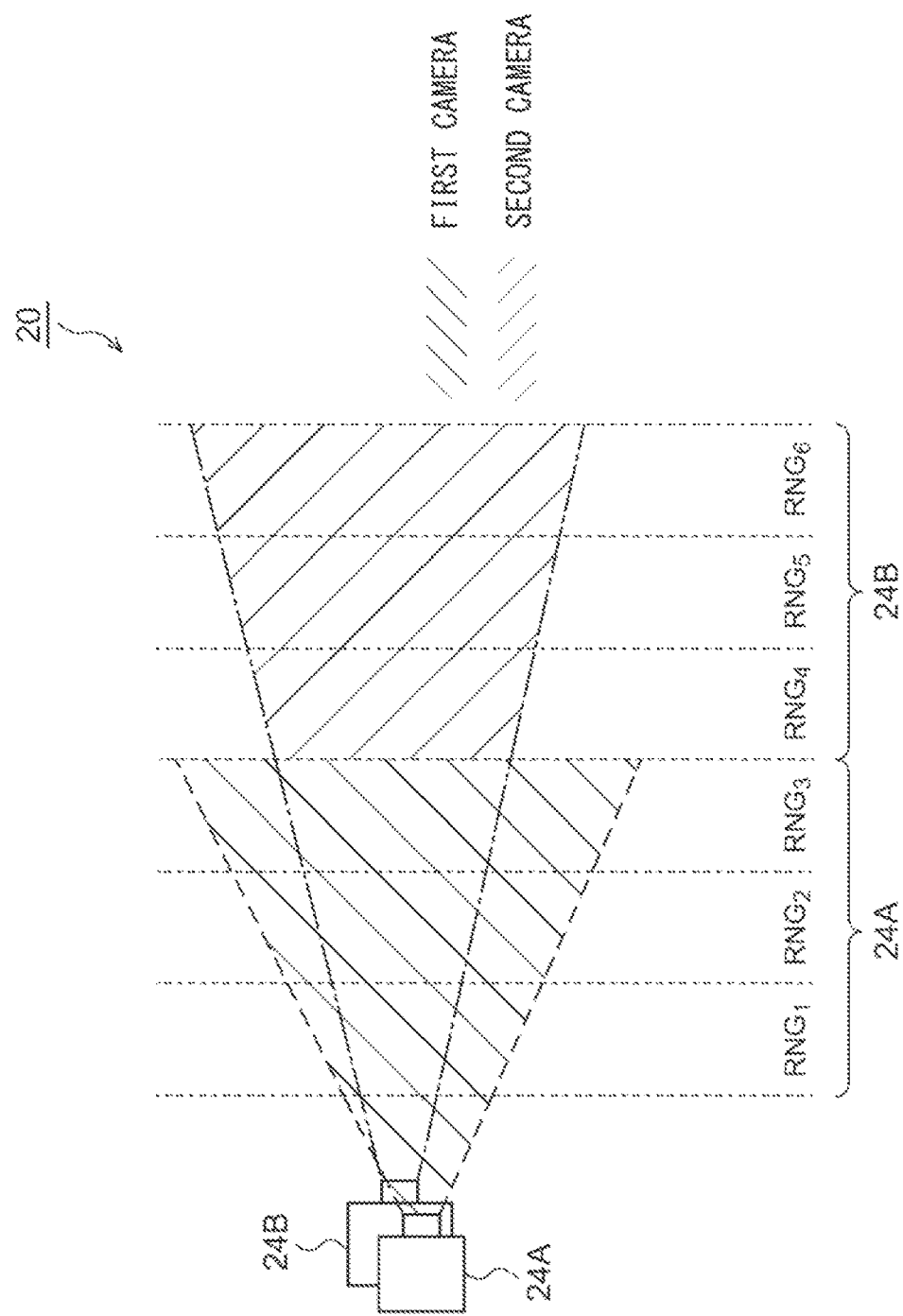
FIG. 8 is a diagram for explaining the operation of the gating camera shown in FIG. 8.

Preferably, in Example 1-2, the first image sensor 24A and the second image sensor 24B may be configured to have different angles of view. FIG. 8 is a diagram showing the gating camera 20 according to Example 1-2. The first image sensor 24A assigned to the near ranges is configured to be capable of capturing an image with a relatively wide field of view. The second image sensor 24B assigned to the far ranges is configured to be capable of capturing an image with a relatively narrow field of view.

For example, the first image sensor 24A and the second image sensor 24B may be configured with the same size. In this case, the first image sensor 24A may be combined with a wide-angle lens, and the second image sensor 24B may be combined with a telephoto lens.

Also, the first image sensor 24A and the second image sensor 24B may each be provided with a lens having the same focal distance. In this case, the first image sensor 24A may be configured to have a relatively large image sensor size, and the second image sensor 24B may be configured to have a relatively small image sensor size, such that they have different fields of view. Also, the first image sensor 24A and the second image sensor 24B may be configured such that they have different sensor sizes and different focal distances. In the drawing, the range in which an image is captured by the first image sensor 24A and the range in which an image is captured by the second image sensor 24B are hatched with different patterns. The above is the configuration of the gating camera 20 according to Example 1-2.

FIGS. 9A and 9B are diagrams for explaining the operation of the gating camera 20 shown in FIG. 8.

For comparison, description will be made with reference to FIG. 5. In a case in which the images of the near-distance range $RNG_i$ and the far-distance range $RNG_j$ are captured by means of a camera having the same field of view, as shown in FIG. 5B, the object $OBJ_j$ image in the far-distance range $RNG_j$ has a relatively small size.

Returning to FIG. 9, with Example 1-2 in which images of the near-distance ranges $RNG_i$ (i=1 to 3) and the far-distance ranges $RNG_j$ (j=4 to 6) are captured by means of cameras having different angles of view, this allows the object $OBJ_j$ image in the far-distance range $RNG_j$ to be captured with a large size. This provides the processing device 40 provided in the next stage of the gating camera 20 with an improved object identification rate.

Example 1-3

As a result of investigating conventional gating cameras, the present inventors have further recognized the following additional problems.

With the gating camera, the image sensor captures an image of the reflected light reflected by an object included in an image capture target range after the light emission device emits the probe light. That is to say, as the distance to the target range becomes larger, the intensity of the reflected light received by the image sensor becomes smaller.

With typical cameras, such a camera is able to compensate for a decrease in the intensity of the received light by increasing the exposure time. However, with a gating camera, the exposure time is determined according to the distance from the gating camera to the near-distance boundary of the range for which an image is to be captured and the distance from the gating camera to the far-distance boundary of the range for which an image is to be captured. Accordingly, the exposure time cannot be increased.

Accordingly, in order to provide a high-quality image of a far-distance range, a countermeasure is required. Examples of such a countermeasure include: (i) raising the intensity of the probe light to be emitted; and (ii) raising the image sensor sensitivity.

In some cases, such a countermeasure cannot be supported. Alternatively, in many cases, only an insufficient countermeasure can be supported. In this case, a set of light emission and exposure (i.e., the slot described above) is required to be executed a multiple of $K_j$ ($K_j \geq 2$) times for the far-distance range $RNG_j$. Furthermore, the $K_j$ slice images obtained as a result of the multiple slots are combined (or multiple exposures are provided) so as to generate a single image. That is to say, as the distance to the range becomes larger, the number of slots required for generating a single slice image becomes larger.

For ease of understanding, description will be made regarding an example in which $K_1=K_2=1$, $K_3=K_4=2$, $K_5=K_6=3$. In this case, 12 slots are required in order to generate the slice images $IMG_1$ through $IMG_6$ of the six ranges $RNG_1$ through $RNG_6$. With the time required for one slot as Ts, a conventional gating camera including a single camera requires a time of 12×Ts to process the 12 slots for each frame.

In Example 1-3, a technique is provided for reducing the time required for each frame.

Figure 10A:
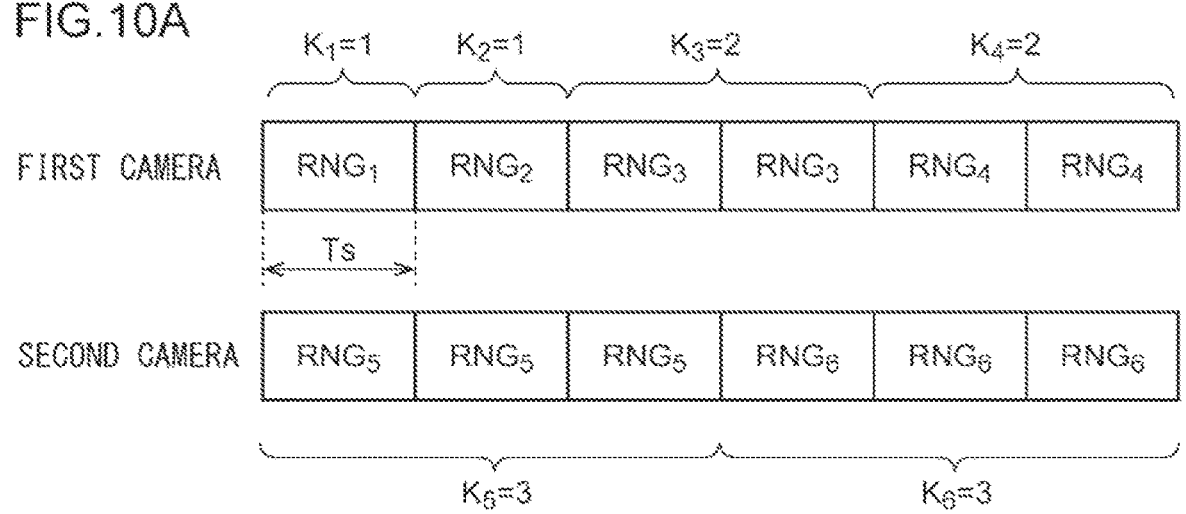
FIGS. 10A through 10C are diagrams showing the range assignment according to an example 1-3.
Figure 10B:
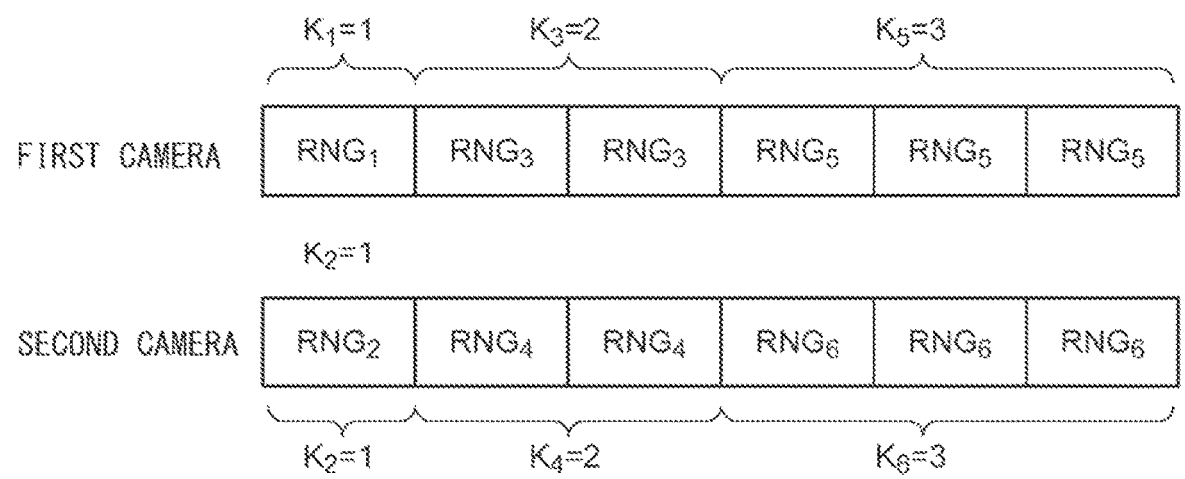
Figure 10C:
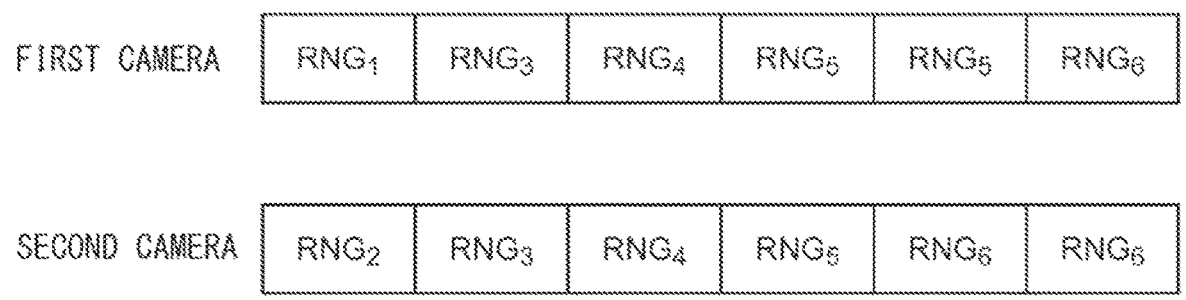

FIGS. 10A through 10C are diagrams showing the range assignment according to Example 1-3. In Example 1-3, a total number of required slots are assigned fifty/fifty to the first image sensor 24A and the second image sensor 24B such that they are processed synchronously in parallel. In the same manner as in Example 1-2, the near-distance ranges $RNG_1$ through $RNG_4$ are assigned to the first image sensor 24A, and the far-distance ranges $RNG_5$ and $RNG_6$ are assigned to the second image sensor 24B.

In the same manner as in Example 1-1, FIG. 10B shows an example in which the slots of the odd-numbered ranges $RNG_1$, $RNG_3$, and $RNG_5$ are assigned to the first image sensor 24A, and the slots of the even-numbered ranges $RNG_2$, $RNG_4$, and $RNG_6$ are assigned to the second image sensor 24B.

FIG. 10C shows an example in which two cameras are assigned to different slots for the same ranges.

With Example 1-3, the processing for 12 slots is assigned to the two cameras 24A and 24B such that they are processed in parallel. This allows the processing time for each frame to be reduced to (6×Ts), thereby raising the frame rate.

Description has been made above regarding Example 1. Next, description will be made regarding modifications relating to Example 1.

Modification 1-1

The assignment of the cameras for the multiple ranges or multiple slots has been described for exemplary purposes only. It can be readily conceived by those skilled in this art that various modifications may be made, which are also encompassed in the technical scope of the present invention.

Modification 1-2

Description has been made in the embodiment regarding the gating camera 20 provided with two cameras 24A and 24B. Also, the number of the cameras may be three or more.

Modification 1-3

Description has been made in the embodiment regarding an arrangement in which the slice images of different ranges are processed by the same classifier 42. However, the present invention is not restricted to such an arrangement. Also, different classifiers may be employed for the respective ranges.

Usage

FIGS. 11A and 11B are diagrams showing an automobile 300 provided with the gating camera 20. Referring to FIG.

11A, the automobile 300 includes headlamps (lamps) 302L and 302R. The automobile 300 shown in FIG. 11A includes a single illumination apparatus 22 at a central position of the vehicle. Furthermore, the left and right headlamps 302L and 302R respectively include the first image sensor 24A and the second image sensor 24B as built-in components. The position of the illumination apparatus 22 is not restricted in particular. For example, the illumination apparatus 22 may be provided to a front bumper (i) or a front grille (ii). Also, the illumination apparatus 22 may be provided to the back side of a rear-view mirror on the inner side of the front window (iii). Also, the position of the controller 26 is not restricted in particular. The controller 26 may be provided in the engine compartment or the vehicle interior. Also, the controller 26 may be built into the headlamp.

Referring to FIG. 11B, the single illumination apparatus 22 includes multiple (e.g., two) light sources 22A and 22B. The multiple light sources 22A and 22B emit light at the same timing such that the output light of the multiple light sources 22A and 22B forms one probe light. The multiple light sources 22A and 22B are built into the left and right headlamps 302L and 302R, respectively.

The first image sensor 24A and the second image sensor 24B may be built into one from among the headlamps 302L and 302R. Alternatively, the first image sensor 24A and the second image sensor 24B may each be arranged as an external component of the headlamps 302L and 302R. For example, the first image sensor 24A and the second image sensor 24B may be provided in the vicinity of the illumination apparatus 22.

Figure 12:
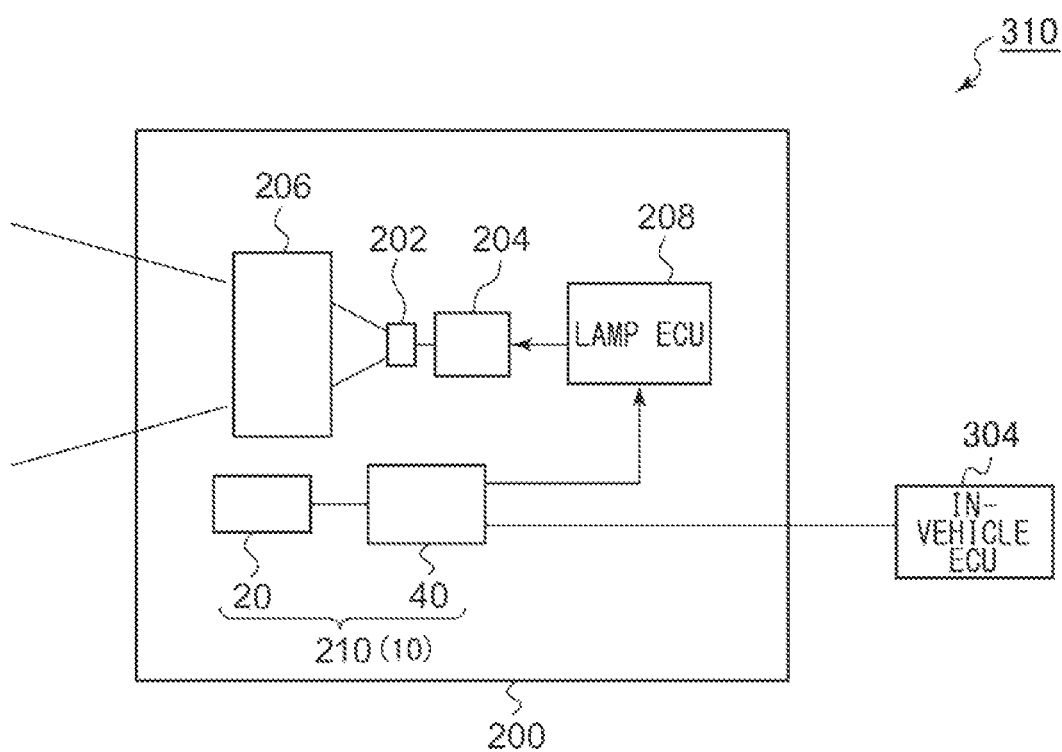
FIG. 12 is a block diagram showing an automotive lamp provided with an object detection system.

FIG. 12 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the gating camera 20 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

Embodiment 2

First, description will be made regarding the problem relating to the embodiment 2.

Figure 13:
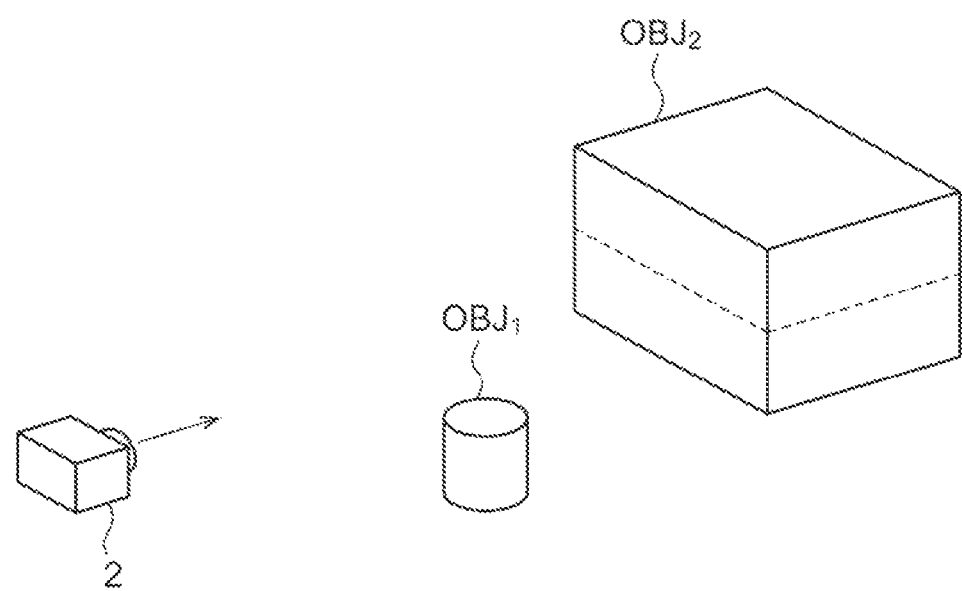
FIG. 13 is a diagram showing an example of a situation in which multiple objects exist.

FIG. 13 is a diagram showing an example of a situation in which multiple objects exist. As viewed from the sensor 2 toward the side in the arrow direction, two objects $OBJ_1$ and $OBJ_2$ exist such that they overlap. Description will be made assuming that the two objects $OBJ_1$ and $OBJ_2$ have the same color, and the object $OBJ_2$ has an upper-half surface portion and a lower-half surface portion formed of different materials.

Figure 14A:
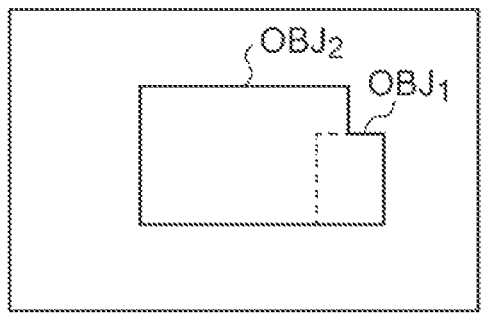
FIG. 14A is a diagram showing a visible-light image captured by a visible-light camera in a situation shown in FIG. 13.

FIG. 14A shows a visible-light image generated by capturing an image of the situation shown in FIG. 13 by means of a visible-light camera. When the two objects have the same color or very similar colors, such a visible-light image leads to a blurred edge (boundary) between the two objects. Accordingly, in a case in which such a visible-light image is subjected to image processing, such an arrangement has the potential to provide false recognition of the two objects $OBJ_1$ and $OBJ_2$ as the same object.

Figure 14B:
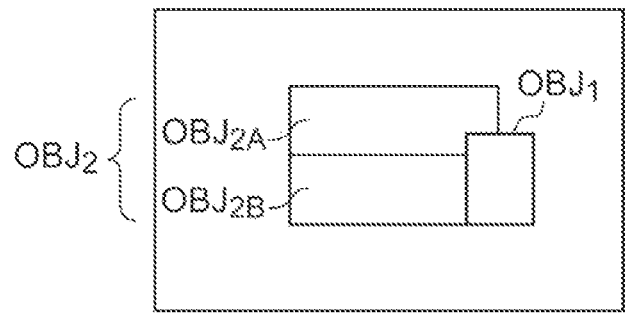
FIG. 14B is a diagram showing an infrared image captured by an infrared camera in a situation shown in FIG. 13.

FIG. 14B shows an infrared image generated by capturing an image of the situation shown in FIG. 13 by means of an infrared camera. With the infrared camera, a portion where the reflection ratio with respect to infrared light changes appears as an edge. Accordingly, as shown in FIG. 14B, a clear edge is generated at a boundary of the object $OBJ_2$ between the upper-half portion and the lower-half portion formed of different materials. Accordingly, in a case in which such an infrared image is subjected to image processing, such an arrangement has the potential to provide false recognition of the single object $OBJ_2$ as two objects $OBJ_{2A}$ and $OBJ_{2B}$.

The present invention relating to the embodiment 2 has been made in view of such a situation. Accordingly, it is an exemplary purpose of an embodiment of the present invention to provide an object identification system that is capable of accurately separating multiple objects.

Overview of Embodiment 2

An embodiment disclosed in the present specification relates to an object identification system. The object identification system includes: a visible-light camera structured to generate a visible-light image; a gating camera structured to divide the depth direction into multiple ranges, and to generate multiple infrared images that correspond to the multiple ranges; and a processing device structured to process the visible-light image and the multiple infrared images. The processing device detects a separate object for each of the multiple infrared images, extracts an edge of the separate object, and applies the edge of the object to the visible-light image so as to separate multiple object images included in the visible-light image.

With such an arrangement configured to combine the visible-light image generated by the visible-light camera and the multiple infrared images generated by the gating camera, the object image can be separated giving consideration to depth information in addition to color information and reflection ratio information. This allows multiple objects to be separated with high precision. With this, for example, the objects can be distinguished even when objects having the same color overlap in the front-rear direction.

Also, the processing device may judge a single separate region or multiple consecutive regions as the separate object for each infrared image. This allows a single object having portions formed of different materials to be recognized as a single object.

Also, when precision of the object identification with the visible-light image alone is low, the gating camera may be set to an active state. With such an arrangement in which the operation of the gating camera is controlled to a minimum necessary level, such an arrangement suppresses an increase of an amount of calculation.

Also, the gating camera may be operated at a frame rate that is lower than that of the visible-light camera. This suppresses an increase of an amount of calculation.

Also, once an edge is extracted for a given object, the edge thus extracted may be continuously used, and edge re-extraction may be suspended. Once the object is separated, the edge thereof can be easily tracked. Accordingly, in this case, by suspending the operation of the gating camera, this allows an amount of calculation to be reduced.

Description will be made below regarding the embodiment 2 with reference to the drawings.

Figure 15:
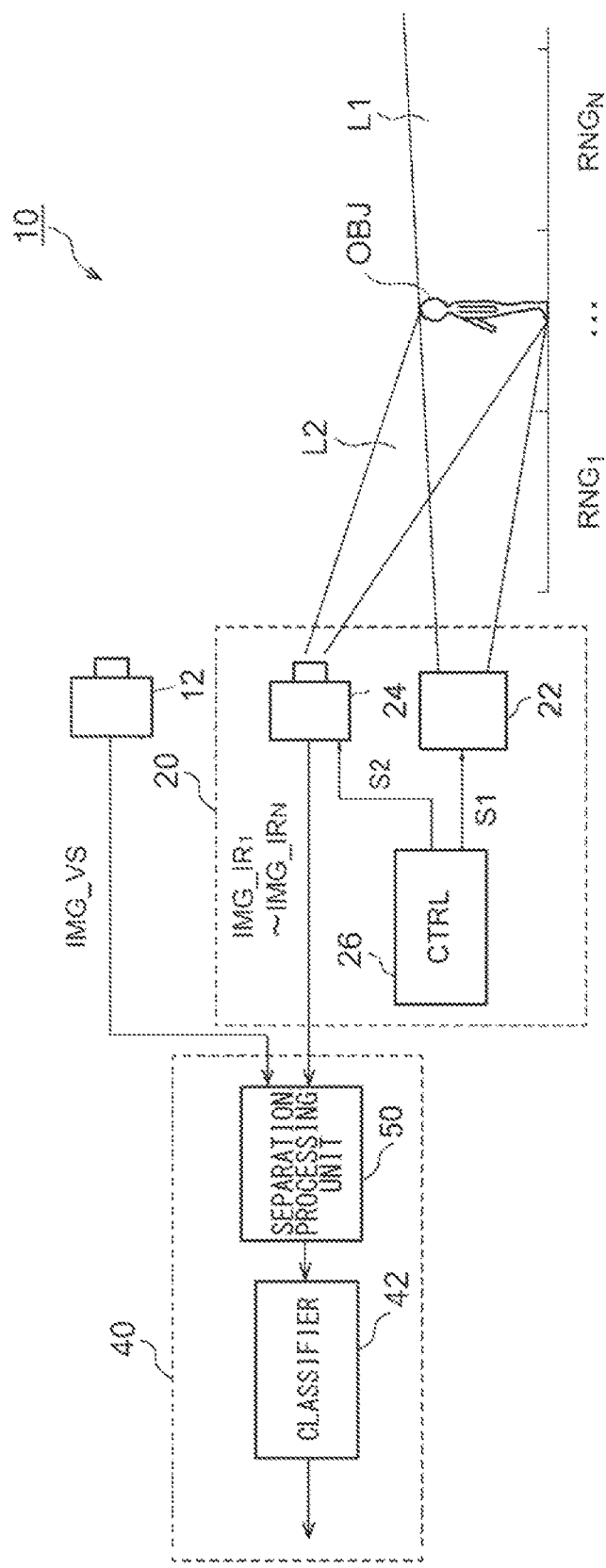
FIG. 15 is a block diagram sowing an object identification system according to an embodiment 2.

FIG. 15 is a block diagram showing an object identification system 10 according to an embodiment 2. The object identification system 10 is mounted on a vehicle such as an automobile, motorcycle, or the like. The object identification system 10 judges the kind (which will also be referred to as the "category" or "class") of an object OBJ that exists in the vicinity of the vehicle.

The object identification system 10 mainly include a visible-light camera 12, a gating camera 20, and a processing device 40. The visible-light camera 12 is configured as a color camera or a monochrome camera. The visible-light camera 12 generates a visible-light image IMG_VS.

The gating camera 20 includes an illumination apparatus 22, an infrared camera 24, and a controller 26. The gating camera 20 captures images for a plurality of N (N≥2) ranges $RNG_1$ through $RNG_N$ divided in the depth direction. The ranges may be designed such that adjacent ranges overlap at their boundaries in the depth direction.

The illumination apparatus 22 emits probe light L1 in front of the vehicle in synchronization with a light emission timing signal S1 supplied from the controller 26. As the probe light L1, infrared light is preferably employed.

The infrared camera 24 is configured to support exposure control in synchronization with an image capture timing signal S2 supplied from the controller 26, and to be capable of generating an infrared image IMG_IR. The infrared camera 24 is sensitive to the same wavelength as that of the probe light L1. The infrared camera 24 captures an image of reflected light (returned light) L2 reflected by the object OBJ.

The controller 26 controls the emission of the probe light L1 by means of the illumination apparatus 22 and the timing of the image capture by means of the infrared camera 24.

Figure 16:
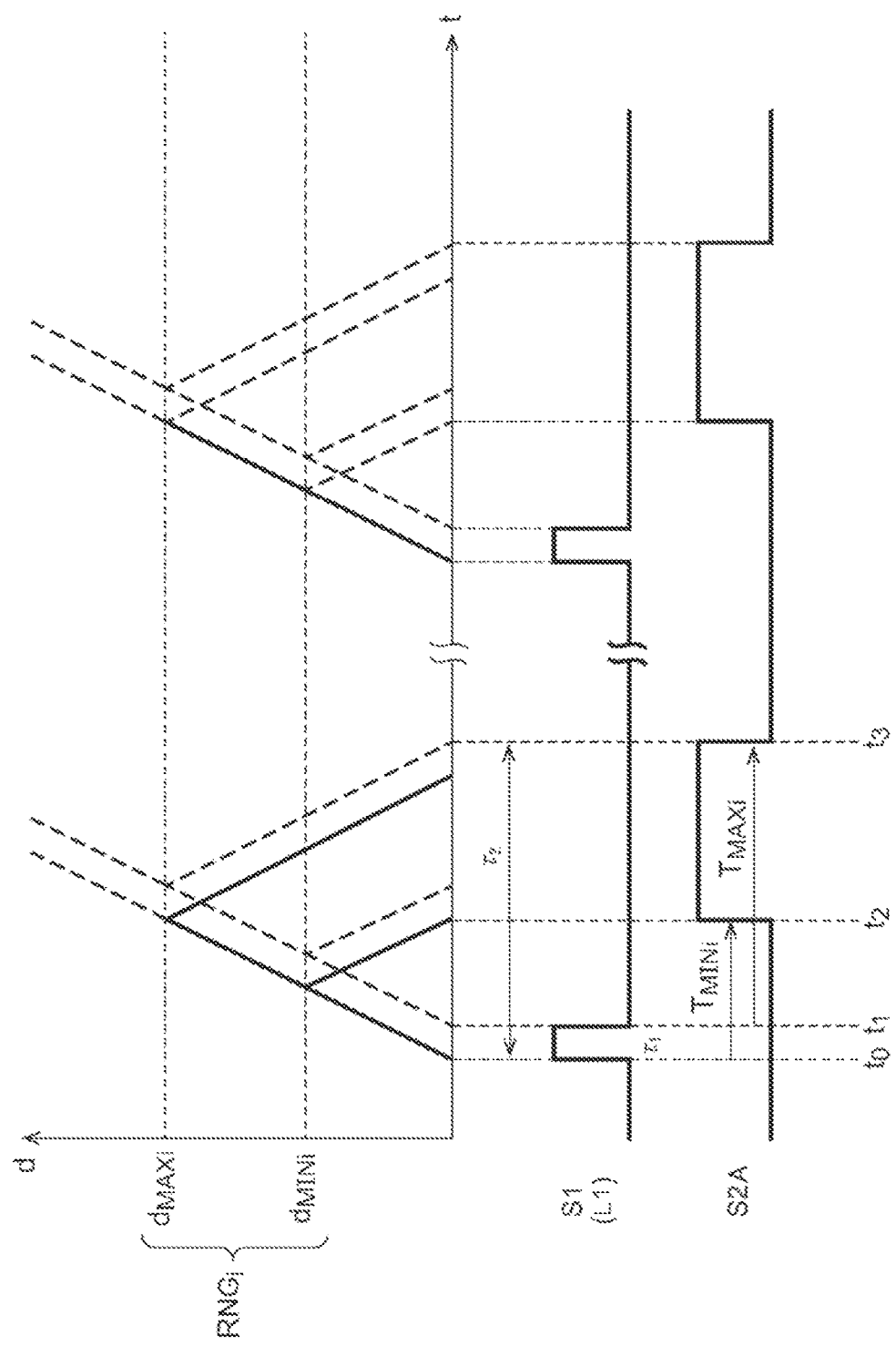
FIG. 16 is a diagram for explaining the basic operation of the gating camera.

FIG. 16 is a diagram for explaining the basic operation of the gating camera 20. FIG. 16 shows the operation when the i-th range $RNG_i$ is measured. The illumination apparatus 22 emits light during a light emission period $\tau_1$ from the time points $t_0$ to $t_1$ in synchronization with the light emission timing signal S1. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the illumination apparatus 22 at a given time point, to the arrival of the light at the distance $d_{MINi}$, up to the return of the reflected light to the infrared camera 24, is represented by $T_{MINi}=2\times d_{MINi}/c$. Here, c represents the speed of light.

Similarly, the round-trip time $T_{MAXi}$, which is a period from the departure of light from the illumination apparatus 22 at a given time point, to the arrival of the light at the distance $d_{MAXi}$, up to the return of the reflected light to the infrared camera 24, is represented by $T_{MAXi}=2\times d_{MAXi}/c$.

When only an image of an object OBJ included in the range $RNG_i$ is to be captured, the controller 26 generates the image capture timing signal S2A so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau2$.

Figure 17:
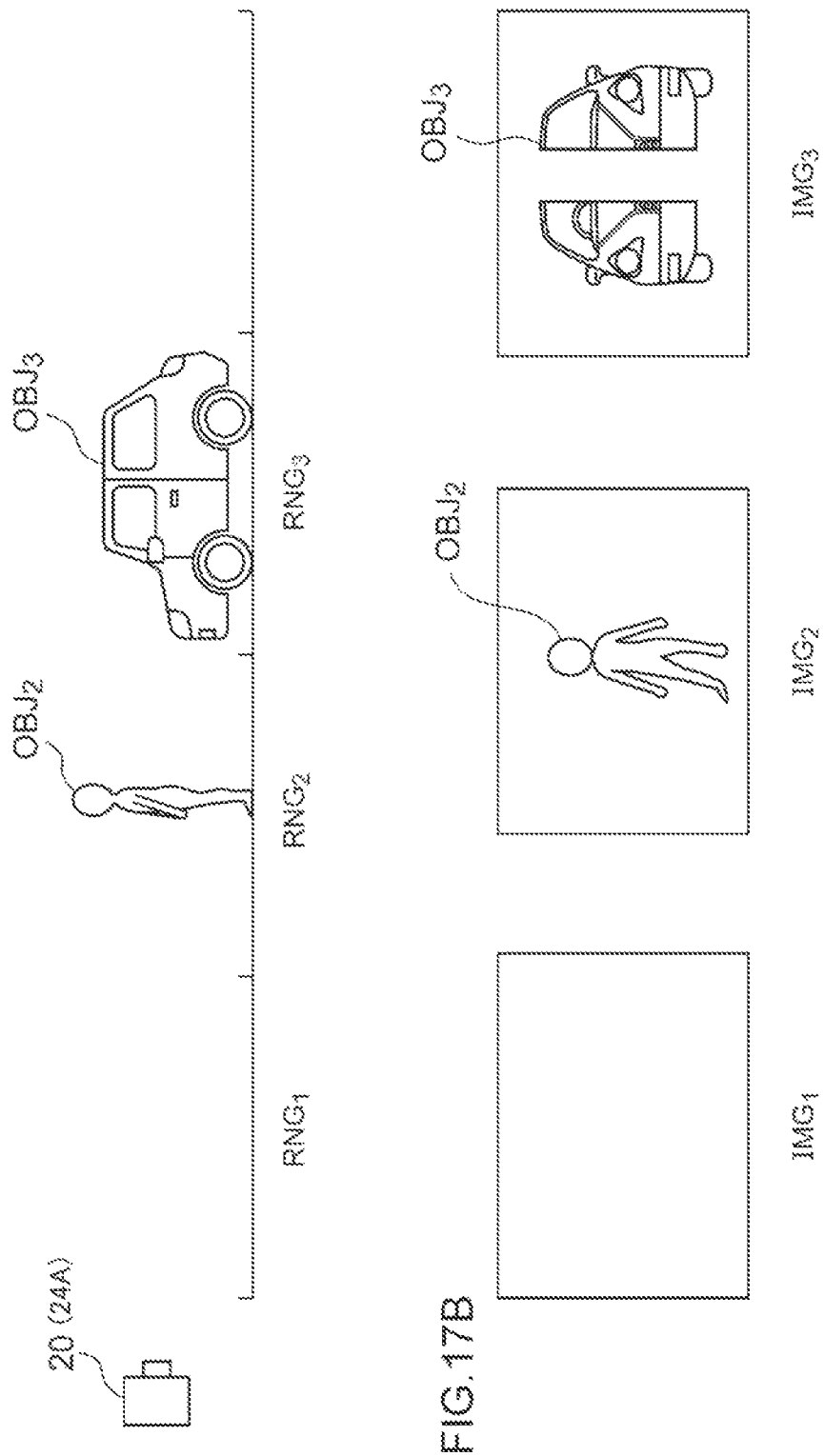
FIGS. 17A and 17B are diagrams for explaining images generated by the gating camera.

FIGS. 17A and 17B are diagrams for explaining an image generated by the gating camera 20. FIG. 17A shows an example in which an object (pedestrian) $OBJ_2$ exists in the range $RNG_2$, and an object (vehicle) $OBJ_3$ exists in the range $RNG_3$. FIG. 17B shows multiple infrared images $IMG\_IR_1$ through $IMG\_IR_3$ acquired in the situation shown in FIG. 17A. When the slice image $IMG\_IR_1$ is captured, the image sensor is exposed by only the reflected light from the range $RNG_1$. Accordingly, the image $IMG\_IR_1$ includes no object image.

When the infrared image $IMG\_IR_2$ is captured, the image sensor is exposed by only the reflected light from the range $RNG_2$. Accordingly, the infrared image $IMG\_IR_2$ includes only the object $OBJ_2$. Similarly, when the infrared image $IMG\_IR_3$ is captured, the image sensor is exposed by only the reflected light from the range $RNG_3$. Accordingly, the infrared image $IMG\_IR_3$ includes only the object $OBJ_3$. As described above, with the gating camera 20, this arrangement is capable of capturing object images in the form of separate images for the respective ranges.

Returning to FIG. 15, the processing device 40 is configured to receive a visible-light image IMG_VS and multiple infrared images $IMG\_IR_1$ through $IMG\_IR_N$, and to identify the kind of an object in front of the vehicle based on the images thus received.

The processing device 40 may include the classifier 42 and a separation processing unit 50. The processing device 40 may be configured as a combination of a processor (hardware component) such as a Central Processing Unit (CPU), Micro Processing Unit (MPU), microcontroller, or the like, and a software program to be executed by the processor (hardware). Also, the processing device 40 may be configured as a combination f multiple processors. Alternatively, the processing device 40 may be configured as a hardware component only.

The classifier 42 may be implemented based on a prediction model generated by machine learning. The classifier 42 judges the kind (category or class) of an object included in an input image. The algorithm employed by the classifier 42 is not restricted in particular. Examples of algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

As an upstream stage of the classifier 42, the separation processing unit 50 is provided. The separation processing unit 50 does not distinguish the kind of an object. The separation processing unit 50 isolates an object image IMG_OBJ that corresponds to the object OBJ from the visible-light image IMG_VS. The classifier 42 identifies the kind of each object image IMG_OBJ.

Figure 18:
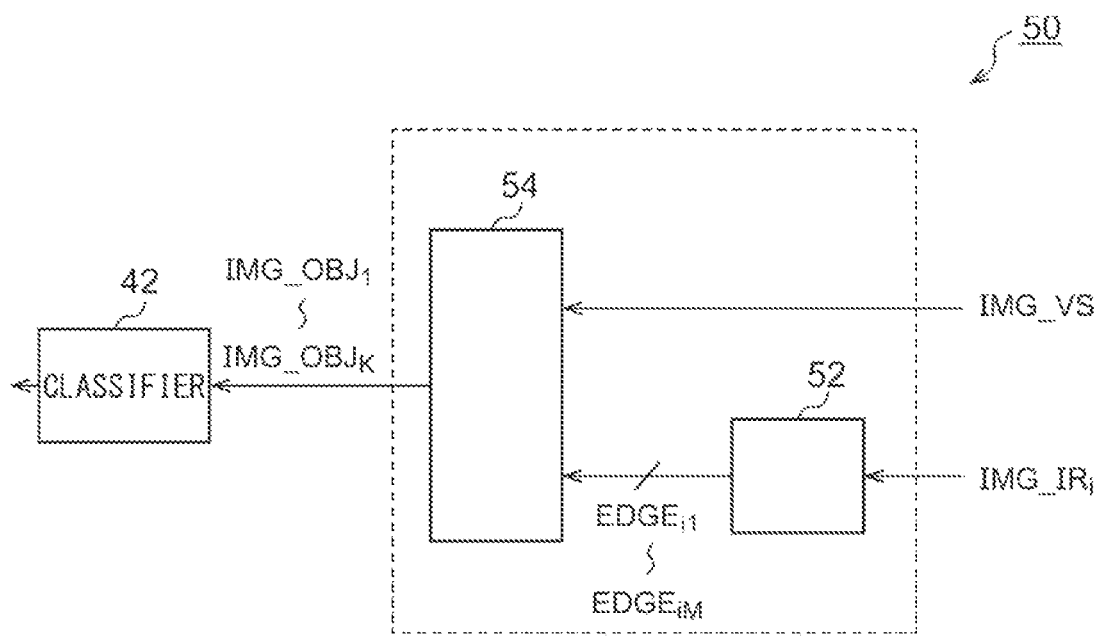
FIG. 18 is a function block diagram showing a processing device according to an example.

FIG. 18 is a function block diagram showing the processing device 40 according to an embodiment. In this example, the separation processing unit 50 includes a first processing unit 52 and a second processing unit 54. The first processing unit 52 receives multiple infrared images $IMG\_IR_1$ through $IMG\_IR_N$, and sequentially processes the infrared images thus received. The first processing unit 52 refers to each infrared image IMG_IR$_i$, and judges that a single separate region is, or multiple consecutive regions are, the separate object OBJ$_{ij}$. Specifically, a region surrounded by an edge will be referred to as the "separate object". The object OBJ$_{ij}$ represents the j-th object included in the infrared image IMG_IR$_i$. With this, the processing device 40 outputs edge data EDGE$_{ij}$ that indicates the edge (outer circumference) and the position of the separate object OBJ$_{ij}$. When the i-th infrared image IMG$_i$ includes M separate objects OBJ$_{i1}$ through OBJ$_{iM}$, M items of edge data EDGE$_{i1}$ through EDGE$_{iM}$ are generated. A region surrounded by an edge will be referred to as a "region". The edge data EDGE$_{ij}$ has no relation with the object color.

Figure 19A:
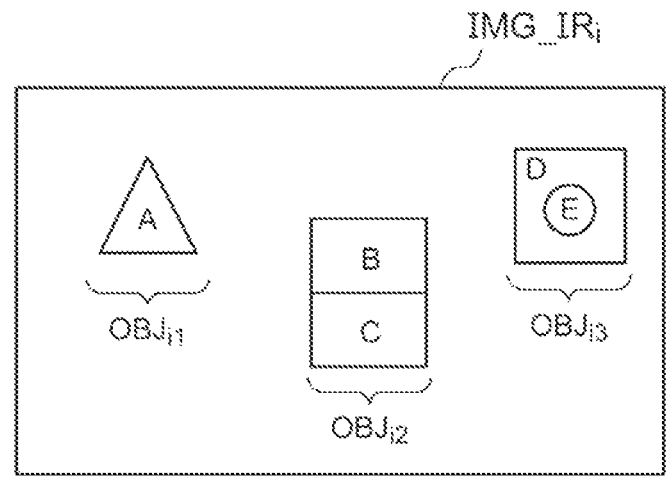
FIGS. 19A and 19B are diagrams for explaining judgment processing for a separate object based on a single infrared image.
Figure 19B:
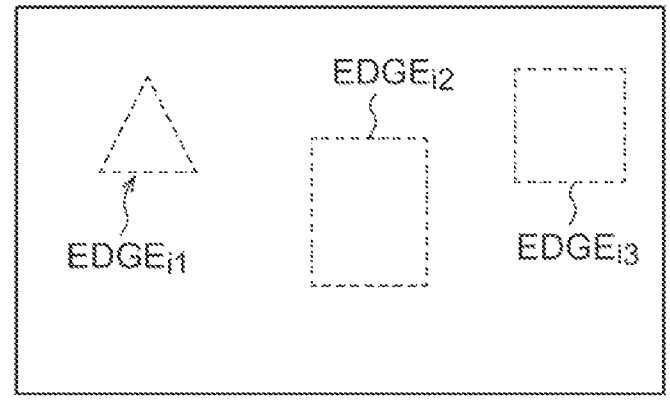

FIGS. 19A and 19B are diagrams for explaining the judgment of a separate object based on a single infrared image IMG_IR$_i$, i.e., for explaining the operation of the first processing unit 52. The infrared image IMG_IR$_i$ shown in FIG. 19A includes five regions A through E. It should be noted that such an arrangement ensures that each single infrared image IMG_IR$_i$ is included in the same corresponding range RNG$_i$.

The region A is a separate region. Accordingly, judgement is made that the region A is a single separate object OBJ$_{i1}$. In contrast, the regions B and C are continuous. Accordingly, judgment is made that the regions B and C are combined as a single separate object OBJ$_{i2}$. Similarly, the regions D and E are continuous. Accordingly, judgment is made that the regions D and E are combined as a single separate object OBJ$_{i3}$.

FIG. 19B is a diagram showing edge data. In this example, the three separate objects OBJ$_{i1}$ through OBJ$_{i3}$ are detected. Accordingly, three items of edge data EDGE$_{i1}$ through EDGE$_{i3}$ each indicating the corresponding edge and the position thereof are generated.

Returning to FIG. 18, the second processing unit 54 receives the input of the edge data EDGE acquired for all the infrared images IMG_IR$_1$ through IMG_IR$_N$. The second processing unit 54 applies the object edge data EDGE to the visible-light image IMG_VS, so as to separate a plurality of K object images IMG_OBJ$_1$ through IMG_OBJ$_K$.

The above is the configuration of the object identification system 10. Next, description will be made regarding the operation thereof.

FIGS. 20A through 20C are diagrams for explaining the operation of the object identification system 10. Description will be made below assuming that the situation shown in FIG. 13 is measured by the object identification system 10. Also, description will be made assuming that, in FIG. 13, the object OBJ$_1$ exists in the first range RNG$_1$, and the object OBJ$_2$ exists in the range RNG$_2$.

Description will be made with reference to FIGS. 20A and 20B regarding the processing of the first processing unit 52. FIG. 20A shows the infrared image IMG_IR$_1$ generated by the gating camera 20. The infrared image IMG_IR$_1$ includes an image of the object OBJ$_1$. The edge of the object OBJ$_1$ is detected by the first processing unit 52 of the separation processing unit 50. Subsequently, the edge data EDGE$_{11}$ is generated.

FIG. 20B shows the infrared image IMG_IR$_2$ generated by the gating camera 20. The infrared image IMG_IR$_2$ includes an image of the object OBJ$_2$. The edge of the object OBJ$_2$ is detected by the first processing unit 52 of the separation processing unit 50. Subsequently, the edge data EDGE$_{12}$ is generated. There is a difference in the material between the upper portion and the lower portion of the object OBJ$_2$. However, the upper portion and the lower portion of the object OBJ$_2$ are recognized as a single separate object.

Referring to FIG. 20C, description will be made regarding the processing of the second processing unit 54. The left-side drawing in FIG. 20C shows the visible-light image IMG_VS generated by the visible-light camera 12. As described above, the two objects OBJ$_1$ and OBJ$_2$ have the same color. Accordingly, the visible-light image IMG_VS provides only a blurred boundary between the objects OBJ$_1$ and OBJ$_2$. As shown in the central drawing in FIG. 20C, the edge data EDGE$_{11}$ and EDGE$_{21}$ are applied to the visible-light image IMG_VS. With this, as shown in the right-side drawing in FIG. 20C, such an arrangement is capable of isolating two object images IMG_OBJ$_1$ and IMG_OBJ$_2$. Preferably, the second processing unit 54 may sequentially apply the edge data from the near-distance range so as to sequentially isolate the object image IMG_OBJ from the near-distance side.

The above is the operation of the object identification system 10. The object identification system 10 is capable of distinguishing multiple objects even if it is difficult for an arrangement employing only a visible-light camera to distinguish such multiple objects.

Furthermore, with the processing using a typical infrared camera, as shown in FIG. 2B, such an arrangement has the potential to provide false recognition of a single object OBJ$_2$ having two portions formed of different materials as two objects OBJ$_{2A}$ and OBJ$_{2B}$. In contrast, with the present embodiment, this arrangement is capable of recognizing a single object even if such a single object has multiple portions formed of different materials.

Description will be made regarding the frame rate of the gating camera 20. Description will be made regarding the gating camera 20 assuming that multiple infrared images IMG_IR$_1$ through IMG_IR$_N$ for all of multiple ranges RNG$_1$ through RNG$_N$ are regarded as one frame.

1. The gating camera 20 may operate at the same frame rate as that of the visible-light camera 12. In this case, the same processing is performed for all the frames, thereby providing the object identification with improved precision in a steady manner.

2. However, in a case in which the visible-light camera 12 and the gating camera 20 are operated at the same frame rate, such an arrangement leads to a problem of an increased amount of processing by the processing device 40. In order to solve such a problem, the frame rate of the gating camera 20 may be designed to be lower than that of the visible-light camera 12. With this, object identification based on only the visible-light image IMG_VS and object identification based on both the visible-light image IMG_VS and the infrared image IMG_IR may be performed in a time sharing manner.

In this case, the intermittently generated edge data EDGE may be displayed so as to track the position of a subject included in the visible-light image IMG_VS using a so-called tracking technique.

3. In the normal state, the object identification may be performed based on only the image generated by the visible-light camera 12. When the identification precision decreases, the gating camera 20 may be set to the active state so as to start the object identification based on both the visible-light image IMG_VS and the infrared image IMG_IR. A decrease in the identification precision may be detected based on a decrease in the matching probability. Subsequently, after the identification rate improves, the gating camera 20 may be set to the non-active state so as to return to the object identification based on only the visible-light camera 12.

Description will be made regarding modifications relating to the embodiment 2.

Modification 2-1

Figure 21:
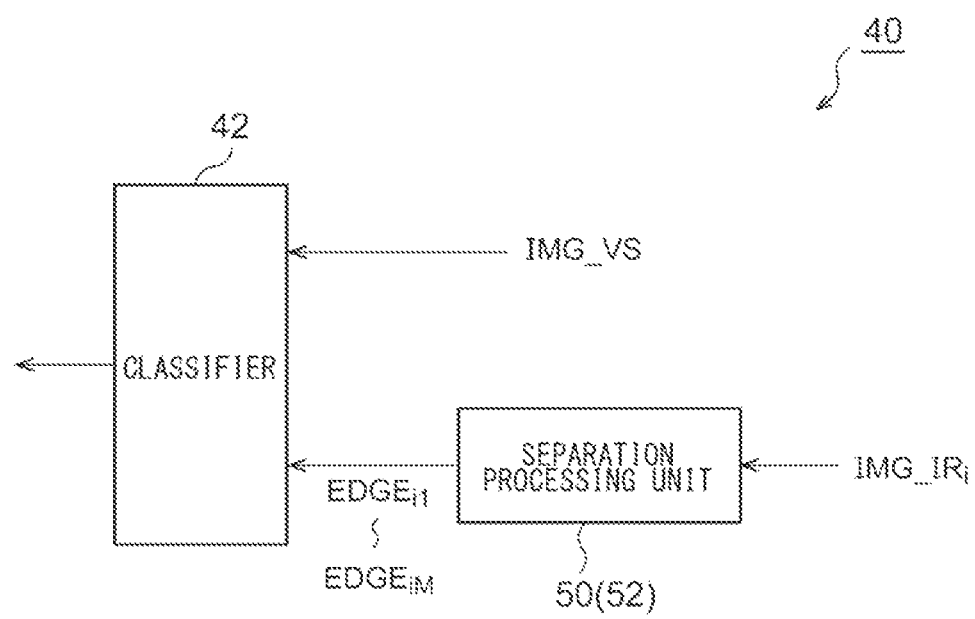
FIG. 21 is a function block diagram showing a processing device according to a modification 2-1.

The configuration of the processing device 40 is not restricted to the example described above. FIG. 21 is a function block diagram showing a processing device 40A according to a modification 2-1. In this modification, the separation processing unit 50 includes a first processing unit 52. The functions of the processing unit 52 are the same as those of the processing unit 52 shown in FIG. 18. Specifically, the processing unit 52 refers to each infrared image $IMG\_IR_i$, and judges that a single separate region is, or multiple consecutive regions are, a separate object $OBJ_{ij}$. Subsequently, the first processing unit 52 outputs the edge data $EDGE_{ij}$ that indicates the edge (outer circumference) and the position of the separate object $OBJ_{ij}$. The classifier 42 receives the input of a set of the edge data EDGE together with the visible-light image IMG_VS. The classifier 42 detects the object image IMG_OBJ included in the visible-light image IMG_VS using each edge data EDGE as a clue, and judges the kind of the object image IMG_OBJ.

For example, the edge data EDGE may be sequentially selected so as to use the edge data EDGE thus selected as a mask. With this, only an image within the edge may be set to a target to be subjected to the object identification.

Usage

Figure 22A:
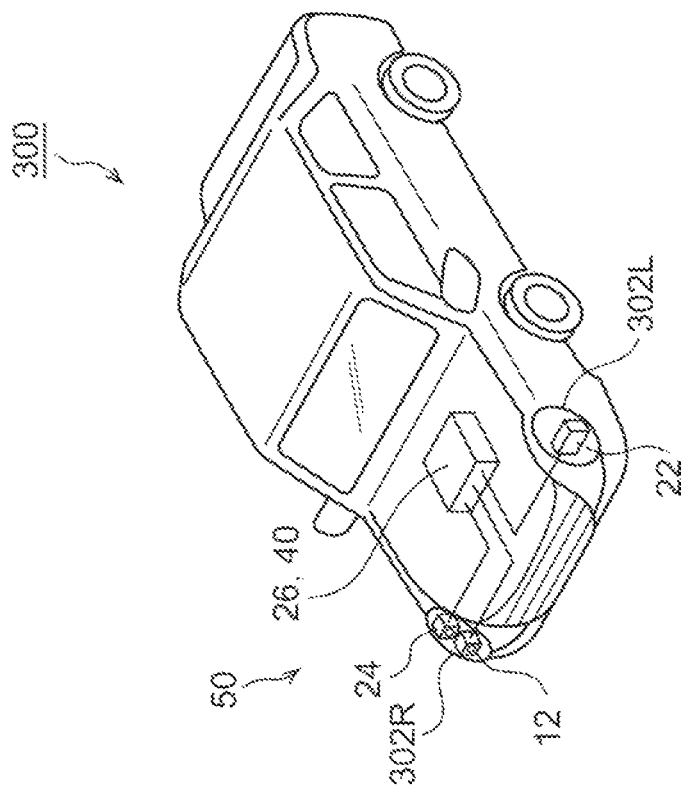
FIGS. 22A and 22B are diagrams showing an automobile provided with a gating camera.
Figure 22B:
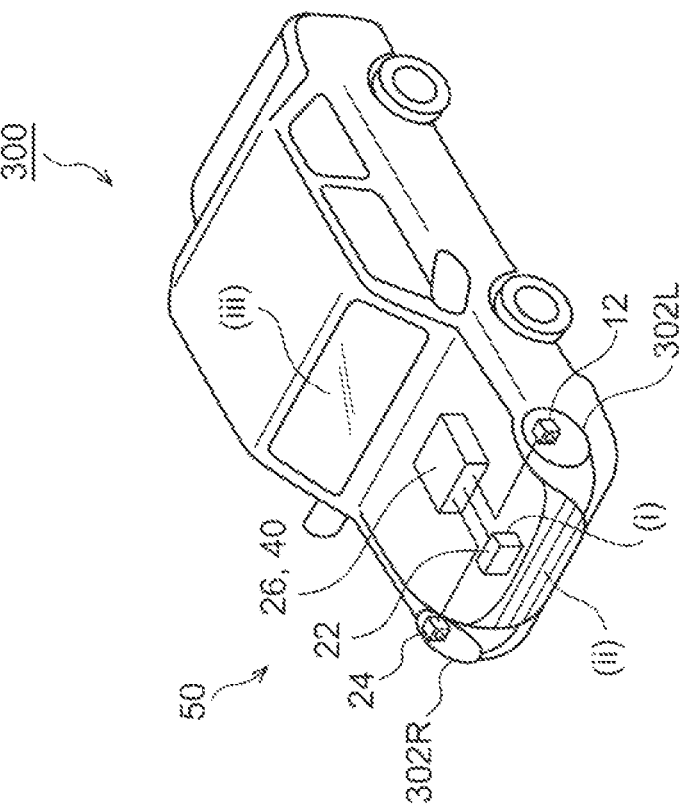

FIGS. 22A and 22B are diagrams showing an automobile 300 provided with the gating camera 20. Referring to FIG. 22A, the automobile 300 includes headlamps (lamps) 302L and 302R. The automobile 300 shown in FIG. 22A includes a single illumination apparatus 22 at a central position of the vehicle. Furthermore, the left and right headlamps 302L and 302R respectively include the visible-light camera 12 and the infrared camera 24 as built-in components thereof. In a case in which parallax between the visible-light camera 12 and the infrared camera 24 is large, parallax correction processing may be implemented in the processing device 40. The position of the illumination apparatus 22 is not restricted in particular. For example, the illumination apparatus 22 may be provided to a front bumper (i) or a front grille (ii). Also, the illumination apparatus 22 may be provided to the back side of a rear-view mirror on the inner side of the front window (iii). Also, the position of the controller 26 is not restricted in particular. The controller 26 may be provided in the engine compartment or the vehicle interior. Also, the controller 26 may be built into the headlamp.

Referring to FIG. 22B, the single illumination apparatus 22 includes multiple (e.g., two) light sources 22A and 22B. The multiple light sources 22A and 22B emit light at the same timing such that the output light of the multiple light sources 22A and 22B forms one probe light. The multiple light sources 22A and 22B are built into the left and right headlamps 302L and 302R, respectively.

The visible-light camera 12 and the infrared camera 24 may be built into one from among the headlamps 302L and 302R. This arrangement does not require parallax correction between the visible-light camera 12 and the infrared camera 24, thereby allowing the processing by the processing device 40 to be reduced.

The visible-light camera 12 and the infrared camera 24 may each be arranged as an external component of the headlamps 302L and 302R. For example, the visible-light camera 12 and the infrared camera 24 may be provided in the vicinity of the illumination apparatus 22.

Figure 23:
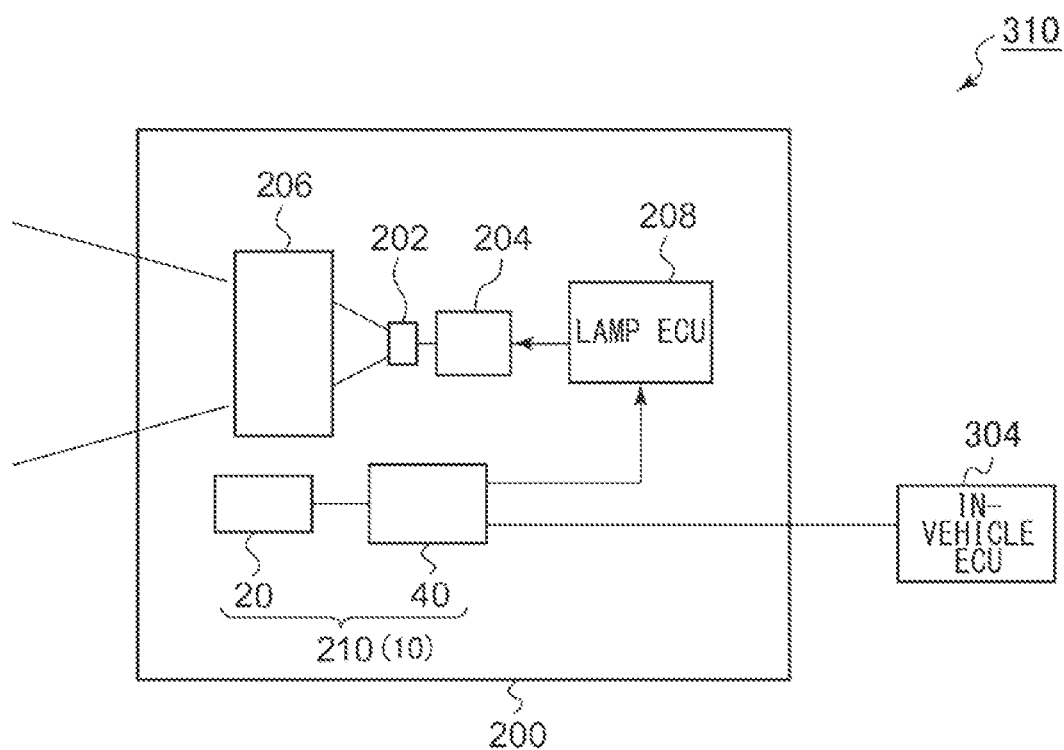
FIG. 23 is a block diagram showing an automotive lamp provided with an object identification system.

FIG. 23 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the gating camera 20 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

Embodiment 3

First, description will be made regarding a problem relating to an embodiment 3.

The object identification system employing visible light has a problem of a decrease in the identification rate at night. Accordingly, the present inventor investigated an arrangement in which an active sensor is mounted on an automobile so as to provide object identification using an image generated by the active sensor. The active sensor is configured to emit probe light such as infrared light or the like, and to capture an image of reflected light from an object by means of a camera.

As the light (infrared light) propagation distance becomes longer, attenuation of the light becomes larger. Accordingly, as the distance to an object becomes larger, the amount of light that reaches the object becomes smaller, and the amount of light reflected from the object becomes smaller. That is to say, in a case in which an image of the same object is captured, as the distance to the object becomes larger, the pixel values of an image of the object become lower, leading to the generation of a dark image.

The classifier used for the object identification is implemented based on a prediction model generated by performing machine learning using an image of an object to be identified as teacher data. Accordingly, in a case in which the prediction model is generated using an image of an object that exists at a predetermined distance as the teacher data, such an arrangement has the potential to have a problem of drastic reduction of the identification rate for an image captured when the same object exists at a different distance. In order to solve this problem, in a case in which an image of the same object is captured at various distances so as to generate the teacher data, this leads to an enormous learning cost.

The invention relating to the embodiment 3 has been made in view of such a situation. Accordingly, it is an exemplary purpose of an embodiment of the present invention to provide an object identification system employing an active sensor with an improved identification rate.

Overview of Embodiment 3

An embodiment disclosed in the present specification relates to an object identification system. The object identification system includes: a gating camera structured to divide the depth direction into multiple ranges, and to capture an image for each range while changing a time difference between light emission and exposure, so as to generate multiple slice images that correspond to the multiple ranges; and a processing device structured to have multiple first correction characteristics defined corresponding to the multiple ranges, to correct each of the multiple slice images using the corresponding first correction characteristics, and to judge the kind of an object based on the multiple slice images thus corrected.

In this embodiment, the gating camera is employed as an active sensor. With the gating camera, the distance to each range is known. Accordingly, the first correction characteristics are determined giving consideration to attenuation characteristics of the light propagation path or the light divergence angle of the light to be emitted. Furthermore, an image is corrected using the first correction characteristics. Such an arrangement allows similar images to be acquired regardless of the position of the object. This provides an improved object identification rate.

Also, the first correction characteristics that correspond to each range may be changed according to a measurement environment. Infrared light has a characteristic of being readily absorbed by water. Accordingly, with the gating camera using infrared light, there is a difference in the attenuation rate between rainy weather, dense fog, and clear weather. Also, the attenuation rate differs due to humidity. Also, dust particles such as PM2.5 can have an effect on the attenuation rate. Accordingly, with such an arrangement in which the first correction characteristics are changed according to the measurement environment, this provides a further improved identification rate.

Also, the processing device may hold multiple second correction characteristics defined corresponding to the multiple ranges. Also, the processing device may correct each of the multiple slice images using the corresponding second correction characteristics, and may combine the multiple slice images thus corrected.

Also, an image obtained by combining the multiple corrected slice images may be displayed on a display.

Another embodiment of the present invention relates to a processing device. The processing device is used so as to form an object identification system together with a gating camera structured to divide the depth direction into multiple ranges, and to capture an image for each range while changing a time difference between light emission and exposure, so as to generate multiple slice images that correspond to the multiple ranges. The processing device includes: a first correction unit structured to have multiple first correction characteristics defined corresponding to the multiple ranges, and to correct each of the multiple slice images using the corresponding first correction characteristics; and a classifier structured to judge the kind of an object based on the multiple corrected slice images.

Also, the processing device may further include a second correction unit structured to have multiple second correction characteristics defined corresponding to the multiple ranges, and to correct each of the multiple slice images using the corresponding second correction characteristics; a combining unit structured to combine the multiple slice images corrected by the second correction unit; and an output unit structured to output an image generated by the combining unit on a display.

Description will be made below regarding the embodiments 3-1 through 3-4 with reference to the drawings.

Embodiment 3-1

Figure 24:
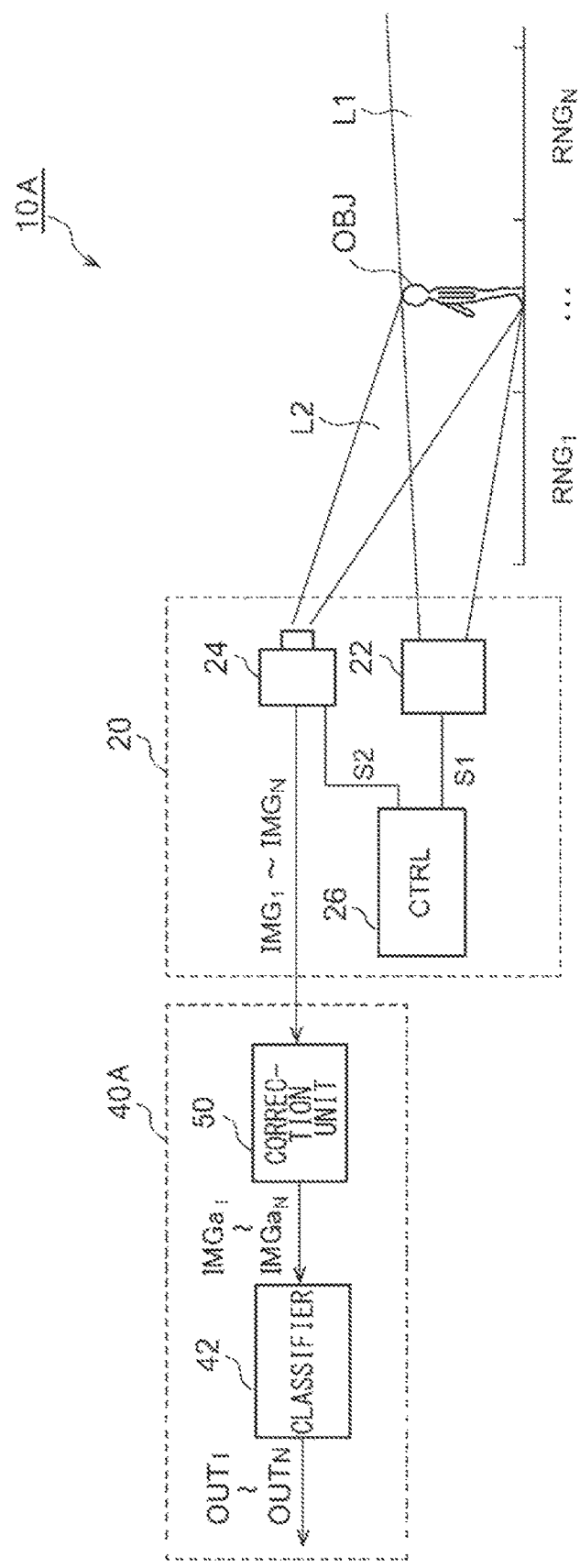
FIG. 24 is a block diagram showing an object identification system according to an embodiment 3-1.

FIG. 24 is a block diagram showing an object identification system 10A according to an embodiment 3-1. The object identification system 10A is mounted on a vehicle such as an automobile, motorcycle, or the like. The object identification system 10A judges the kind (which will also be referred to as a "category" or "class") of an object OBJ that exists in the vicinity of the vehicle.

The object identification system 10A mainly include a gating camera 20 and a processing device 40A. The gating camera 20 includes an illumination apparatus 22, an image sensor 24, and a controller 26. The gating camera 20 captures images for a plurality of N (N≥2) ranges $RNG_1$ through $RNG_N$ divided in the depth direction. The ranges may be designed such that adjacent ranges overlap at their boundaries in the depth direction.

The illumination apparatus 22 emits probe light L1 in front of the vehicle in synchronization with a light emission timing signal S1 supplied from the controller 26. As the probe light L1, infrared light is preferably employed. However, the present invention is not restricted to such an arrangement. Also, visible light having a predetermined wavelength may be employed. Also, ultraviolet light may be employed.

The image sensor 24 is configured to support exposure control in synchronization with an image capture timing signal S2 supplied from the controller 26, and to be capable of generating a slice image IMG. The image sensor 24 is sensitive to the same wavelength as that of the probe light L1. The image sensor 24 captures an image of reflected light (returned light) L2 reflected by the object OBJ.

The controller 26 changes the light emission timing signal S1 and the image capture timing signal S2 for each range RNG, so as to change the difference in the timing between the light emission operation of the illumination apparatus 22 and the exposure operation of the image sensor 24. The gating camera 20 generates the slice images $IMG_1$ through $IMG_N$ that correspond to the multiple ranges $RNG_1$ through $RNG_N$. The i-th slice image $IMG_i$ includes only an image of the object included in the corresponding range $RNG_i$.

Figure 25:
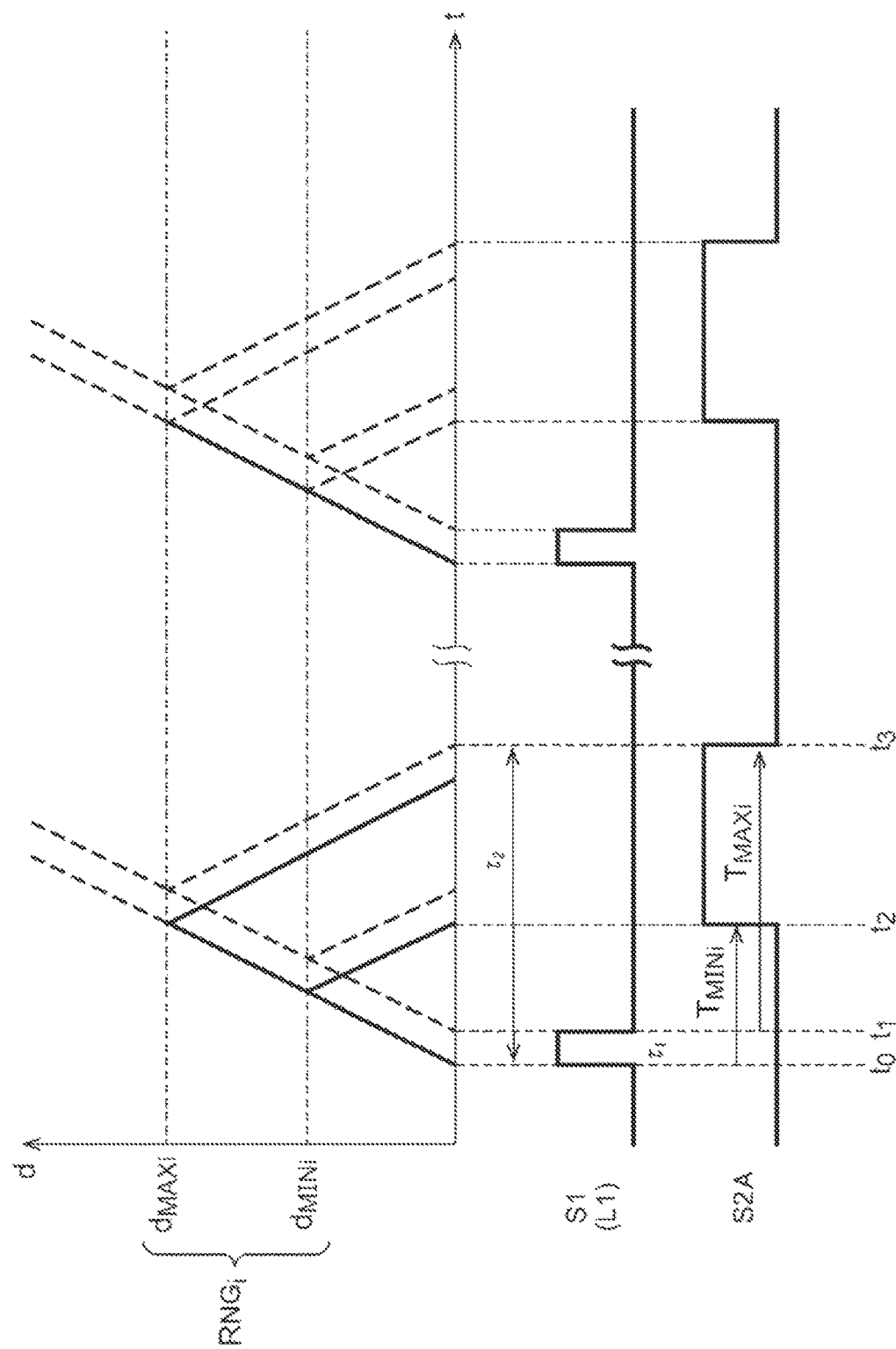
FIG. 25 is a diagram for explaining the operation of the gating camera.

FIG. 25 is a diagram for explaining the basic operation of the gating camera 20. FIG. 25 shows the operation when the i-th range $RNG_i$ is measured. The illumination apparatus 22 emits light during a light emission period $\tau_1$ from the time points $t_0$ to $t_1$ in synchronization with the light emission timing signal S1. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the illumination apparatus 22 at a given time point, to the arrival of the light at the distance $d_{MINi}$, up to the return of the reflected light to the image sensor 24, is represented by $T_{MINi} = 2 \times d_{MINi}/c$. Here, c represents the speed of light.

Similarly, the round-trip time $T_{MAXi}$, which is a period from the departure of light from the illumination apparatus 22 at a given time point, to the arrival of the light at the distance $d_{MAXi}$, up to the return of the reflected light to the image sensor 24, is represented by $T_{MAXi}=2\times d_{MAXi}/c$.

When only an image of an object OBJ included in the range $RNG_i$ is to be captured, the controller 26 generates the image capture timing signal S2A so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau_2$.

FIGS. 26A and 26B are diagrams for explaining an image generated by the gating camera 20. FIG. 26A shows an example in which an object (pedestrian) $OBJ_2$ exists in the range $RNG_2$, and an object (vehicle) $OBJ_3$ exists in the range $RNG_3$. FIG. 26B shows multiple slice images $IMG_1$ through $IMG_3$ acquired in the situation shown in FIG. 26A. When the slice image $IMG_1$ is captured, the image sensor is exposed by only the reflected light from the range $RNG_1$. Accordingly, the slice image $IMG_1$ includes no object image.

When the slice image $IMG_2$ is captured, the image sensor is exposed by only the reflected light from the range $RNG_2$. Accordingly, the slice image $IMG_2$ includes only the object image $OBJ_2$. Similarly, when the slice image $IMG_3$ is captured, the image sensor is exposed by only the reflected light from the range $RNG_3$. Accordingly, the slice image $IMG_3$ includes only the object image $OBJ_3$. As described above, with the gating camera 20, this arrangement is capable of capturing object images in the form of separate images for the respective ranges.

Returning to FIG. 24, the processing device 40A is configured to identify the kind of an object based on the multiple slice images $IMG_1$ through $IMG_N$ that correspond to the range $RNG_1$ through $RNG_N$ generated by the gating camera 20. The processing device 40A is provided with the classifier 42 implemented based on a prediction model generated by machine learning. The algorithm employed by the classifier 42 is not restricted in particular. Examples of the algorithms that can be employed include You Only Look Once (YOLO), Single Shot MultiBox Detector (SSD), Region-based Convolutional Neural Network (R-CNN), Spatial Pyramid Pooling (SPPnet), Faster R Deconvolution-SSD (DSSD), Mask R-CNN, etc. Also, other algorithms that will be developed in the future may be employed.

The processing device 40A may be configured as a combination of a processor (hardware component) such as a Central Processing Unit (CPU), Micro Processing Unit (MPU), microcontroller, or the like, and a software program to be executed by the processor (hardware component). Also, the processing device 40A may be configured as a combination of multiple processors. Alternatively, the processing device 40A may be configured as a hardware component alone.

The processing device 40 includes a first correction unit 50 provided as an upstream stage of the classifier 42. Multiple correction characteristics (which will be referred to as a "set of correction characteristics") that correspond to the multiple ranges $RNG_1$ through $RNG_N$ are defined in the first correction unit 50. The correction characteristics can be represented in the form of a function $p'=f(p)$ with the pixel value p before correction as an argument (input), and with the output of the pixel value after correction as an output.

The first correction unit 50 corrects each of the multiple slice images $IMG_1$ through $IMG_N$ using the corresponding one from among the correction characteristics $f_1(p)$ through $f_N(p)$, so as to generate the slice images $IMGa_1$ through $IMGa_N$ after the correction.

The correction characteristics $f_i(p)$ are defined corresponding to the i-th range $RNG_i$. In an example, the correction characteristics $f_i(p)$ is defined with only the pixel value as its argument without depending on the pixel position. In this case, as described above, the following relation holds true between the pixel value p of a given pixel included in an image before correction and the pixel value of the pixel included in the image after correction.

$$p'=f_i(p)$$

FIGS. 27A through 27D are diagrams showing several examples of the correction characteristics f. Description will be made with reference to FIG. 27A. In this example, a set of the correction characteristics $f_1(p)$ through $f_N(p)$ are each defined as a linear function, and are represented by the following Expression. Here, "$\alpha_i$" represents a correction coefficient defined for each range. As the range becomes farther, the value of the correction coefficient $\alpha_i$ becomes larger. It should be noted that p' is clamped when it reaches its maximum value.

$$p'=f_i(p)=\alpha_i \times p$$

The correction using the set of the correction characteristics corresponds to the exposure correction.

Figure 27A:
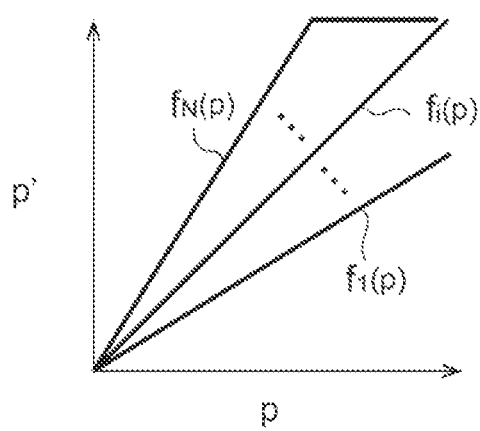
FIGS. 27A through 27D are diagrams showing several examples of correction characteristics.
Figure 27B:
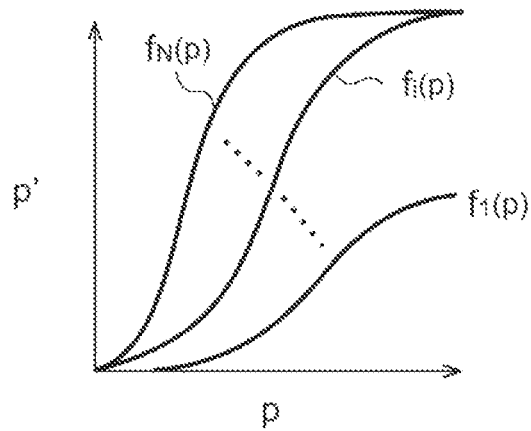

Description will be made with reference to FIG. 27B. In this example, a set of the correction characteristics $f_i(p)$ through $f_N(p)$ each have a so-called S-curve. Such an S-curve provides an effect of raising the image contrast.

With the normalized S-curve as S(p), the correction characteristics may be defined as follows.

$$p'=f'(p)=\alpha_i \times S(p)$$

Alternatively, the correction characteristics may be defined as follows.

$$p'=f_i(p)=S(\alpha_i \times p)$$

Figure 27C:
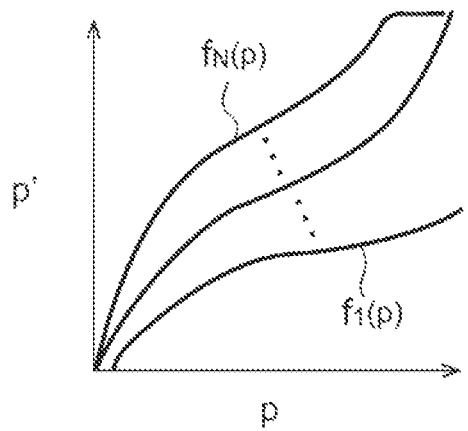

Description will be made with reference to FIG. 27C. In this example, a set of the correction characteristics $f_1(p)$ through $f_N(p)$ each have a so-called inverse S-curve. Such an inverse S-curve provides an effect of reducing the image contrast. With the normalized inverse S-curve as INVS(p), the correction characteristics may be defined as follows.

$$p'=f_i(p)=\alpha_i \times INVS(p)$$

Alternatively, the correction characteristics may be defined as follows.

$$p'=f_i(p)=INVS(\alpha_i \times p)$$

Figure 27D:
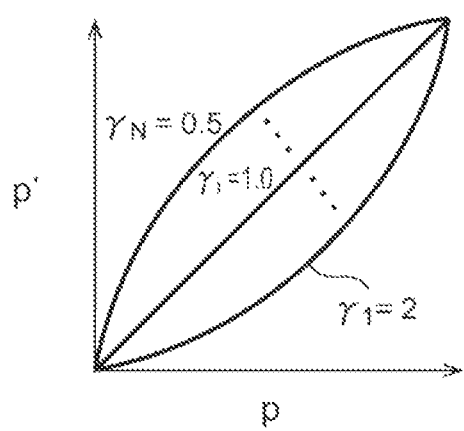

Description will be made with reference to FIG. 27D. In this example, a set of the correction characteristics $f_1(p)$ through $f_N(p)$ each provide so-called gamma correction.

$$p'=f_i(p)=p^{\gamma_i}$$

Here, $\gamma_i$ represents a gamma correction value for the i-th range.

It should be noted that the correction characteristics are not restricted to those shown in FIGS. 27A through 27D. Also, the correction characteristics may be defined as a quadratic function or a higher-order function. Also, the correction characteristics may be defined using an exponential function or a trigonometric function. Also, the correction characteristics are not necessarily required to be defined in the form of a function. That is to say, the processing device 40 may hold a function f(p) that represents the correction characteristics, and may input a value p to the function f(p) so as to acquire the output p. Also, the processing device 40 may hold a lookup table for defining the relation between the input p and the output p'.

Description has been made with reference to FIGS. 27A through 27D regarding an arrangement in which a set of the correction characteristics $f_1(p)$ through $f_N(p)$ are represented as the same type of function with different parameters (α or γ). However, the present invention is not restricted to such an arrangement. Also, different types of functions may be employed for the respective ranges.

That is to say, such a set of the correction characteristics $f_1(p)$ through $f_N(p)$ may preferably be defined so as to provide the classifier 42 configured as a downstream stage with an improved object identification rate.

Returning to FIG. 24, the first correction unit 50 supplies the corrected slice images $IMGa_1$ through $IMGa_N$ to the classifier 42. The classifier 42 distinguishes the kind of an object included in each slice image $IMGa_i$ for each of the corrected slice images $IMGa_1$ through $IMGa_N$.

For example, the output (which will be referred to as "detection data") $OUT_i$ (i=1, 2, ..., N) of the classifier 42 includes size information (position information) with respect to each object image included in the i-th image data $IMGa_i$ and the kind (category) information thereof. The detection data OUT may include information with respect to a bounding box for each object. The kind information may indicate the possibility (matching probability) of the object matching each of multiple kinds. Also, the kind information may include an identifier that indicates the kind that matches a possible object with the highest belonging probability.

The above is the configuration of the object identification system 10A. Next, description will be made regarding the operation thereof.

Figure 28A:
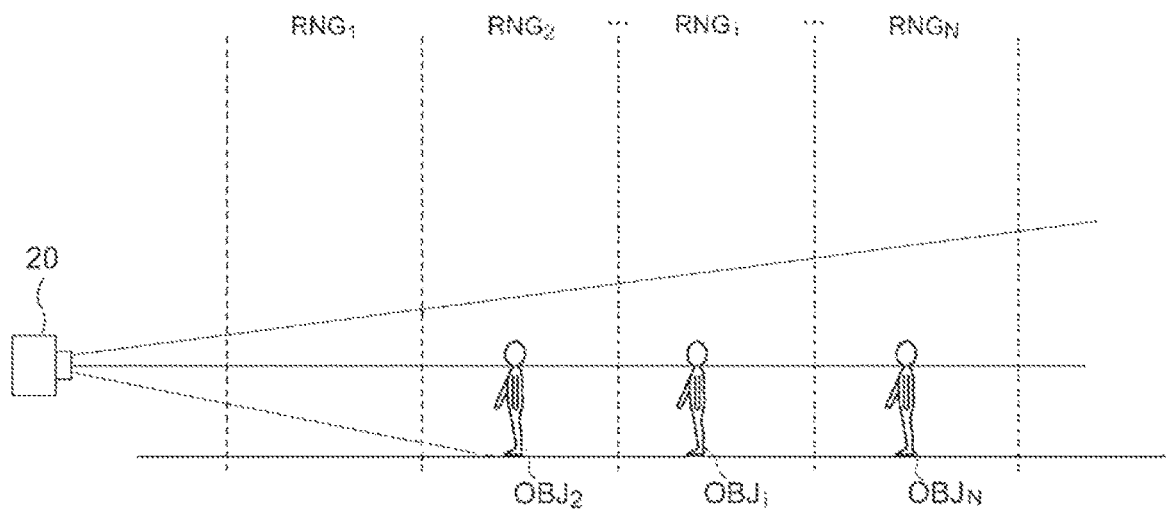
FIGS. 28A and 28B are diagrams for explaining an image capture operation of the gating camera.
Figure 28B:
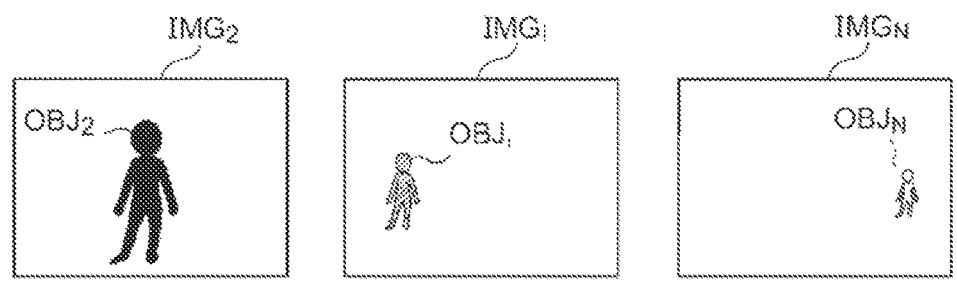

FIGS. 28A and 28B are diagrams for explaining the image capture by the gating camera 20. FIG. 28A is a diagram showing a given measurement situation as viewed from the side. FIG. 28B shows images captured by the gating camera 20. In this example, objects (humans) $OBJ_2$, $OBJ_i$, and $OBJ_N$ exist in the ranges $RNG_2$, $RNG_i$, and $RNG_N$.

In the images shown in FIG. 28B, the hatching density represents the magnitude of the pixel value. In a case in which an image of an object (human) having the same reflection ratio is captured, the pixel values of the object image when it exists in the slice image $IMG_2$ that corresponds to a near-distance range are larger than those when it exists in the slice image $IMG_N$ that corresponds to a far-distance range.

Figure 29A:
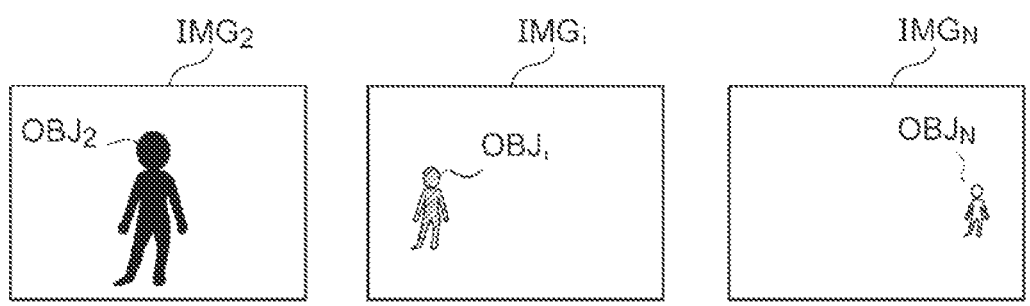
FIGS. 29A and 29B are diagrams for explaining correction by a first correction unit.
Figure 29B:
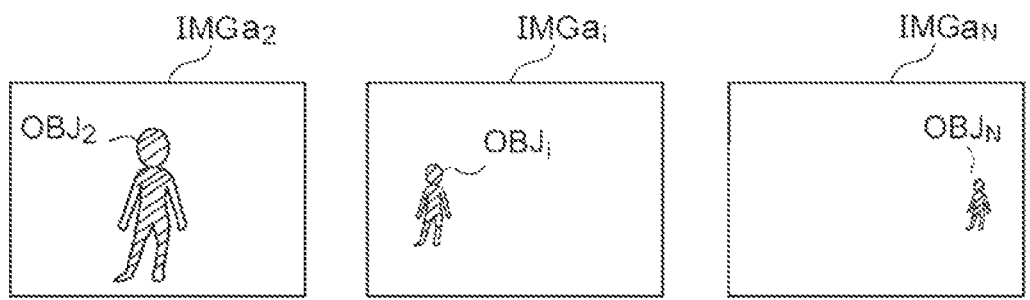

FIGS. 29A and 29B are diagrams for explaining the correction by the first correction unit 50. Description will be made below assuming that the correction characteristics shown in FIG. 27A are employed. With such an arrangement, different exposure correction is applied for each range, thereby generating the corrected slice images $IMGa_2$, $IMGa_i$, and $IMGa_N$. Specifically, the correction characteristics $f_2(p)$, which apply negative exposure correction, are applied to the slice image $IMG_2$ in a near-distance range. On the other hand, the correction characteristics $f_N(p)$, which apply positive exposure correction, are applied to the slice image $IMG_N$ in a far-distance range. As a result, the pixel values (hatching density in the drawings) of each object image are corrected such that they become approximately the same values for the corrected slice images $IMGa_2$, $IMGa_i$, and $IMGa_N$.

If the slice images $IMG_2$, $IMG_i$, and $IMG_N$ before correction are input to the classifier 42, correct judgement of the existence of a human can be made for a particular image (e.g., $IMG_i$). However, such an arrangement has the potential to have a problem in that correct judgment of the existence of a human cannot be made for different images (e.g., $IMG_2$ and $IMG_N$). In contrast, with such an arrangement in which the corrected slice images $IMGa_2$, $IMGa_i$, and $IMGa_N$ are input to the classifier 42, this enables the judgement that an object included in each slice image matches a human.

The above is the operation of the object identification system 10A. With the object identification system 10A, this provides an improved object identification rate.

Embodiment 3-2

Figure 30:
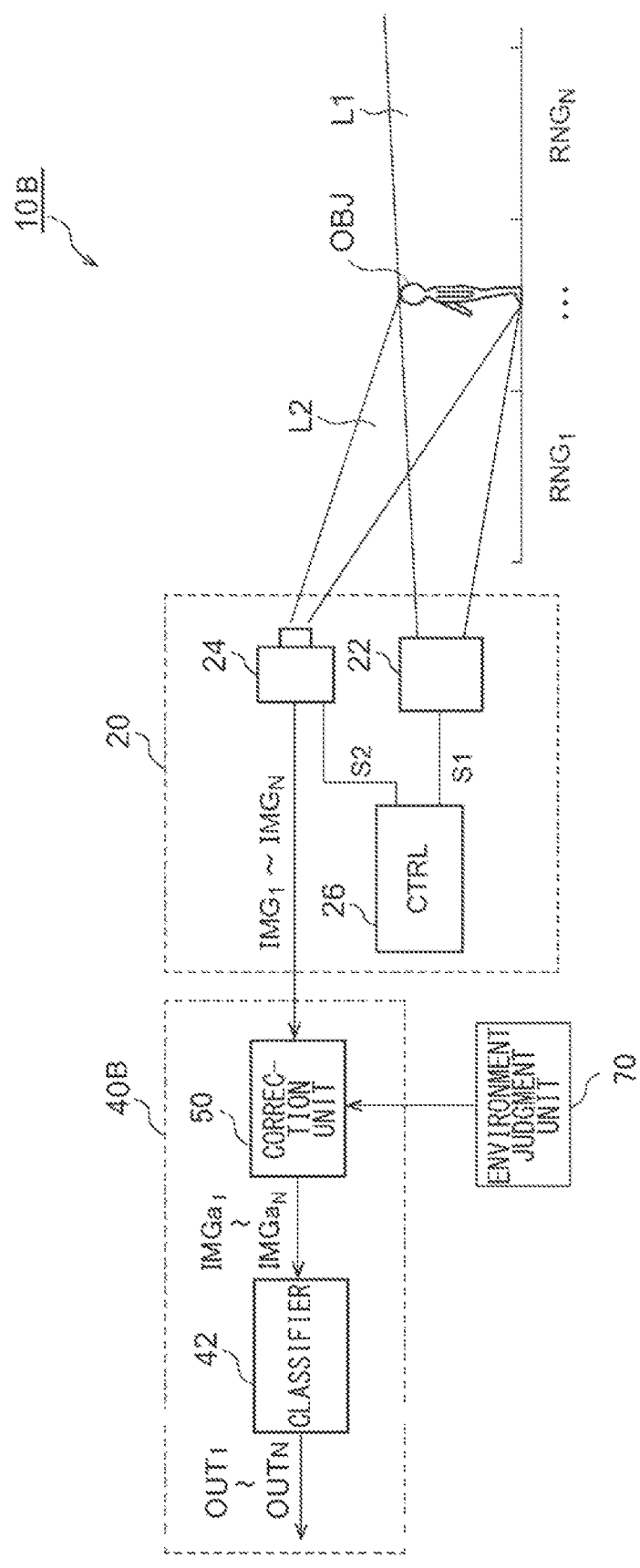
FIG. 30 is a block diagram showing an object identification system according to an embodiment 3-2.

FIG. 30 is a block diagram showing an object identification system 10B according to an embodiment 3-2. In the embodiment 3-2, the first correction characteristics for each range are changed according to the measurement environment. Infrared light has a characteristic of being readily absorbed by water. Accordingly, in rainy weather or dense fog, the first correction characteristics may preferably be changed so as to raise the correction level.

The first correction unit 50 of a processing device 40B holds multiple sets of first correction characteristics defined corresponding to multiple environments. The set of the first correction characteristics may preferably be defined for each environment having different propagation characteristics (attenuation characteristics) of the probe light L1 and the reflected light L2. For example, multiple sets of the first correction characteristics may be defined according to the weather (sunny, rainy, cloudy, foggy). Also, multiple sets of the first correction characteristics may be defined according to the measurement time of day (day, night, dusk). In a case in which the object identification system 10 is mounted on a moving vehicle such as an automobile or the like, multiple sets of the first correction characteristics may be defined according to multiple driving situations.

The image display system 10B includes an environment judgment unit 70. The environment judgment unit 70 judges the current measurement environment (weather, time of day, driving situation), and notifies the first correction unit 50 of this information. The first correction unit 50 selects one from among the multiple first correction characteristics based on the notice thus received from the environment judgment unit 70. Subsequently, the first correction unit 50 corrects the image for each range using the set of the correction characteristics thus selected.

With the embodiment 3-2, this provides a further improved object identification rate as compared with the embodiment 3-1.

Embodiment 3-3

Figure 31:
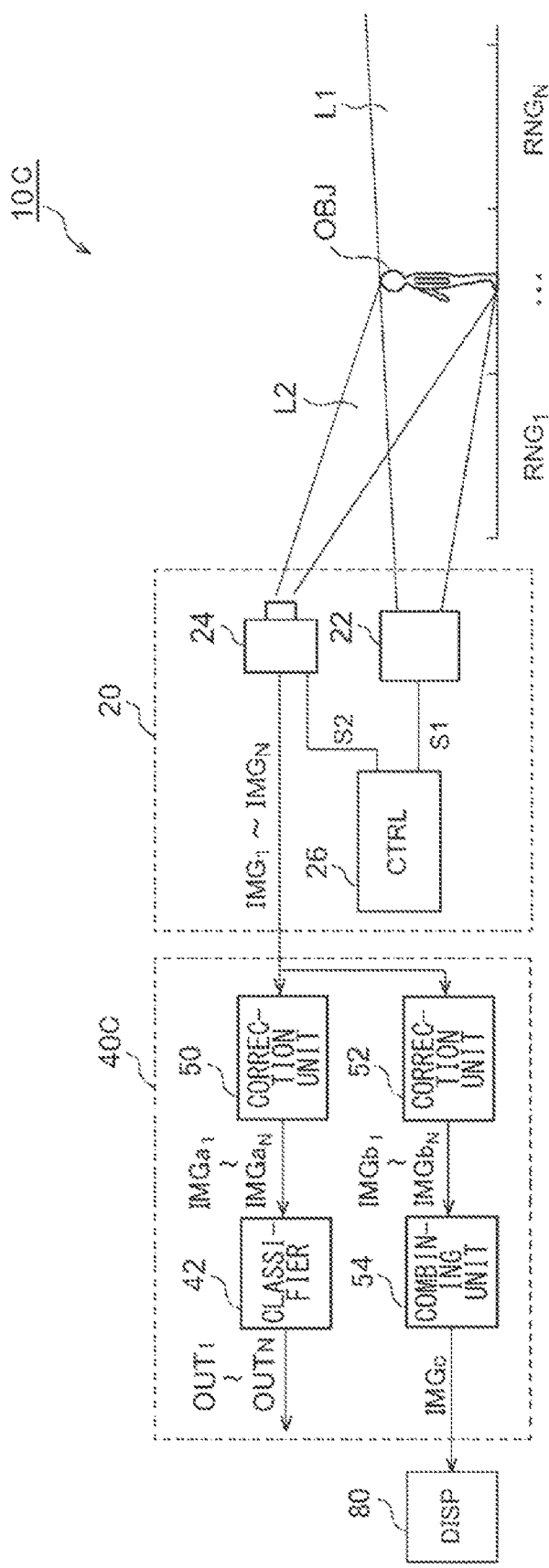
FIG. 31 is a block diagram showing an object identification system according to an embodiment 3-3.

FIG. 31 is a diagram showing an object identification system 10C according to an embodiment 3-3. In the object identification system 10C, a processing device 40C further includes a second correction unit 52 and a combining unit 54.

The second correction unit 52 holds multiple second correction characteristics (which will be referred to as a "set of multiple second correction characteristics") defined corresponding to the multiple ranges $RNG_1$ through $RNG_N$. In the same manner as the first correction characteristics, the second correction characteristics can each be represented by a function p'=g (p) with the pixel value p before correction as an argument (input) and with the pixel value after the correction as an output.

The second correction unit 52 corrects each of the multiple slice images $IMG_1$ through $IMG_N$ using the corresponding second correction characteristics from among $g_1(p)$ through $g_N(p)$, and generates the corrected slice images $IMGb_1$ through $IMGb_N$.

The second correction characteristics $g_i(p)$ are defined corresponding to the i-th range $RNG_i$. In an example, the second correction characteristics $g_i(p)$ are defined with only the pixel value as an argument without depending on the pixel position. In this case, as described above, the following relation holds true between the pixel value p of a given pixel included in an image before the correction and the pixel value p' of the pixel in the corrected image.

$$p'=g_i(p)$$

The corrected slice images $IMGb_1$ through $IMGb_N$ are input to the combining unit 54. The combining unit 54 recombines the corrected slice images $IMGb_1$ through $IMGb_N$ so as to generate a single slice image IMGc. The slice image IMGc thus combined is displayed on a display 80, so as to present the slice image IMGc thus combined to the user.

The object identification system 10C is mounted on an automobile, for example. In this case, the display 80 is arranged at the driver's seat so as to allow the infrared slice image IMGc thus recombined to be displayed to the driver.

The above is the configuration of the object identification system 10C. Next, description will be made regarding the operation thereof. Description has been made regarding the classifier 42 with an improved object identification rate. Accordingly, description will be made regarding an image display operation of the display 80.

Figure 32A:
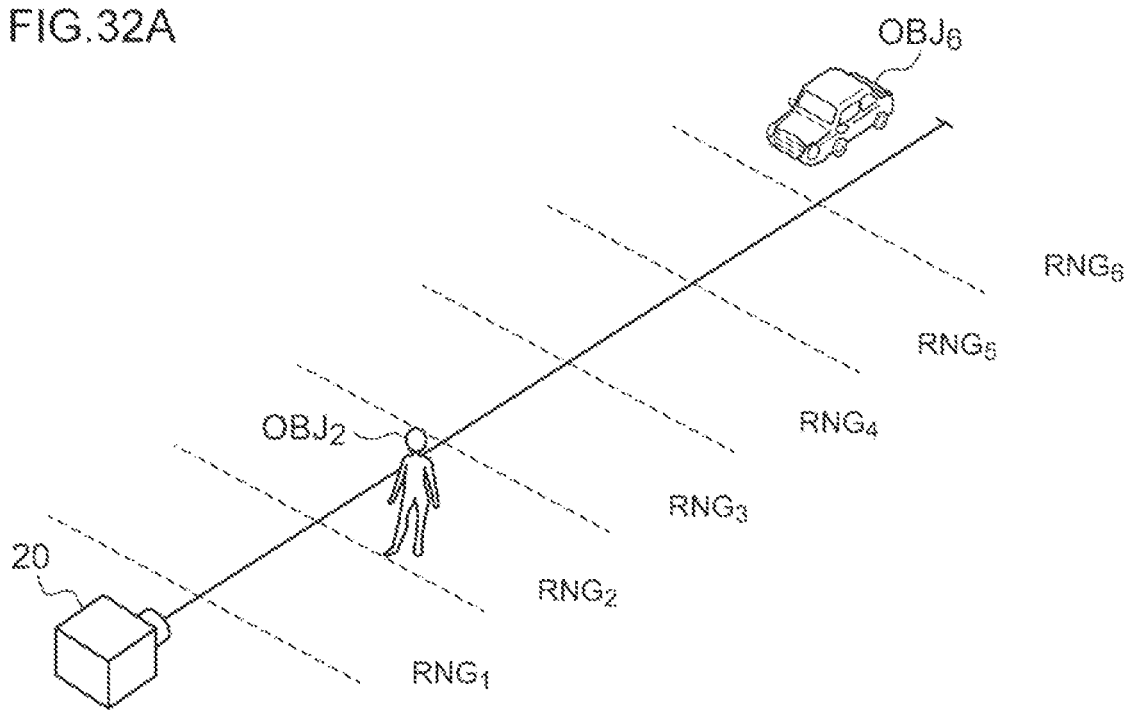
FIGS. 32A through 32D are diagrams for explaining the image display operation of the object identification system.

FIGS. 32A through 32D are diagrams for explaining the image display by the object identification system 10C. FIG. 32A is a perspective view showing a measurement situation. An object (human) $OBJ_2$ exists in the range $RNG_2$, and an object (automobile) $OBJ_6$ exists in the range $RNG_6$.

Figure 32B:
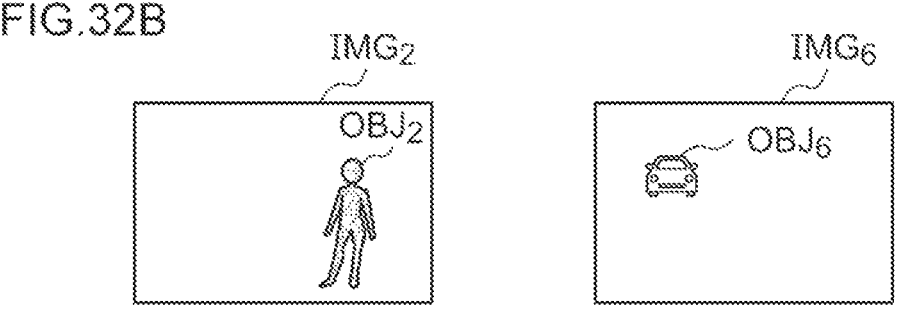
Figure 32C:
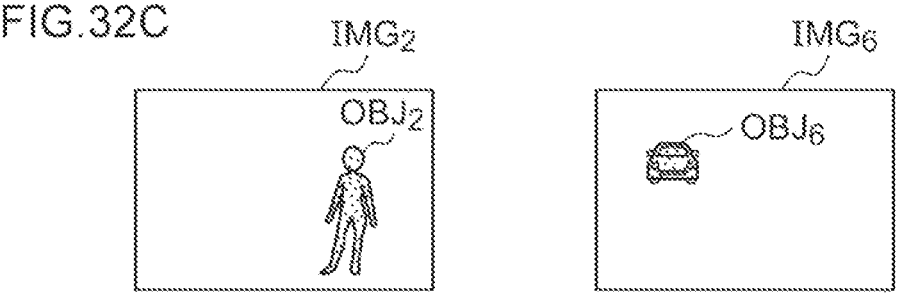
Figure 32D:
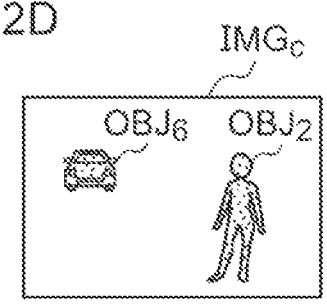

FIG. 32B shows the slice images $IMG_2$ and $IMG_6$ generated by the gating camera 20 in the situation shown in FIG. 32A. In the slice image $IMG_2$ in the near-distance range $RNG_2$, the object image of the object $OBJ_2$ has large pixel values. Conversely, in the slice image $IMG_6$ in the far-distance range, the object image of the object $OBJ_6$ has small pixel values. In FIGS. 32B through 32D, the pixel value is represented by the dot density. That is to say, a portion with a low dot density represents a dark image portion on the display.

In a case in which the two slice images $IMG_2$ and $IMG_6$ shown in FIG. 32B are combined as they are and the image thus combined is displayed on a display, a human image $OBJ_2$ in the near distance is displayed as a bright object image. However, the automobile image $OBJ_6$ in the far distance is displayed as a very dark image. Accordingly, it is difficult for the user to recognize the automobile $OBJ_6$.

In order to solve this problem, with the embodiment 3-3, the second correction unit 52 corrects the slice images $IMG_2$ and $IMG_6$. In the corrected slice images $IMGb_2$ and $IMGb_6$, the two object images $OBJ_2$ and $OBJ_6$ are corrected such that they have pixel values on the same order or a similar order. Furthermore, the image contrast is optimized as necessary so as to allow the user to easily view the object images. Subsequently, the corrected slice images $IMGb_1$ through $IMGb_N$ are combined so as to generate the combined slice image IMGc. The combined slice image IMGc is corrected such that the two object images $OBJ_2$ and $OBJ_6$ have pixel values on the same order or a similar order. Accordingly, when the combined slice image IMGc is displayed on the display 80, this allows the user to easily recognize both the human $OBJ_2$ and the automobile $OBJ_6$.

Embodiment 3-4

Figure 33:
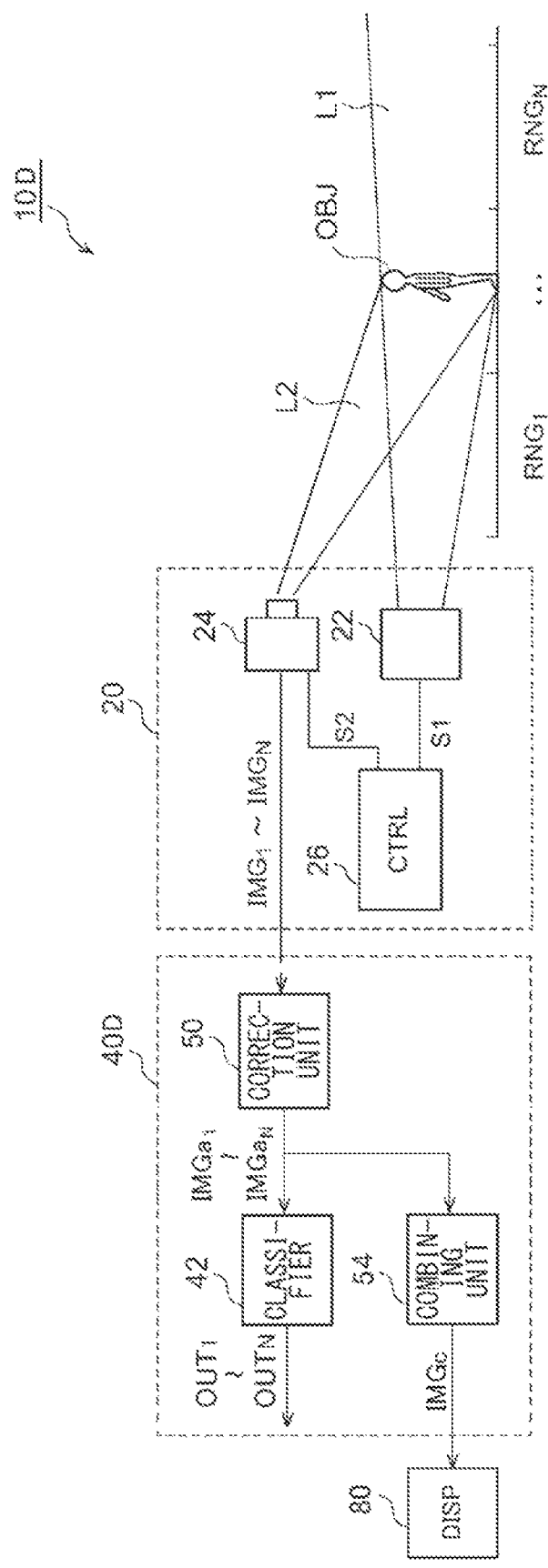
FIG. 33 is a diagram showing an object identification system according to an embodiment 3-4.

FIG. 33 is a diagram showing an object identification system 10D according to an embodiment 3-4. In the embodiment 3-4, the first correction characteristics $f_i$ and the second correction characteristics $g_i$ are designed to be the same for the same range $RNG_i$. In this case, the second correction unit 52 may preferably be omitted. Also, the corrected slice images $IMGa_1$ through $IMGa_N$ corrected by the first correction unit 50 may preferably be input to the combining unit 54.

Description will be made regarding a modification relating to the embodiment 3.

Modification 3-1

Description has been made in the embodiment regarding an arrangement in which, when a single image is corrected, all the pixels are corrected according to the same correction characteristics. However, the correction characteristics may have position dependance. That is to say, the correction characteristics may be defined as a function with the pixel position as an argument in addition to the pixel value p.

Usage

Figure 34:
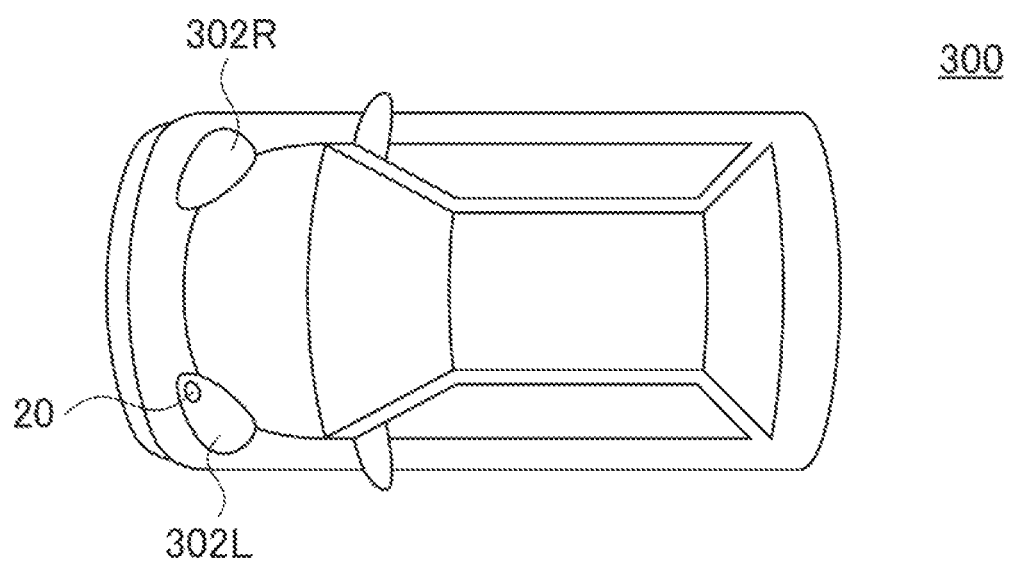
FIG. 34 is a block diagram showing an automobile provided with an object identification system.

FIG. 34 is a block diagram showing an automobile provided with the object identification system 10. An automobile 300 is provided with headlamps 302L and 302R. The object identification system 10 is built into at least one from among the headlamps 302L and 302R. Each headlamp 302 is positioned at a frontmost end of the vehicle body, which is most advantageous as a position where the gating camera 20 is to be installed for detecting an object in the vicinity.

Figure 35:
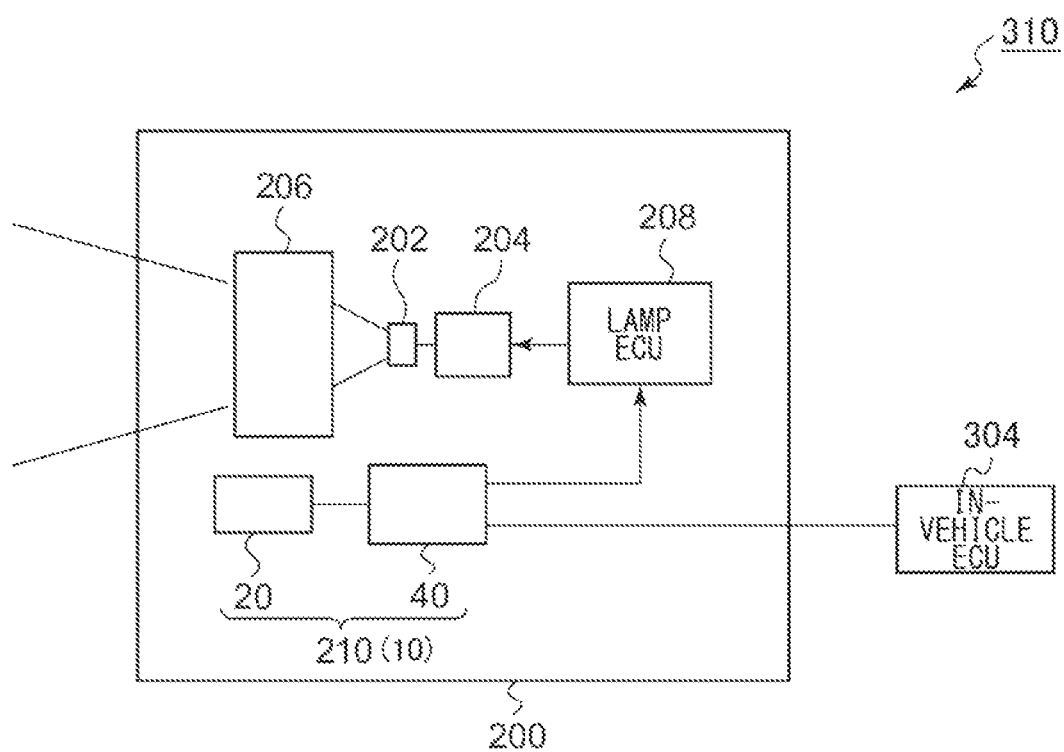
FIG. 35 is a block diagram showing an automotive lamp provided with an object identification system.

FIG. 35 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the gating camera 20 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

Embodiment 4

First, description will be made regarding the problems relating to an embodiment 4.

When the vehicle is traveling at night or at dusk, it is difficult for the driver to see an object in the vicinity. In order to compensate for this difficulty, the present inventor has investigated an image display system in which an active sensor using infrared light is installed on a vehicle, and a captured image is displayed on a display so as to be presented to the driver.

Figure 36A:
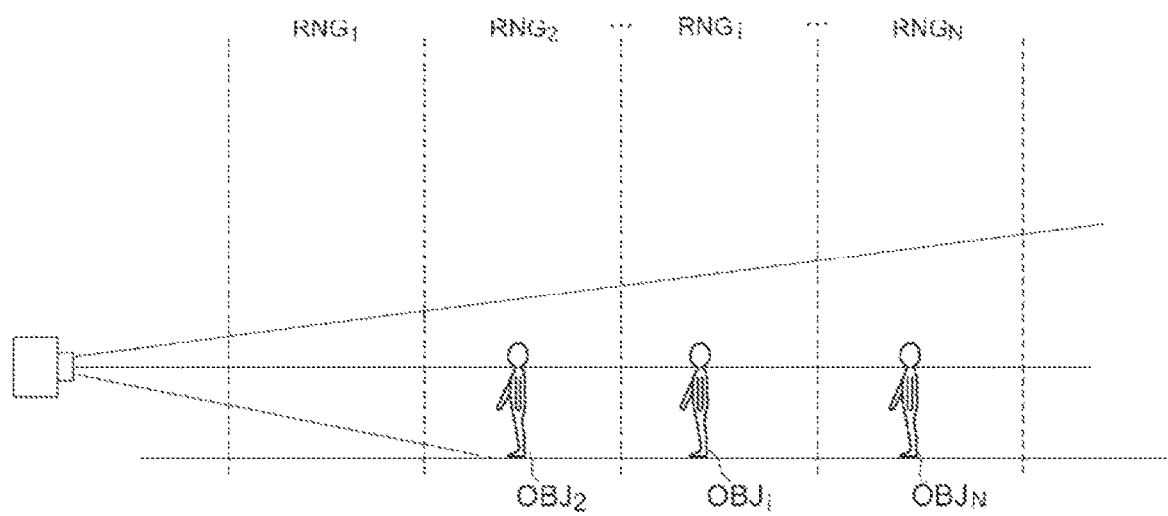
FIGS. 36A and 36B are diagrams for explaining the characteristics of a conventional active sensor.
Figure 36B:
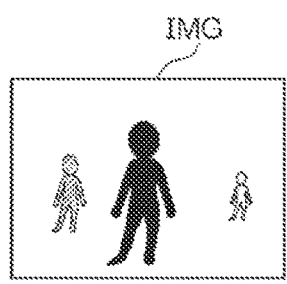

FIGS. 36A and 36B are diagrams for explaining the characteristics of a conventional active sensor. FIG. 36A is a diagram showing an image capture situation as viewed from the side. FIG. 36B shows an image captured by the active sensor in the image capture situation shown in FIG. 36A.

Light (infrared light) attenuates as the propagation distance becomes longer. Accordingly, as the distance to an object becomes larger, the amount of light that reaches the object becomes smaller, and the amount of light reflected from the object becomes smaller. That is to say, in a case of employing the active sensor, an image of a near-distance object is captured as a bright image, and an image of a far-distance object is captured as a dark image. Accordingly, in a case in which such images are displayed as they are, there is a large difference in appearance between the object images depending on the distance to the object.

The invention relating to the embodiment 4 has been made in view of such a situation. Accordingly, it is an exemplary purpose of an embodiment of the invention to provide an image display system that is capable of displaying an image in an easy-to-see form.

Overview of Embodiment 4

An embodiment disclosed in the present specification relates to an image display system. The image display system includes a gating camera structured to divide the depth direction into multiple ranges, and to capture an image for each range while changing a time difference between light emission and exposure, so as to generate multiple slice images that correspond to the multiple ranges; and a processing device structured to combine the multiple slice images so as to generate a combined image to be displayed on a display.

With this embodiment, the gating camera is employed as an active sensor. With the gating camera, by adjusting the exposure (shutter speed or sensitivity) and the light emission intensity of the probe light for each range, this solves a problem of variation depending on the distance to an object. By combining the multiple slice images thus obtained, this allows an easy-to-see image to be generated.

Also, the processing device may be structured to have multiple correction characteristics defined corresponding to the multiple ranges, to correct each of the multiple slice images using the corresponding correction characteristics, and to combine the multiple corrected slice images.

With the gating camera, an image of an individual object can be captured for each range. Furthermore, the distance to each range is known. Accordingly, the correction characteristics are determined for each range giving consideration to the attenuation characteristics of the light propagation path or the light divergence angle of the light to be emitted. Furthermore, an image is corrected using the correction characteristics thus determined. This allows similar images to be acquired regardless of the distance to the object. In this case, such an arrangement does not require adjustment of the shutter speed and the sensitivity for each range.

Also, the correction characteristics that correspond to each range may be changed according to a measurement environment. For example, infrared light has a characteristic of being readily absorbed by water. Accordingly, with the gating camera using infrared light, there is a difference in the attenuation rate between rainy weather, dense fog, and clear weather. Also, the attenuation rate differs due to humidity. Also, dust particles such as PM2.5 can have an effect on the attenuation rate. Accordingly, with such an arrangement in which the first correction characteristics are changed according to the measurement environment, this provides a further improved visibility.

Description will be made below regarding the embodiments 4-1 through 4-3 with reference to the drawings.

Embodiment 4-1

Figure 37:
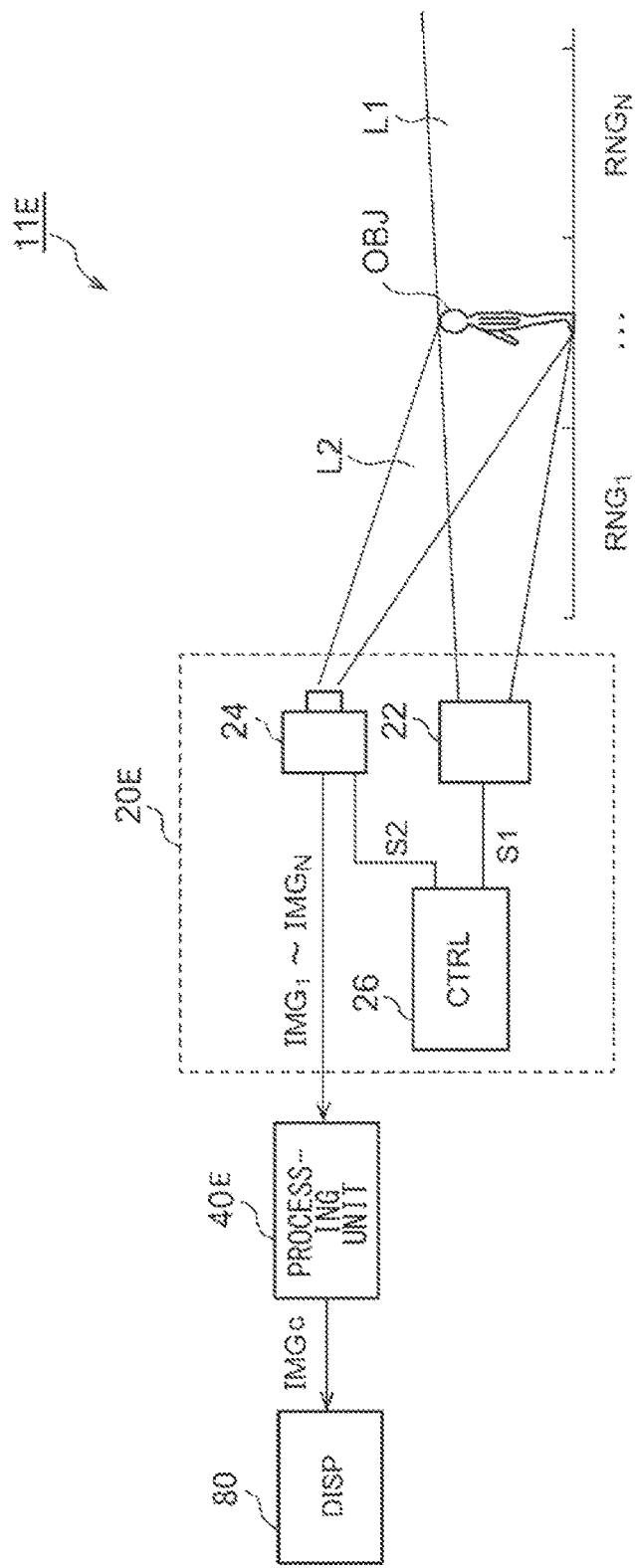
FIG. 37 is a block diagram showing an image display system according to an embodiment 4-1.

FIG. 37 is a block diagram showing an image display system 11E according to an embodiment 4-1. The image display system 11E is mounted on a vehicle such as an automobile, motorcycle, or the like. The image display system 11E presents an image in the vicinity of (e.g., in front of) the vehicle to the driver.

The image display system 11E mainly include a gating camera 20E, a processing device 40E, and a display 80. The gating camera 20E includes an illumination apparatus 22, an image sensor 24, and a controller 26. The gating camera 20E captures images for a plurality of N (N≥2) ranges $RNG_1$ through $RNG_N$ divided in the depth direction. The ranges may be designed such that adjacent ranges overlap at their boundaries in the depth direction.

The illumination apparatus 22 emits probe light L1 in front of the vehicle in synchronization with a light emission timing signal S1 supplied from the controller 26. As the probe light L1, infrared light is preferably employed. However, the present invention is not restricted to such an arrangement. Also, visible light having a predetermined wavelength may be employed.

The image sensor 24 is configured to support exposure control in synchronization with an image capture timing signal S2 supplied from the controller 26, and to be capable of generating a slice image IMG. The image sensor 24 is sensitive to the same wavelength as that of the probe light L1. The image sensor 24 captures an image of reflected light (returned light) L2 reflected by the object OBJ.

The controller 26 changes the light emission timing signal S1 and the image capture timing signal S2 for each range RNG, so as to change the difference in the timing between the light emission operation of the illumination apparatus 22 and the exposure operation of the image sensor 24. The gating camera 20E generates the slice images $IMG_1$ through $IMG_N$ that correspond to the multiple ranges $RNG_1$ through $RNG_N$. The i-th slice image $IMG_i$ includes only an image of the object included in the corresponding range $RNG_i$.

Figure 38:
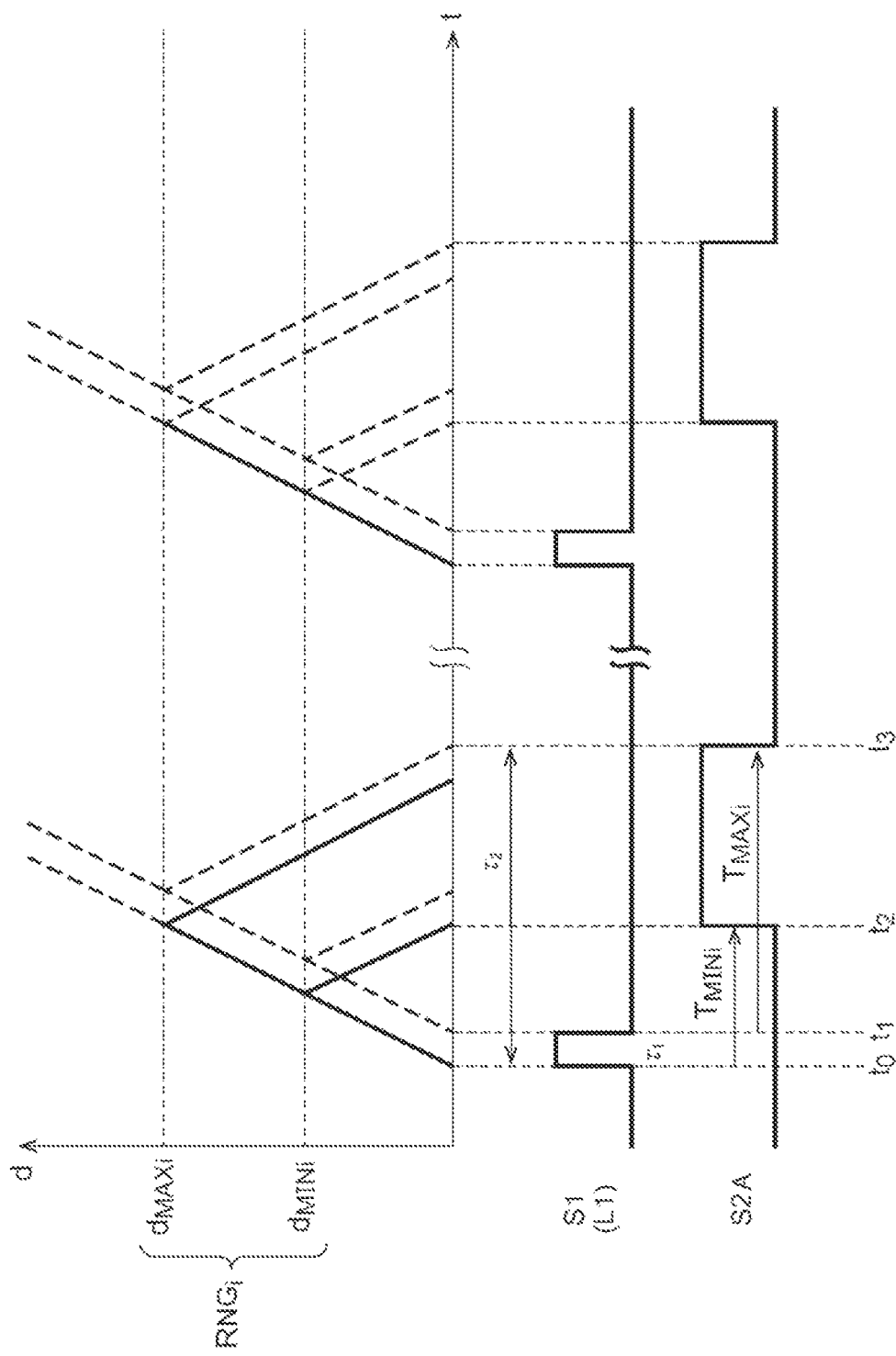
FIG. 38 is a diagram for explaining the operation of the gating camera.

FIG. 38 is a diagram for explaining the basic operation of the gating camera 20E. FIG. 38 shows the operation when i-th range $RNG_i$ is measured. The illumination apparatus 22 emits light during a light emission period $\tau_1$ from the time points $t_0$ to $t_1$ in synchronization with the light emission timing signal S1. In the upper diagram, a light beam diagram is shown with the horizontal axis as time and with the vertical axis as distance. The distance between the gating camera 20E and the near-distance boundary of the range $RNG_i$ is represented by $d_{MINi}$. The distance between the gating camera 20E and the far-distance boundary of the range $RNG_i$ is represented by $d_{MAXi}$.

The round-trip time $T_{MINi}$, which is a period from the departure of light from the illumination apparatus 22 at a given time point, to the arrival of the light at the distance $d_{MINi}$, up to the return of the reflected light to the image sensor 24, is represented by $T_{MINi}=2\times d_{MINi}/c$. Here, c represents the speed of light.

Similarly, the round-trip time $T_{MAXi}$, which is a period from the departure of light from the illumination apparatus 22 at a given time point, to the arrival of the light at the distance $d_{MAXi}$, up to the return of the reflected light to the image sensor 24, is represented by $T_{MAXi}=2\times d_{MAXi}/c$.

When only an image of an object OBJ included in the range $RNG_i$ is to be captured, the controller 26 generates the image capture timing signal S2A so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau_2$.

In the present embodiment, in order to prevent the occurrence of variation in the exposure (brightness value of an object image in an image) for each range, the gating camera 20E is designed to provide an optimized shutter speed (exposure time), an optimized number of exposures, an optimized sensitivity, an optimized illumination intensity of the probe light, etc.

FIGS. 39A and 39B are diagrams for explaining an image generated by the gating camera 20E. FIG. 39A shows an example in which an object (pedestrian) $OBJ_2$ exists in the range $RNG_2$, and an object (vehicle) $OBJ_3$ exists in the range $RNG_3$. FIG. 39B shows multiple slice images $IMG_1$ through $IMG_3$ acquired in the situation shown in FIG. 39A. When the slice image $IMG_1$ is captured, the image sensor is exposed by only the reflected light from the range $RNG_1$. Accordingly, the slice image $IMG_1$ includes no object image.

When the slice image $IMG_2$ is captured, the image sensor is exposed by only the reflected light from the range $RNG_2$. Accordingly, the slice image $IMG_2$ includes only the object image $OBJ_2$. Similarly, when the slice image $IMG_3$ is captured, the image sensor is exposed by only the reflected light from the range $RNG_3$. Accordingly, the slice image $IMG_3$ includes only the object image $OBJ_3$. As described above, with the gating camera 20E, this arrangement is capable of capturing object images in the form of separate images for the respective ranges.

Returning to FIG. 37, the processing device 40E combines the multiple slice images $IMG_1$ through $IMG_N$ that correspond to the ranges $RNG_1$ through $RNG_N$ generated by the gating camera 20E, so as to generate a combined slice image IMGc to be displayed on the display 80.

The processing device 40E may be configured as a combination of a processor (hardware component) such as a Central Processing Unit (CPU), Micro Processing Unit (MPU), microcontroller, Graphics Processing Unit (GPU), or the like, and a software program to be executed by the processor (hardware component). Also, the processing device 40E may be configured as a combination of multiple processors. Alternatively, the processing device 40E may be configured as a hardware component alone.

Figure 40A:
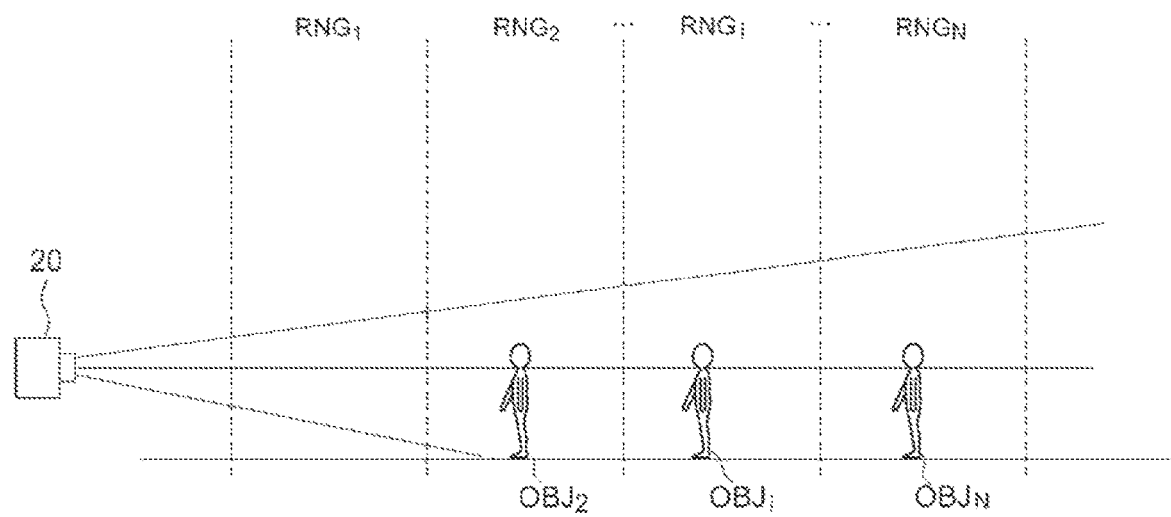
FIGS. 40A and 40B are diagrams for explaining image capture by the gating camera.
Figure 40B:
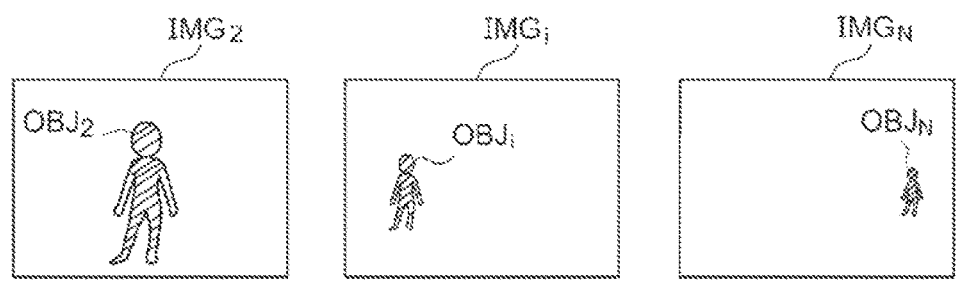

The above is the image display system 11E. Next, description will be made regarding the operation thereof. FIGS. 40A and 40B are diagrams for explaining the image capture operation of the gating camera 20E. FIG. 40A is a diagram showing a measurement situation as viewed from the side. FIG. 40B shows images captured by the gating camera 20E. The situation shown in FIG. 40A is the same as that shown in FIG. 36A. In this example, the objects (humans) $OBJ_2$, $OBJ_i$, and $OBJ_N$ exist in the ranges $RNG_2$, $RNG_i$, and $RNG_N$, respectively.

In the images shown in FIG. 40B, the hatching density represents the magnitude of the pixel value. In the present embodiment, when an image of an object (human) having the same reflection ratio is captured, the gating camera 20E is optimized in a hardware manner or a software manner such that the object image has approximately the same pixel values regardless of whether it exists in the slice image $IMG_2$ that corresponds to a near-distance range or in the slice image $IMG_N$ that corresponds to a far-distance range.

Figure 41A:
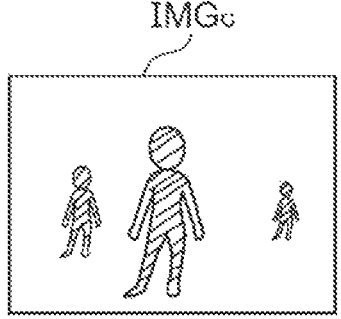
FIG. 41A is a diagram showing a combined image obtained by combining multiple slice images shown in FIG. 40B.
Figure 41B:
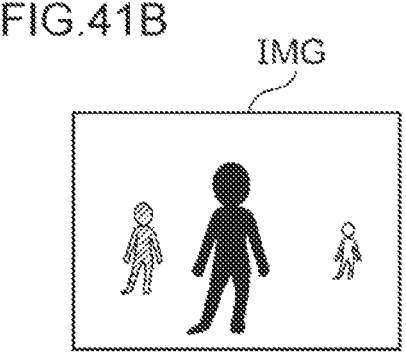
FIG. 41B is a diagram showing an image generated by a conventional infrared active sensor in a situation shown in FIG. 40A.

FIG. 41A is a diagram showing a combined image obtained by combining the multiple slice images shown in FIG. 40B. As a comparison, FIG. 41B shows an image (i.e., image shown in FIG. 36B) generated by a conventional infrared active sensor in a situation shown in FIG. 40A. As shown in FIG. 41B, with such a conventional infrared active sensor, when an image of the same object is captured, as the distance to the object becomes larger, the pixel values become smaller. Conversely, as the distance to the object becomes smaller, the pixel values become larger. Accordingly, this leads to a problem in that bright object images and dark object images are mixed in a single image. In a case in which such an image is displayed on the display, it is difficult for the user to see the object images.

In contrast, with the image display system 11E according to the embodiment 4-1, the gating camera 20E generates the slice images $IMG_1$ through $IMG_N$ with approximately the same exposure (brightness). With such an arrangement in which such slice images $IMG_1$ through $IMG_N$ are combined, this provides improved visibility as compared with conventional arrangements.

Embodiment 4-2

Description has been made in the embodiment 4-1 regarding an arrangement in which multiple slice images $IMG_1$ through $IMG_N$ are corrected to have uniform brightness by means of the gating camera 20E optimized in a hardware manner or a software manner. However, in some cases, it is difficult to optimize the gating camera 20E depending on the kind or model of the gating camera. Also, in some cases, such optimization is able to provide only insufficient effects. The embodiment 4-2 is particularly effective in such a case.

Figure 42:
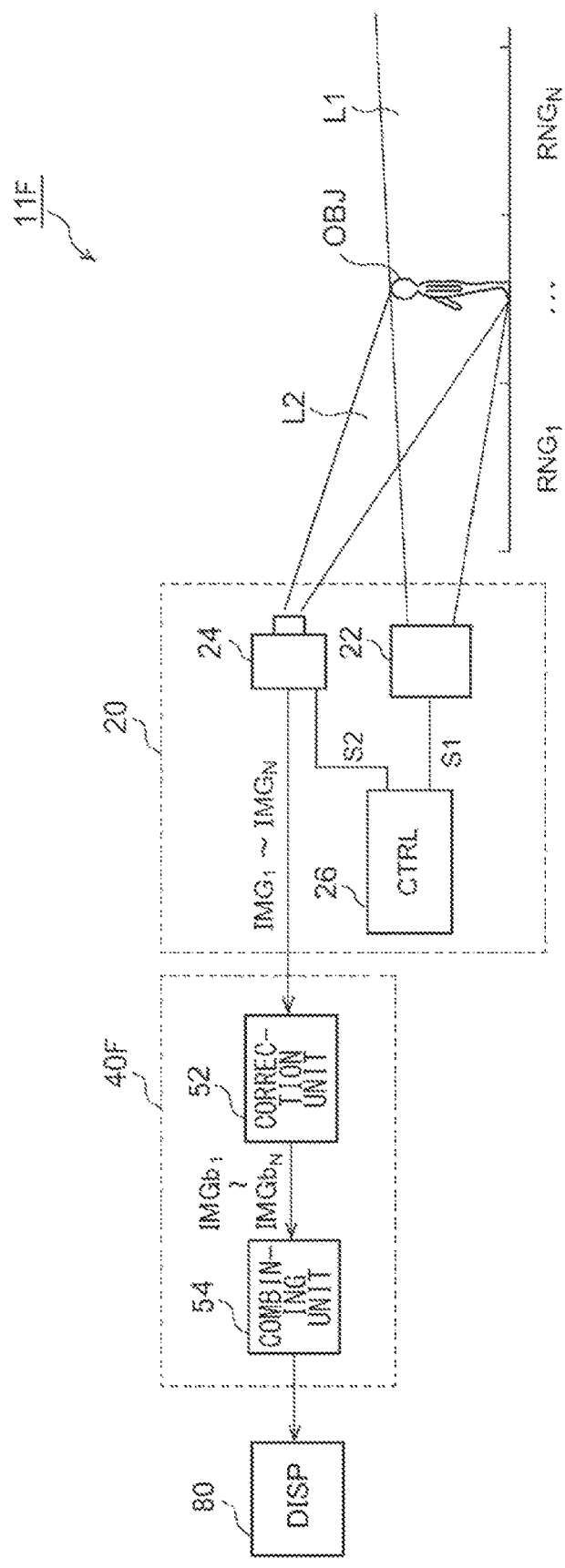
FIG. 42 is a block diagram showing an image display system according to an embodiment 4-2.

FIG. 42 is a block diagram showing an image display system 11F according to an embodiment 4-2. In the image display system 11F, the processing device 40F includes a correction unit 52 and a combining unit 54.

Multiple correction characteristics (which will be referred to as a "set of correction characteristics") that correspond to the multiple ranges $RNG_1$ through $RNG_N$ are defined in the correction unit 52. The correction characteristics can each be represented in the form of a function p'=f(p) with the pixel value p before correction as an argument (input), and with the output of the pixel value after correction as an output.

The correction unit 52 corrects each of the multiple slice images $IMG_1$ through $IMG_N$ using the corresponding one from among the characteristics $g_1(p)$ through $g_N(p)$, so as to generate the slice images $IMGb_1$ through $IMGb_N$ after the correction.

The correction characteristics $g_i(p)$ are defined corresponding to the i-th range $RNG_i$. In an example, the correction characteristics $g_i(p)$ are defined with only the pixel value as an argument without depending on the pixel position. In this case, as described above, the following relation holds true between the pixel value p of a given pixel included in an image before correction and the pixel value of the pixel included in the image after the correction.

$$p'=g_i(p)$$

FIGS. 43A through 43D are diagrams showing several examples of the correction characteristics g. Description will be made with reference to FIG. 43A. In this example, a set of the correction characteristics $g_1(p)$ through $g_N(p)$ are linear functions, and are represented by the following Expression. Here, "$\alpha_i$" represents a correction coefficient defined for each range. As the range becomes farther, the value of the correction coefficient $\alpha_i$ becomes larger. It should be noted that p' is clamped when it reaches its maximum value.

$$p'=g_i(p)=\alpha_i \times p$$

The correction using this set of correction characteristics corresponds to exposure correction.

Figure 43A:
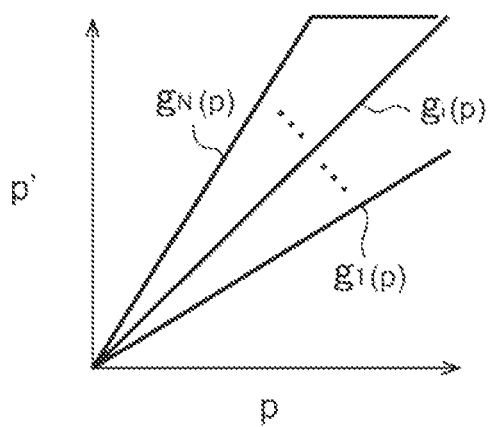
FIGS. 43A through 43D are diagrams showing several examples of correction characteristics.
Figure 43B:
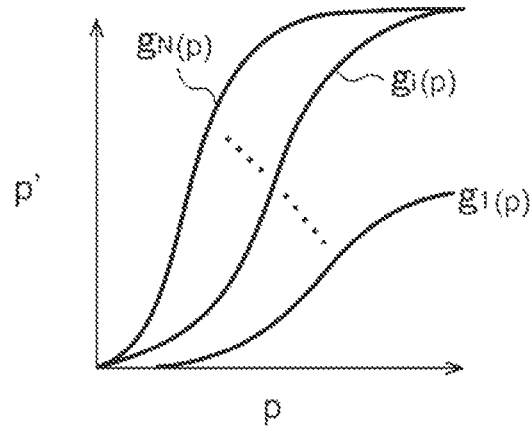

Description will be made with reference to FIG. 43B. In this example, a set of the correction characteristics $g_1(p)$ through $g_N(p)$ are S-curves. Such S-curves provide an effect of raising the image contrast.

With the normalized S-curve as S(p), the correction characteristics may be defined as follows.

$$p'=g'(p)=\alpha_i \times S(p)$$

Alternatively, the correction characteristics may be defined as follows.

$$p'=g_i(p)=S(\alpha_i \times p)$$

Figure 43C:
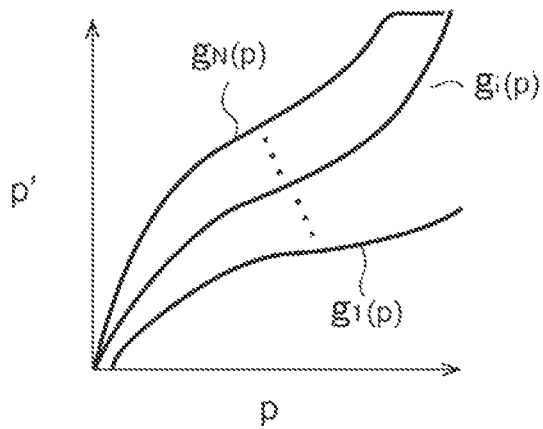

Description will be made with reference to FIG. 43C. In this example, a set of the correction characteristics $g_1(p)$ through $g_N(p)$ are so-called inverse S-curves. Such inverse S-curves provide an effect of reducing the image contrast. With the normalized inverse S-curve as INVS(p), the correction characteristics may be defined as follows.

$$p'=g_i(p)=\alpha_i \times INVS(p)$$

Alternatively, the correction characteristics may be defined as follows.

$$p'=g_i(p)=INVS(\alpha_i \times p)$$

Figure 43D:
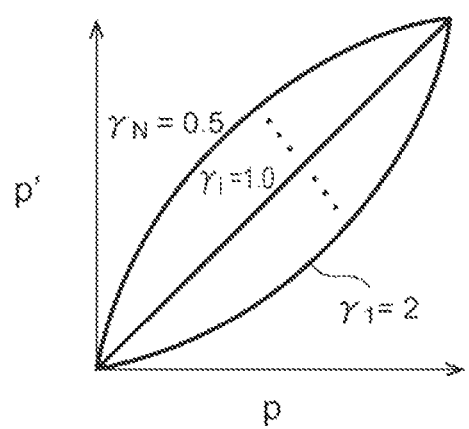

Description will be made with reference to FIG. 43D. In this example, a set of the correction characteristics $g_1(p)$ through $g_N(p)$ each represent so-called gamma correction.

$$p'=g_i(p)=p^{\gamma_i}$$

Here, $\gamma_i$ represents a gamma correction value for the i-th range.

It should be noted that the correction characteristics are not restricted to the functions shown in FIGS. 43A through 43D. Also, the correction characteristics may be defined as a quadratic function or a higher-order function. Also, the correction characteristics may be defined using an exponential function or a trigonometric function. Also, the correction characteristics are not necessarily required to be defined in the form of a function. That is to say, the processing device 40 may hold a function g (p) that represents the correction characteristics, and may input a value p to the function f(p) so as to acquire the output p. Also, the processing device 40 may hold a lookup table for defining the relation between the input p and the output p'.

Description has been made with reference to FIGS. 43A through 43D regarding an arrangement in which a set of the correction characteristics $g_1(p)$ through $g_N(p)$ are represented as the same type of function with different parameters ($\alpha$ or $\gamma$). However, the present invention is not restricted to such an arrangement. Also, different types of functions may be employed for the respective ranges.

That is to say, such a set of the correction characteristics $g_1(p)$ through $g_N(p)$ may preferably be defined such that, when an image of the same object is captured, a similar object image is acquired regardless of the range.

Returning to FIG. 42, the corrected slice images $IMGb_1$ through $IMGb_N$ are input to the combining unit 54. The combining unit 54 recombines the corrected slice images $IMGb_1$ through $IMGb_N$ so as to generate a single slice image IMGc. The slice image IMGc thus combined is displayed on a display 80, so as to present the slice image IMGc thus combined to the user.

Figure 44A:
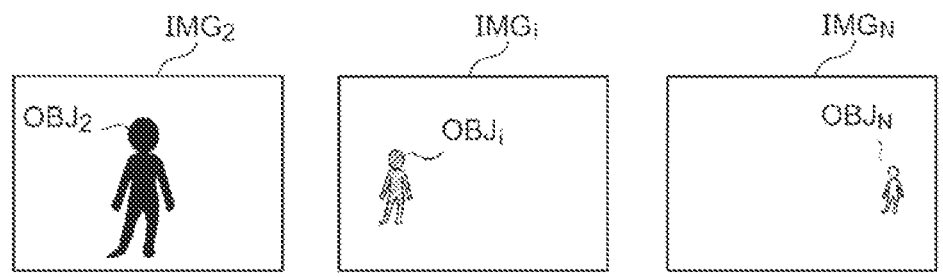
FIGS. 44A and 44B are diagrams for explaining the processing by the correction unit shown in FIG. 42.
Figure 44B:
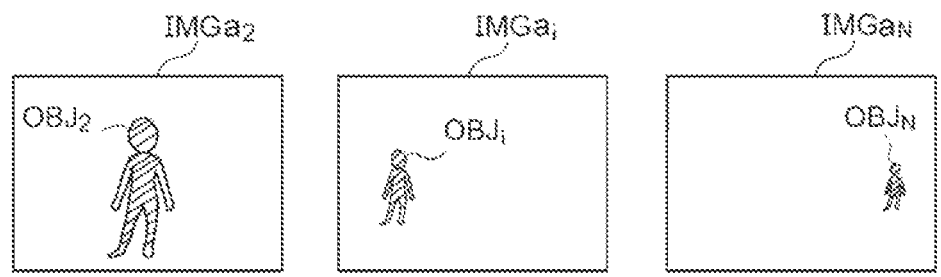

The above is the configuration of the image display system 11F. Next, description will be made regarding the operation thereof. FIGS. 44A and 44B are diagrams for explaining the processing of the correction unit 52 shown in FIG. 42. FIG. 44A shows multiple slice images $IMG_1$ through $IMG_N$ generated by the gating camera 20. As the range becomes farther, the pixel values become smaller. Conversely, as the range becomes nearer, the pixel values become larger.

FIG. 44B shows the corrected slice images $IMGb_1$ through $IMGb_N$ corrected by the correction unit 52. With such an arrangement in which the corrected slice images $IMGb_1$ through $IMGb_N$ are combined, this allows an easy-to-see combined slice image IMGc to be acquired as shown in FIG. 41A.

Embodiment 4-3

Figure 45:
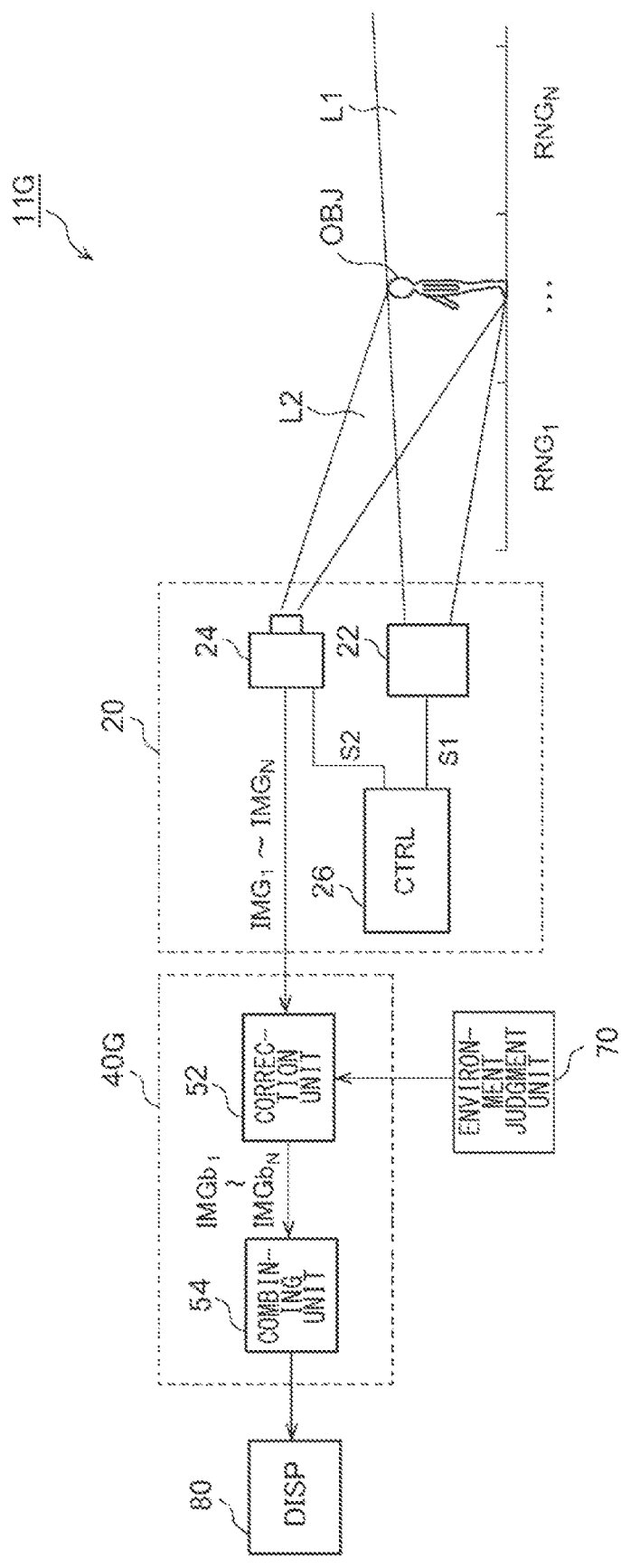
FIG. 45 is a block diagram showing an image display system according to an image display system according to an embodiment 4-3.

FIG. 45 is a block diagram showing an object identification system 11G according to an embodiment 4-3. In this embodiment, the correction characteristics for each range are changed according to the measurement environment. Infrared light has a characteristic of being readily absorbed by water. Accordingly, in rainy weather or dense fog, the first correction characteristics may preferably be changed so as to raise the correction level.

The correction unit 52 of a processing device 40G holds multiple sets of correction characteristics defined corresponding to multiple environments. The set of the correction characteristics may preferably be defined for each environment having different propagation characteristics (attenuation characteristics) of the probe light L1 and the reflected light L2. For example, the multiple sets of the correction characteristics may be defined according to the weather (sunny, rainy, cloudy, foggy). Also, the multiple sets of the correction characteristics may be defined according to the measurement time of day (day, night, dusk). In a case in which the object identification system 11 is mounted on a moving vehicle such as an automobile or the like, multiple sets of the correction characteristics may be defined according to multiple driving situations.

The image display system 11G includes an environment judgment unit 70. The environment judgment unit 70 judges the current measurement environment (weather, time of day, driving situation), and notifies the correction unit 52 of this information. The correction unit 52 selects one from among the multiple correction characteristics based on the notice thus received from the environment judgment unit 70. Subsequently, the correction unit 52 corrects the image for each range using the set of the correction characteristics thus selected.

With the embodiment 4-3, this provides a further improved object identification rate as compared with the embodiment 4-2.

Description will be made regarding a modification relating to the embodiment 4.

Modification 4-1

Description has been made in the embodiment regarding an arrangement in which, when a single image is corrected, all the pixels are corrected according to the same correction characteristics. However, the correction characteristics may be designed to have position dependance. That is to say, the correction characteristics may be defined as a function with the pixel position as an argument in addition to the pixel value p.

Embodiment 5

First, description will be made regarding problems relating to an embodiment 5.

In the operation testing of the gating camera or a system including the gating camera as a built-in component, the following test is required. That is to say, several or all the ranges are selected as test target ranges. After a reference reflector is arranged for each of the test target ranges, images are captured by means of the gating camera, and judgement is made regarding whether or not images can be captured normally. In a case in which the gating camera is employed as an in-vehicle camera, such an arrangement requires capturing images of objects in a range several dozen or several hundred meters or more ahead of the gating camera. Accordingly, in a case in which such a far-distance range is selected as the test target range, this leads to a problem in that a test requires an extensive space.

Even if such an extensive space can be used, in a case in which multiple test target ranges are selected, such a test must be executed while changing the position of the reference reflector. This leads to an increased workload required for the test, which becomes a factor of an increased cost.

The invention relating to the embodiment 5 has been made in view of such a situation. Accordingly, it is an exemplary purpose of an embodiment of the invention to provide a gating camera that can be tested in a state in which the gating camera is focused on a given range using a reference reflector arranged in a different range.

Overview of Embodiment 5

An embodiment disclosed in the present specification relates to a gating camera structured to divide the depth direction into multiple ranges, and to generate multiple slice images that correspond to the multiple ranges. The gating camera includes: an illumination apparatus structured to emit probe light according to a light emission timing signal; an image sensor structured to capture an image of reflected light according to an image capture timing signal; and a controller structured to generate the light emission timing signal and the image capture timing signal with a time difference defined for each range. In a testing process, the gating camera is structured to be capable of applying an offset to the time difference between the light emission timing signal and the image capture timing signal.

In a case of operating the controller in a state in which a given range is set to be an image capture target, the light emission timing signal and the image capture signal are generated with a time difference that corresponds to the image capture target range. In a case of applying a negative offset to the time difference between the light emission timing signal and the image capture timing signal, an image of an object that exists in a range that is nearer than the image capture target range thus set is captured. In a case of applying a positive offset to the time difference between the light emission timing signal and the image capture timing signal, an image of an object that exists in a range that is farther than the image capture target range thus set is captured. With this, in a state in which a given range is set to the image capture target, a test can be executed using a reference reflector arranged in a different range.

Also, the gating camera may be structured to allow an external delay unit to be connected on a path of the light emission timing signal. Also, the gating camera may further include a delay unit to be inserted on a signal path of the light emission timing signal in a testing process. With this, a test can be executed using a reference reflector arranged in a relatively near-distance range in a state in which a relatively far-distance range is set to be an image capture target. This allows the test space to be reduced.

Also, the gating camera may be structured to allow an external delay unit to be connected on a signal path of the image capture timing signal. Also, the gating camera may further include a delay unit to be inserted on a signal path of the image capture timing signal. With this, a test can be executed using a reference reflector arranged in a relatively far-distance range in a state in which a relatively near-distance range is set to be an image capture target.

With an embodiment, a gating camera includes: an illumination apparatus structured to emit probe light according to a light emission timing signal; an image sensor structured to capture an image of reflected light according to an image capture timing signal; and a controller structured to generate the light emission timing signal and the image capture timing signal with a time difference defined for each range. In a testing process, the gating camera is structured to be capable of outputting the light emission timing signal to an external reference light source via an external delay unit. This allows the gating camera to be tested using an external reference light source. Furthermore, this allows the space required for the test to be reduced.

With an embodiment, a gating camera includes: an illumination apparatus structured to emit probe light according to a light emission timing signal; an image sensor structured to capture an image of reflected light according to an image capture timing signal; and a controller structured to generate the light emission timing signal and the image capture timing signal with a time difference defined for each range. In a testing process, the gating camera is structured to be capable of outputting the image capture timing signal to an external image sensor via an external delay unit. This allows the gating camera to be tested using an external image sensor. Furthermore, this allows the space required for the test to be reduced.

Description will be made with reference to the drawings regarding an embodiment 5.

Embodiment 5-1

Figure 46:
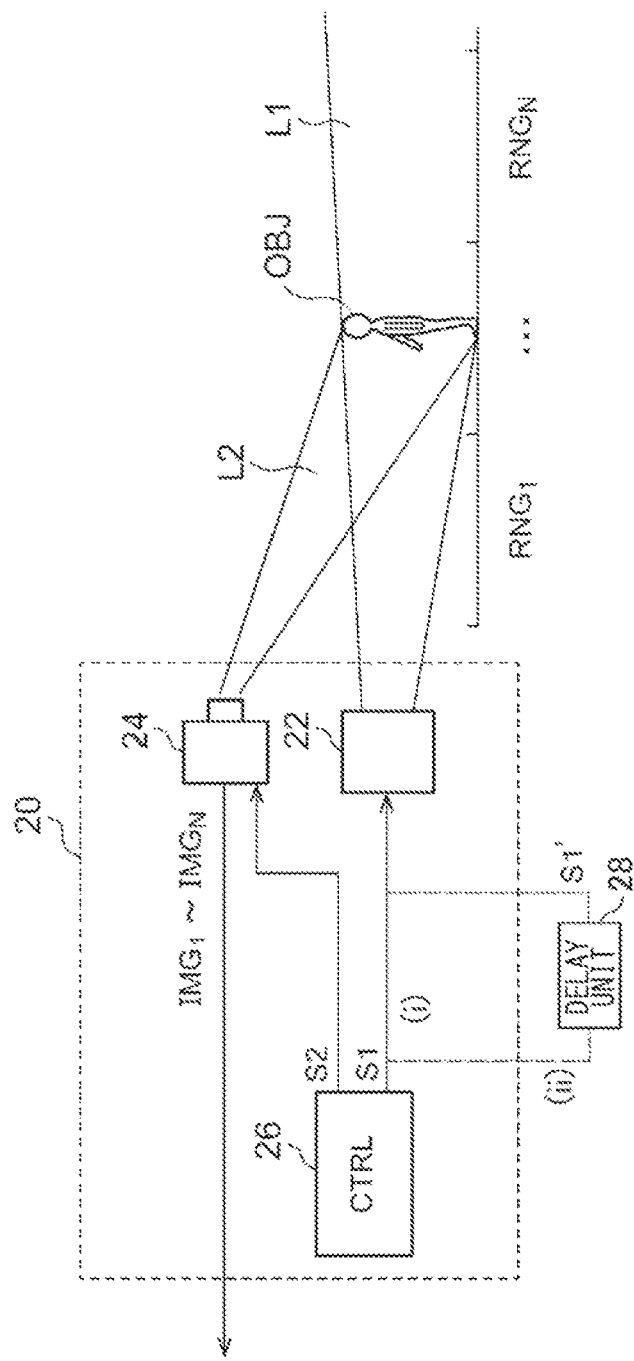
FIG. 46 is a block diagram showing a gating camera according to an embodiment 5-1.

FIG. 46 is a block diagram showing a gating camera 20 according to an embodiment 5-1. The gating camera 20 captures images for a plurality of N (N≥2) ranges $RNG_1$ through $RNG_N$ divided in the depth direction, so as to generate multiple images (slice images) $IMG_1$ through $IMG_N$ that correspond to the multiple ranges $RNG_1$ through $RNG_N$. The ranges may be designed such that adjacent ranges overlap at their boundaries in the depth direction.

The gating camera 20 includes an illumination apparatus 22, an image sensor 24, and a controller 26.

The illumination apparatus 22 emits probe light L1 in front of the vehicle in synchronization with a light emission timing signal S1 supplied from the controller 26. As the probe light L1, infrared light is preferably employed. However, the present invention is not restricted to such an arrangement. Also, visible light having a predetermined wavelength or ultraviolet light may be employed.

The image sensor 24 is configured to support exposure control in synchronization with an image capture timing signal S2 supplied from the controller 26, and to be capable of generating a slice image IMG. The image sensor 24 is sensitive to the same wavelength as that of the probe light L1. The image sensor 24 captures an image of reflected light (returned light) L2 reflected by the object OBJ.

The controller 26 defines a pulse width of each of the light emission timing signal S1 and the image capture timing signal S2 and a time difference between them for each range. The light emission timing signal S1 and the image capture timing signal S2 thus defined for the i-th (1≤i≤N) range are represented by $S1_i$ and $S2_i$ with the range number i as a suffix. The operation in which i-th range $RNG_i$ is set to be the image capture target will be referred to as "focusing on the i-th range $RNG_i$". This corresponds to the selection of the light emission timing signal $S1_i$ and the image capture timing signal S21. The range $RNG_i$ in this state will also be referred to as a "focus range". It should be noted that "focus" in this usage differs from "focus" in the optical meaning.

Figure 47:
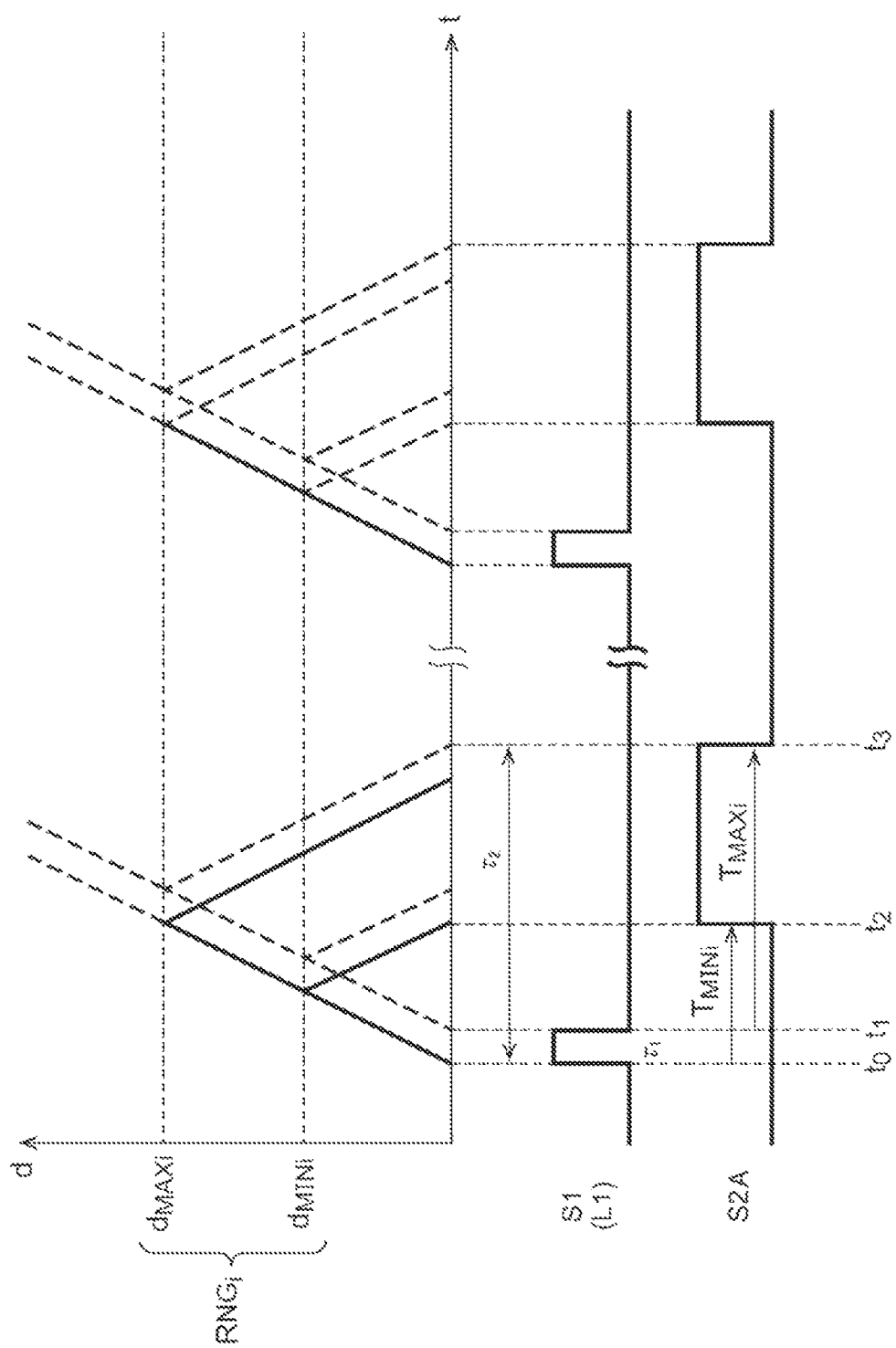
FIG. 47 is a diagram for explaining the basic operation of the gating camera.

FIG. 47 is a diagram for explaining the basic operation of the gating camera 20. FIG. 47 shows the operation when the i-th range $RNG_i$ is measured. The illumination apparatus 22 emits light during a light emission period $\tau_1$ from the time points $t_0$ to $t_1$ in synchronization with the light emission timing signal $S1_i$. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the illumination apparatus 22 at a given time point, to the arrival of the light at the distance $d_{MINi}$, up to the return of the reflected light to the image sensor 24, is represented by $T_{MINi}=2\times d_{MINi}/c$. Here, c represents the speed of light.

Similarly, the round-trip time $T_{MAXi}$, which is a period from the departure of light from the illumination apparatus 22 at a given time point, to the arrival of the light at the distance $d_{MAXi}$, up to the return of the reflected light to the image sensor 24, is represented by $T_{MAXi}=2\times d_{MAXi}/c$.

When only an image of an object OBJ included in the range $RNG_i$ is to be captured, the controller 26 generates the image capture timing signal S2 so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau_2$.

Figure 48:
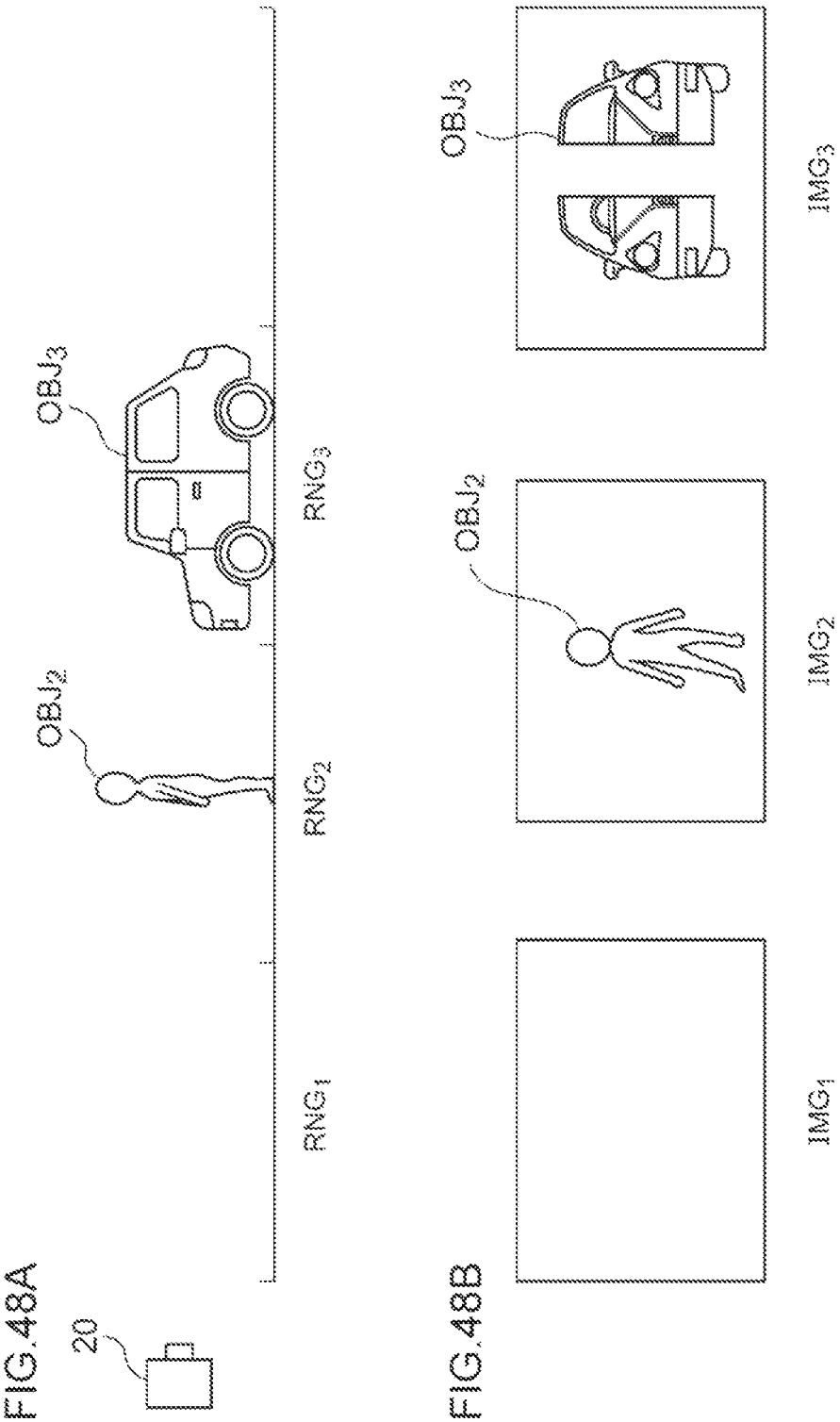
FIGS. 48A and 48B are diagrams for explaining the slice images generated by the gating camera.

FIGS. 48A and 48B are diagrams for explaining an image generated by the gating camera 20. FIG. 48A shows an example in which an object (pedestrian) $OBJ_2$ exists in the range $RNG_2$, and an object (vehicle) $OBJ_3$ exists in the range $RNG_3$. FIG. 48B shows multiple slice images $IMG_1$ through $IMG_3$ acquired in the situation shown in FIG. 48A. When the slice image $IMG_1$ is captured, the image sensor is exposed by only the reflected light from the range $RNG_1$. Accordingly, the slice image $IMG_1$ includes no object image.

When the slice image $IMG_2$ is captured, the image sensor is exposed by only the reflected light from the range $RNG_2$. Accordingly, the slice image $IMG_2$ includes only the object image $OBJ_2$. Similarly, when the slice image $IMG_3$ is captured, the image sensor is exposed by only the reflected light from the range $RNG_3$. Accordingly, the slice image $IMG_3$ includes only the object image $OBJ_3$. As described above, with the gating camera 20, this arrangement is capable of capturing object images in the form of separate images for the respective ranges.

The gating camera 20 generates multiple slice images $IMG_1$ through $IMG_N$ that correspond to the multiple ranges $RNG_1$ through $RNG_N$. As the i-th slice image $IMG_i$, only an image of an object included in the corresponding range $RNG_i$ is captured.

Returning to FIG. 46, in the testing process, the gating camera 20 is configured such that an offset t can be applied to the time difference $\Delta t$ between the light emission timing signal S1 and the image capture timing signal S2. In the present embodiment, the gating camera 20 is configured to be capable of providing the offset $\tau$ as a negative value. Such a negative offset $-\tau$ can be provided by delaying the light emission timing signal $S1_j$ generated as a preceding signal.

In order to provide the negative offset $-\tau$, the gating camera 20 is provided with a delay unit 28 configured as an external component, or includes such a delay unit 28 as a built-in component. In the normal image capture operation, the delay unit 28 has no effect on the image capture. That is to say, the light emission timing signal S1 generated by the controller 26 is supplied to the illumination apparatus 22 as it is (path i). On the other hand, in the testing process, the light emission timing signal S1 generated by the controller 26 is delayed by the time $\tau$ that corresponds to the offset by means of the delay unit 28. The delayed light emission timing signal S1' is supplied to the illumination apparatus 22 (path ii).

The above is the configuration of the gating camera 20. Next, description will be made regarding the test of the gating camera 20.

Figure 49:
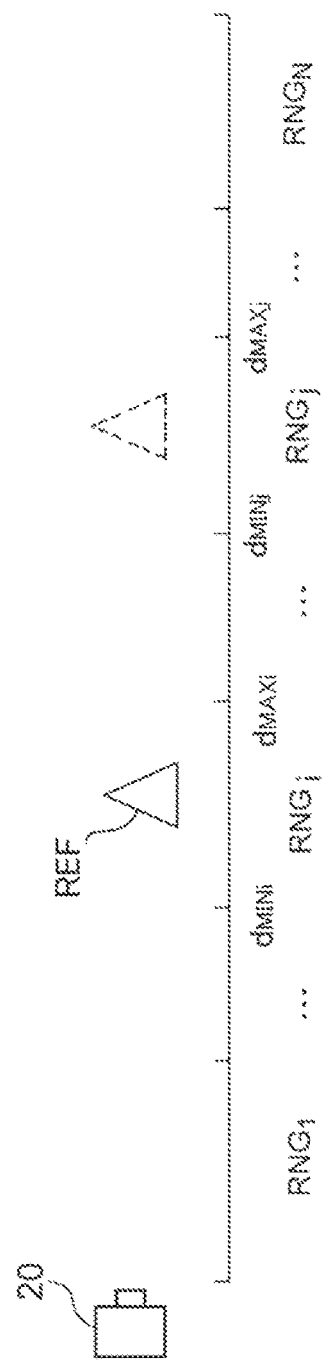
FIG. 49 is a diagram showing the layout of the gating camera and a reference reflector REF in a testing process.

FIG. 49 is a diagram showing a layout of the gating camera 20 and the reference reflector REF in the testing process. In this example, testing is made regarding whether or not an image has been captured normally for the j-th range $RNG_j$. The reference reflector REF is arranged in the i-th range $RNG_i$ that is at a near distance as compared with the j-th range $RNG_j$. The controller 26 of the gating camera 20 is set to a state in which an image can be captured for the j-th range $RNG_j$. That is to say, the focus is set to the j-th range $RNG_j$. In other words, the controller 26 outputs the light emission timing signal $S1_j$ and the image capture timing signal $S2j$. In this case, the negative offset $-\tau$ is applied to the time difference $\Delta t_j$ between the light emission timing signal $S1_j$ and the image capture timing signal $S2_j$. The offset amount t is represented by $\tau=(d_{MINj}-d_{MINi})/c\times 2$.

Figure 50:
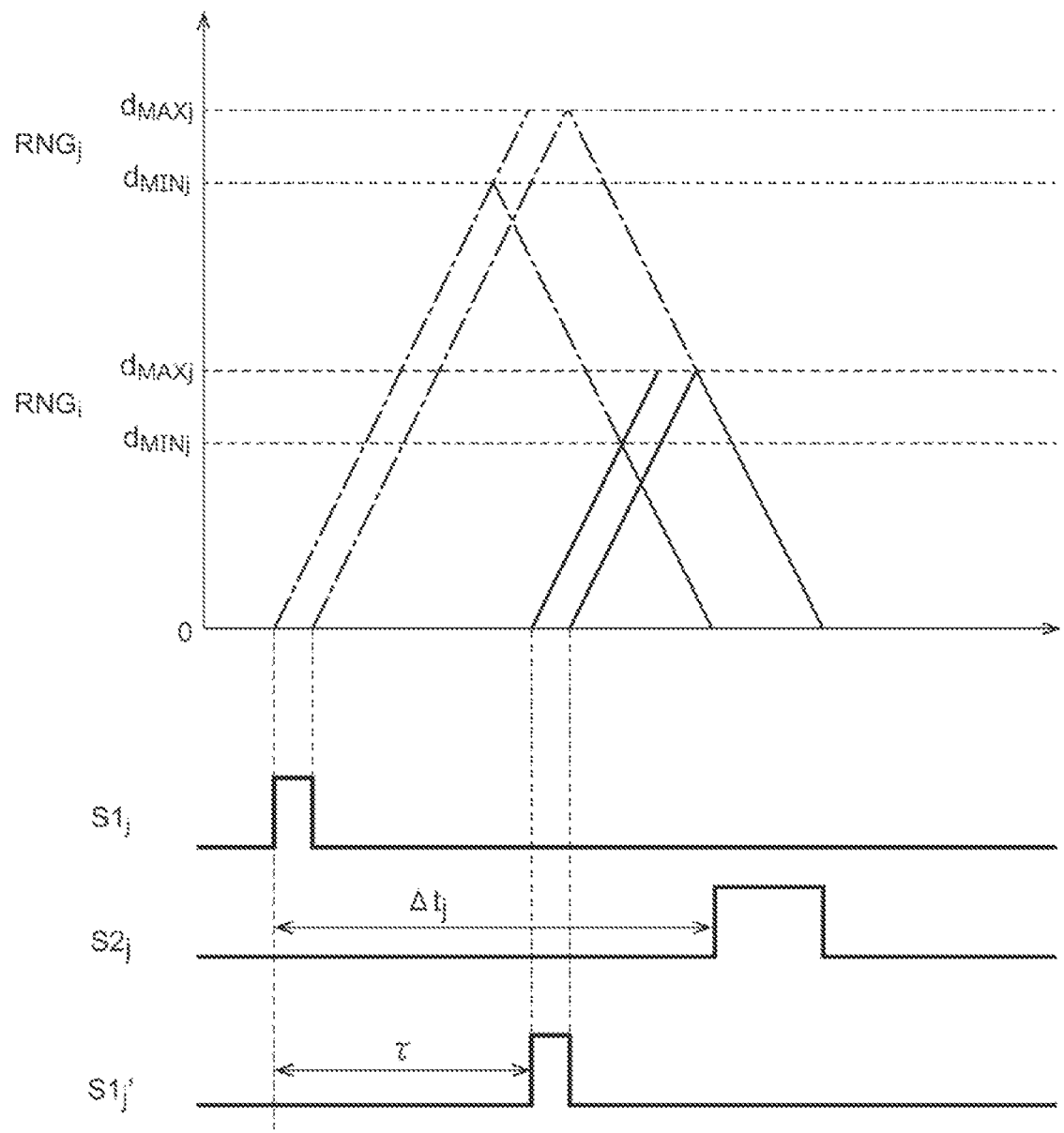
FIG. 50 is a diagram for explaining the testing provided by the gating camera shown in FIG. 46.

FIG. 50 is a diagram for explaining the testing of the gating camera 20 shown in FIG. 46. The time difference between the light emission timing signal S1; and the image capture timing signal S2; is represented by $\Delta t_j$. The light emission timing signal $S1_j$ is delayed by t by means of the delay unit 28. With this, the time difference between the delayed light emission timing signal $S1_j'$ and the image capture timing signal $\Omega_j$ is represented by $\Delta t_j - \tau$.

In the upper diagram shown in FIG. 50, the line of alternately long and short dashes indicates the light beam when the illumination apparatus 22 emits light according to the light emission timing signal $S1_j$. This light is reflected in the j-th range $RNG_j$, and an image of the reflected light is captured according to the image capture timing signal $S2_j$. In the testing process, the illumination apparatus 22 emits light according to the delayed light emission timing signal $S1_j'$ instead of the light emission timing signal $S1_j$. In this case, the light beam is indicated by the solid line. This light beam is reflected by an object (reference reflector REF) in the range $RNG_i$, and an image of the reflected light is captured according to the image capture timing signal $S2_j$.

As a result, when the slice image $IMG_j$ thus captured includes an image of the reference reflector REF, judgment is made that the gating camera 20 operates normally. Otherwise, judgement is made that the gating camera 20 operates abnormally. The above is the testing of the gating camera 20.

With the gating camera 20, the negative offset $-\tau$ can be applied to the time difference $\Delta t_j$ between the light emission timing signal $S1_j$ and the image capture timing signal $S2_j$. This arrangement is capable of capturing an image of the reference object REF that exists in the range $RNG_i$ that is at a near distance as compared with the focus range $RNG_j$.

Figure 51:
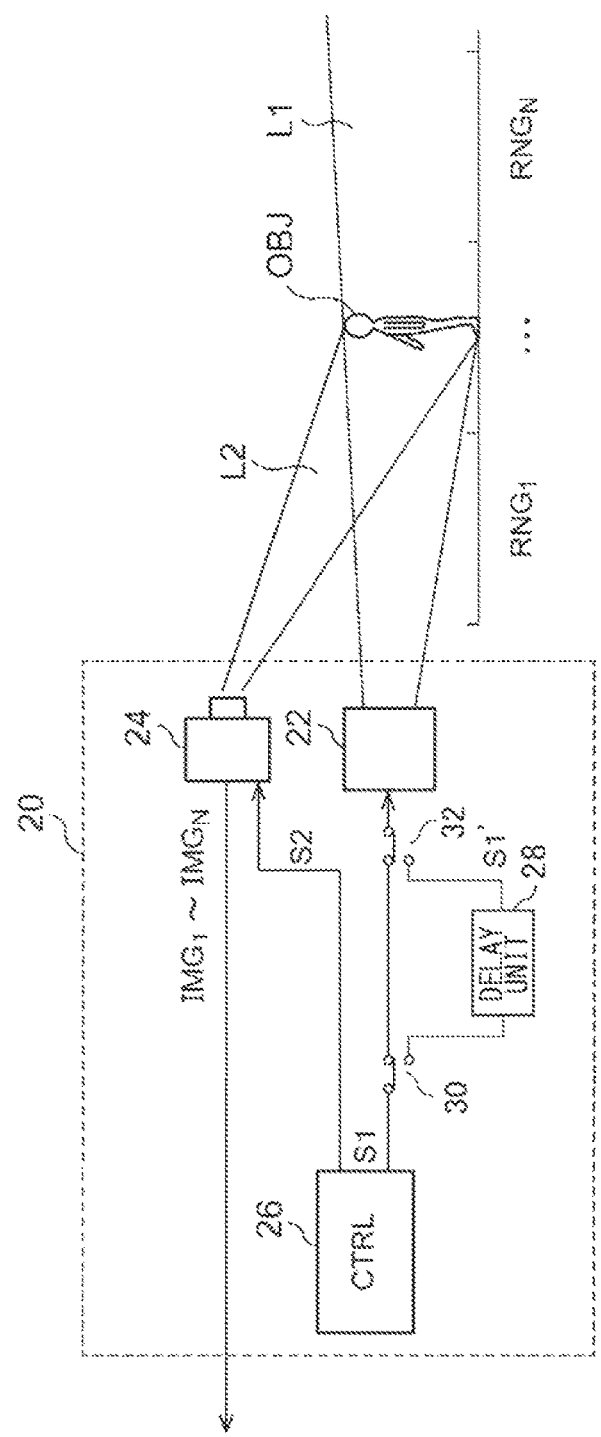
FIG. 51 is a diagram showing a first example configuration of the gating camera shown in FIG. 46.

FIG. 51 is a diagram showing a first example configuration of the gating camera 20 shown in FIG. 46. The gating camera 20 includes the delay unit 28 as a built-in component. For example, the gating camera 20 includes selectors 30 and 32 respectively configured as an upstream stage and a downstream stage of the delay unit 28. In the normal image capture operation (non-testing process), the delay unit 28 is bypassed by the selectors 30 and 32 so as to directly supply the light emission timing signal S1 to the illumination apparatus 22. In the testing process, the light emission timing signal S1 is transmitted via the delay unit 28 by means of the selectors 30 and 32, thereby supplying the delayed light emission timing signal S1' to the illumination apparatus 22.

Figure 52:
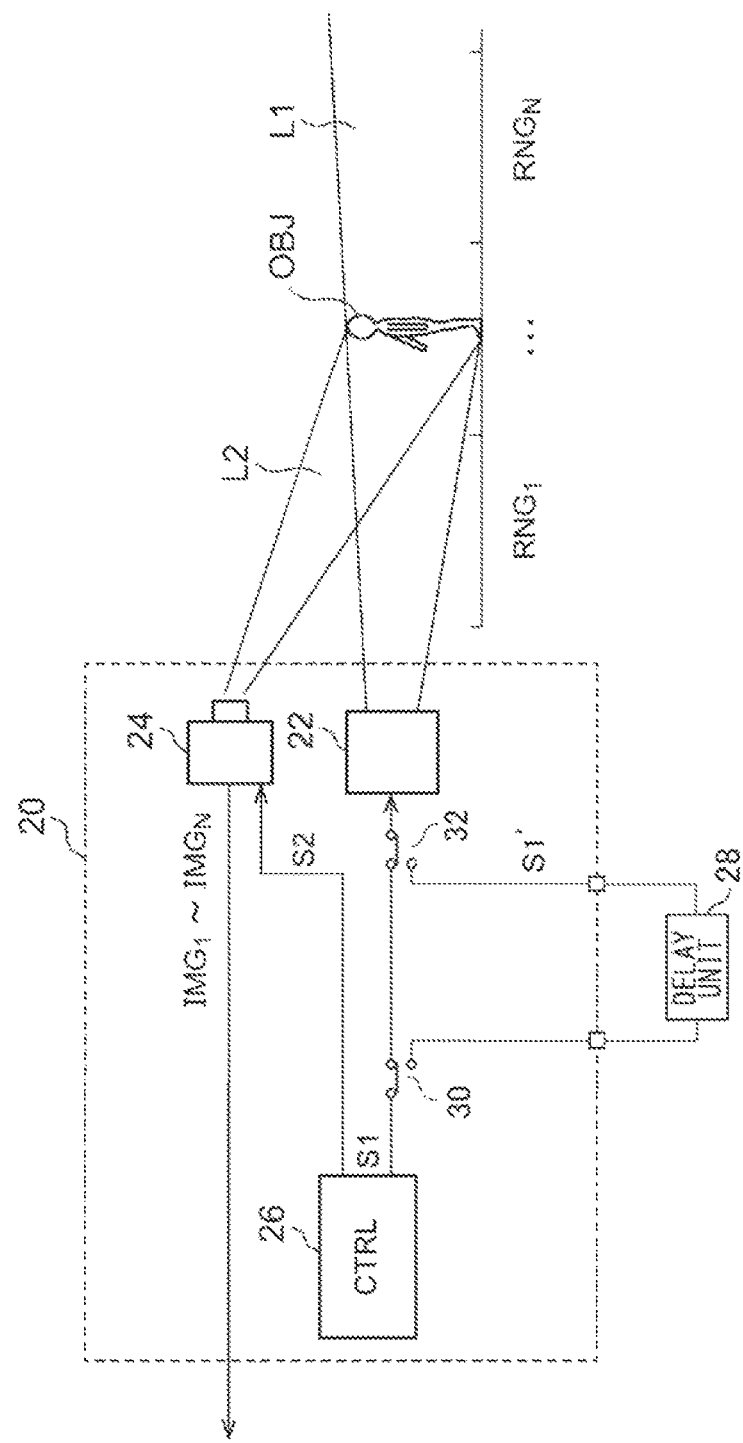
FIG. 52 is a diagram showing a second example configuration of the gating camera shown in FIG. 46.

FIG. 52 is a diagram showing a second example configuration of the gating camera 20 shown in FIG. 46. The point of difference between the gating cameras 20 shown in FIGS. 52 and 51 is that, in the gating camera 20 shown in FIG. 52, the delay unit 28 is detachably mounted on the gating camera 20.

Embodiment 5-2

Figure 53:
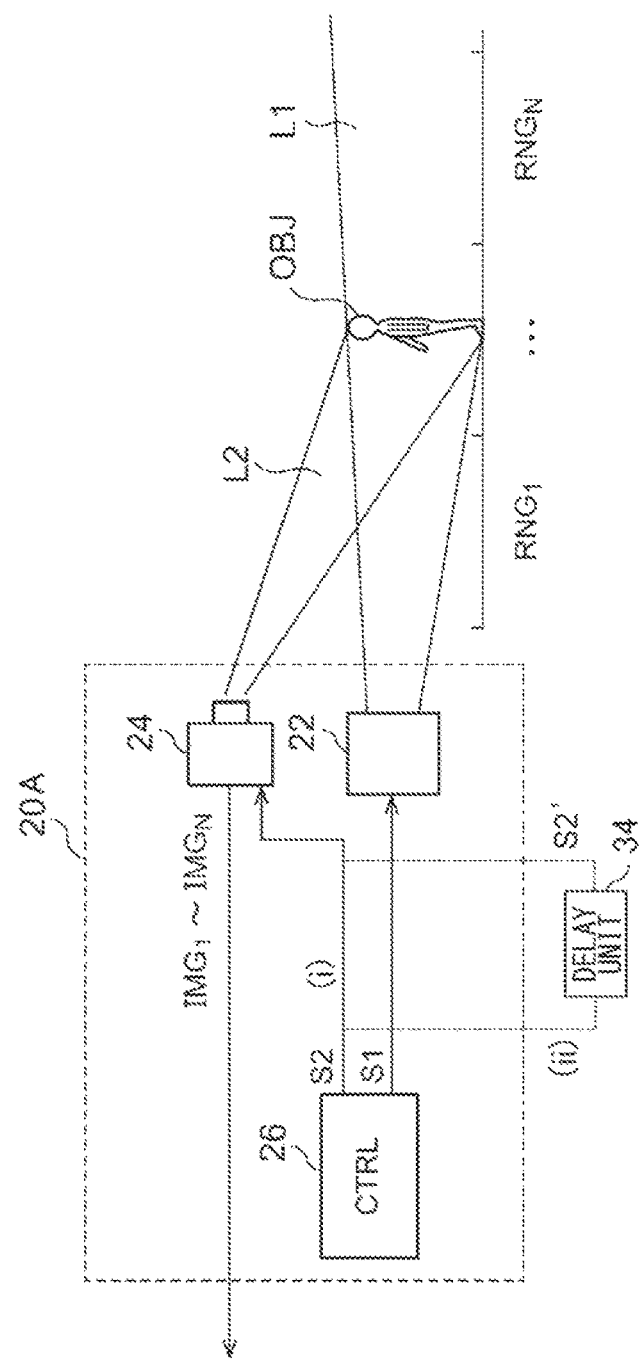
FIG. 53 is a block diagram showing a gating camera according to an embodiment 5-2.

FIG. 53 is a block diagram showing a gating camera 20A according to an embodiment 5-2. In the embodiment 5-2, the gating camera 20A is configured such that, in the testing process, a positive offset can be applied to the time difference $\Delta t$ between the light emission timing signal S1 and the image capture timing signal S2. The positive offset can be applied by delaying the image capture timing signal S2 generated as a subsequent timing signal.

In order to provide the positive offset $\tau$, the gating camera 20A is provided with a delay unit 28 configured as an external component, or includes such a delay unit 28 as a built-in component. In the normal image capture operation, the delay unit 28 has no effect on the image capture. That is to say, the image capture timing signal S2 generated by the controller 26 is supplied to the image sensor 24 as it is (path i). On the other hand, in the testing process, the image capture timing signal S2 generated by the controller 26 is delayed by the time $\tau$ that corresponds to the offset by means of the delay unit 34. The delayed image capture timing signal S2' is supplied to the image sensor 24 (path ii).

Figure 54:
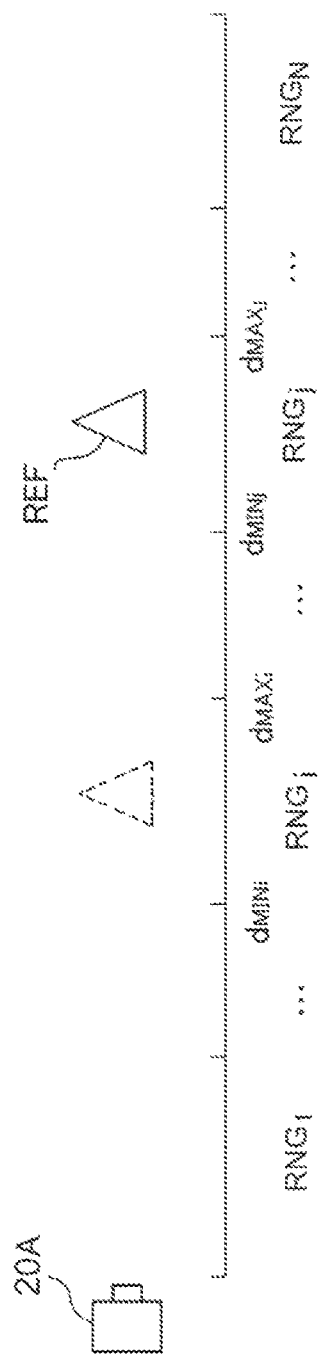
FIG. 54 is a diagram showing the layout of the gating camera and reference reflector REF.

Next, description will be made regarding the testing of the gating camera 20A. FIG. 54 is a diagram showing a layout of the gating camera 20A and the reference reflector REF in the testing process. In this example, testing is made regarding whether or not an image has been captured normally for the i-th range $RNG_i$. The reference reflector REF is arranged in the j-th range $RNG_j$ that is at a far distance as compared with the i-th range $RNG_i$. The controller 26 of the gating camera 20A is set to a state in which an image can be captured for the i-th range $RNG_i$. That is to say, the controller 26 outputs the light emission timing signal $S1_i$ and the image capture timing signal $S2i$. In this case, the positive offset $+\tau$ is applied to the time difference $\Delta t_i$ between the light emission timing signal $S1_i$ and the image capture timing signal $S2i$. The offset amount t is represented by $\tau = (d_{MINj} - d_{MINi})/c \times 2$.

Figure 55:
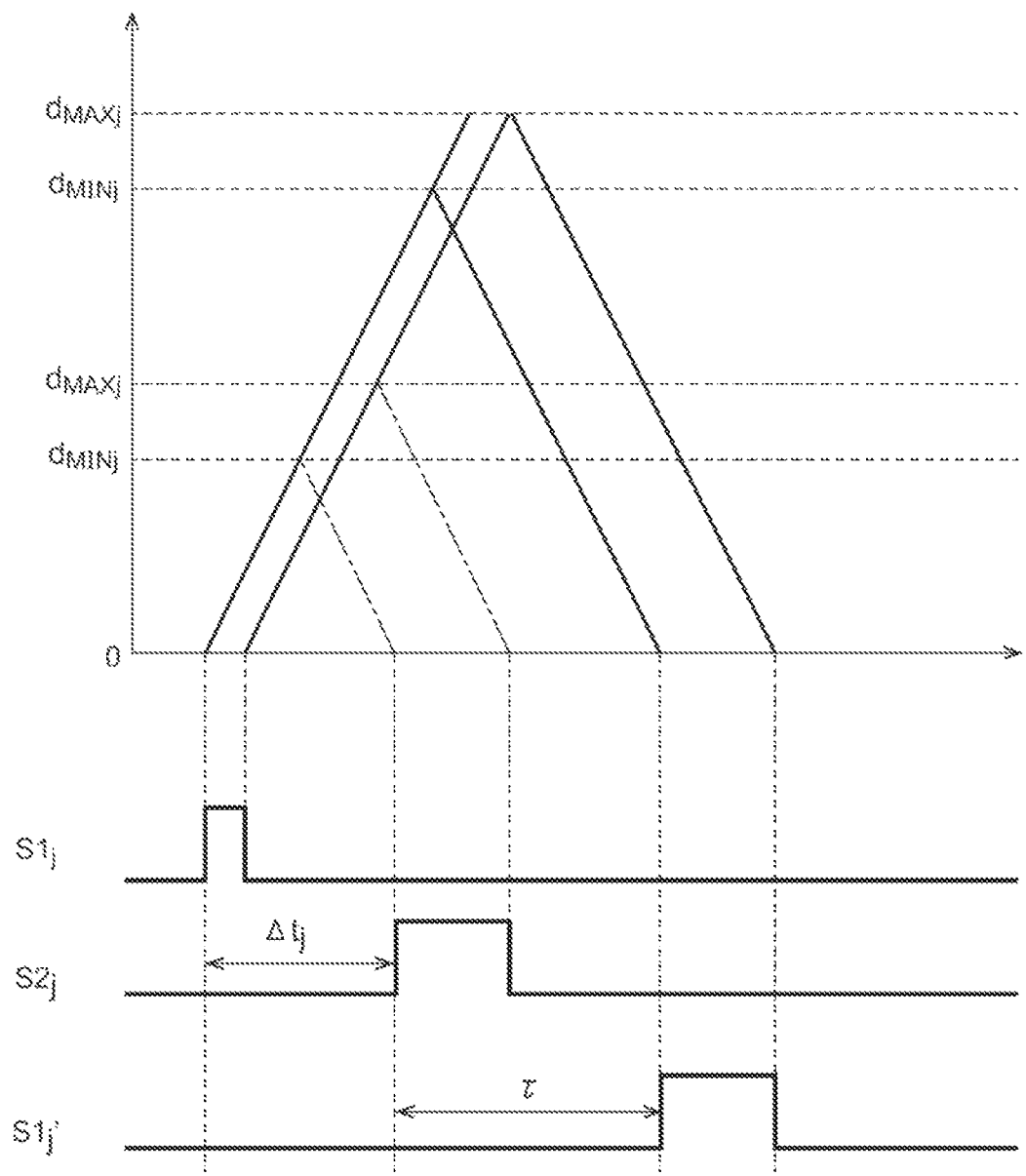
FIG. 55 is a diagram for explaining the testing of the gating camera shown in FIG. 53.

FIG. 55 is a diagram for explaining the testing of the gating camera 20A shown in FIG. 53. The time difference between the light emission timing signal $S1_i$ and the image capture timing signal $S2i$ is represented by $\Delta t_i$. The image capture signal $S2i$ is delayed by t by means of the delay unit 28. With this, the time difference between the light emission timing signal $S1_i$ and the delayed image capture timing signal $S2_i'$ is represented by $\Delta t_i + \tau$.

In the testing process, the image capture is executed based on the delayed image capture timing signal $S2_i'$ instead of the image capture timing signal $S2_i$. As a result, when the slice image $IMG_i$ thus captured includes an image of the reference reflector REF, judgment is made that the gating camera 20A operates normally. Otherwise, judgement is made that the gating camera 20A operates abnormally.

With the gating camera 20A shown in FIG. 53, the positive offset $+\tau$ can be applied to the time difference $\Delta t_i$ between the light emission timing signal $S1_i$ and the image capture timing signal $S2_i$. This arrangement is capable of capturing an image of the reference object REF that exists in the range $RNG_j$ that is at a far distance as compared with the focus range $RNG_i$.

Figure 56:
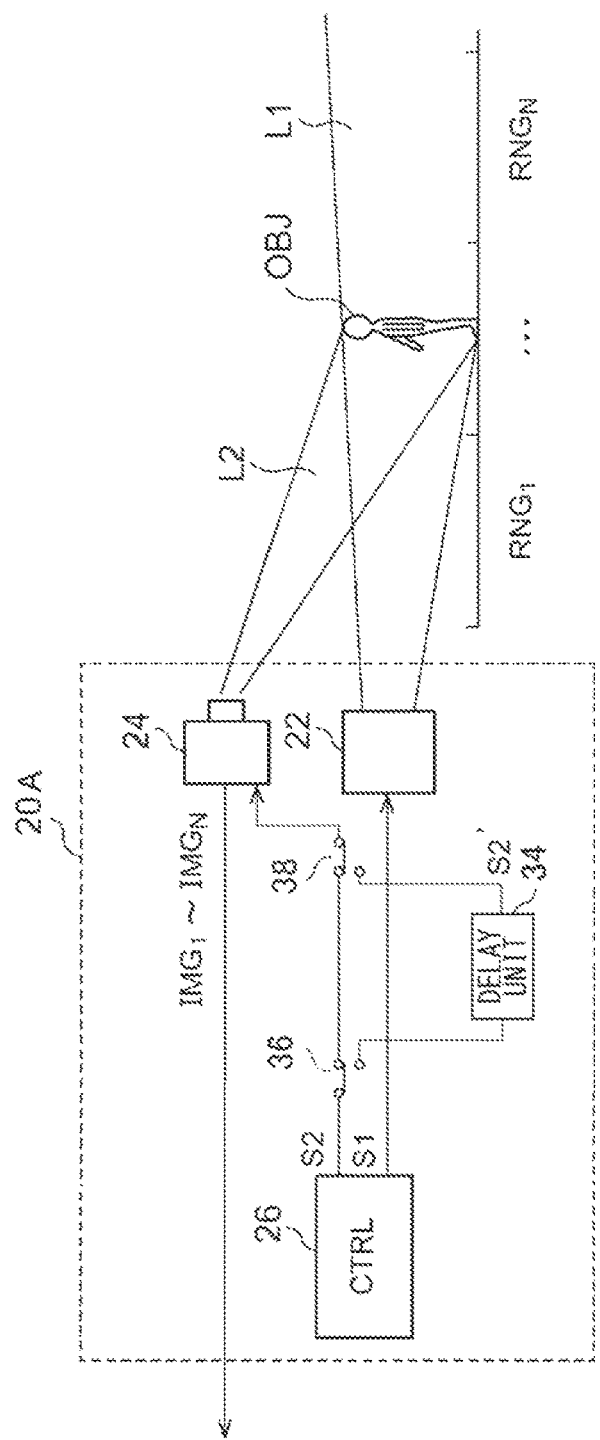
FIG. 56 is a first example configuration of the gating camera shown in FIG. 53.

FIG. 56 is a diagram showing a first example configuration of the gating camera 20A shown in FIG. 53. The gating camera 20A includes the delay unit 34 as a built-in component. For example, the gating camera 20A includes selectors 36 and 38 respectively configured as an upstream stage and a downstream stage of the delay unit 34. In the normal image capture operation (non-testing process), the delay unit 34 is bypassed by the selectors 36 and 38 so as to directly supply the image capture timing signal S2 to the image sensor 24. In the testing process, the image capture timing signal S2 is transmitted via the delay unit 34 by means of the selectors 36 and 38, thereby supplying the delayed image capture timing signal S2' to the image sensor 24.

Figure 57:
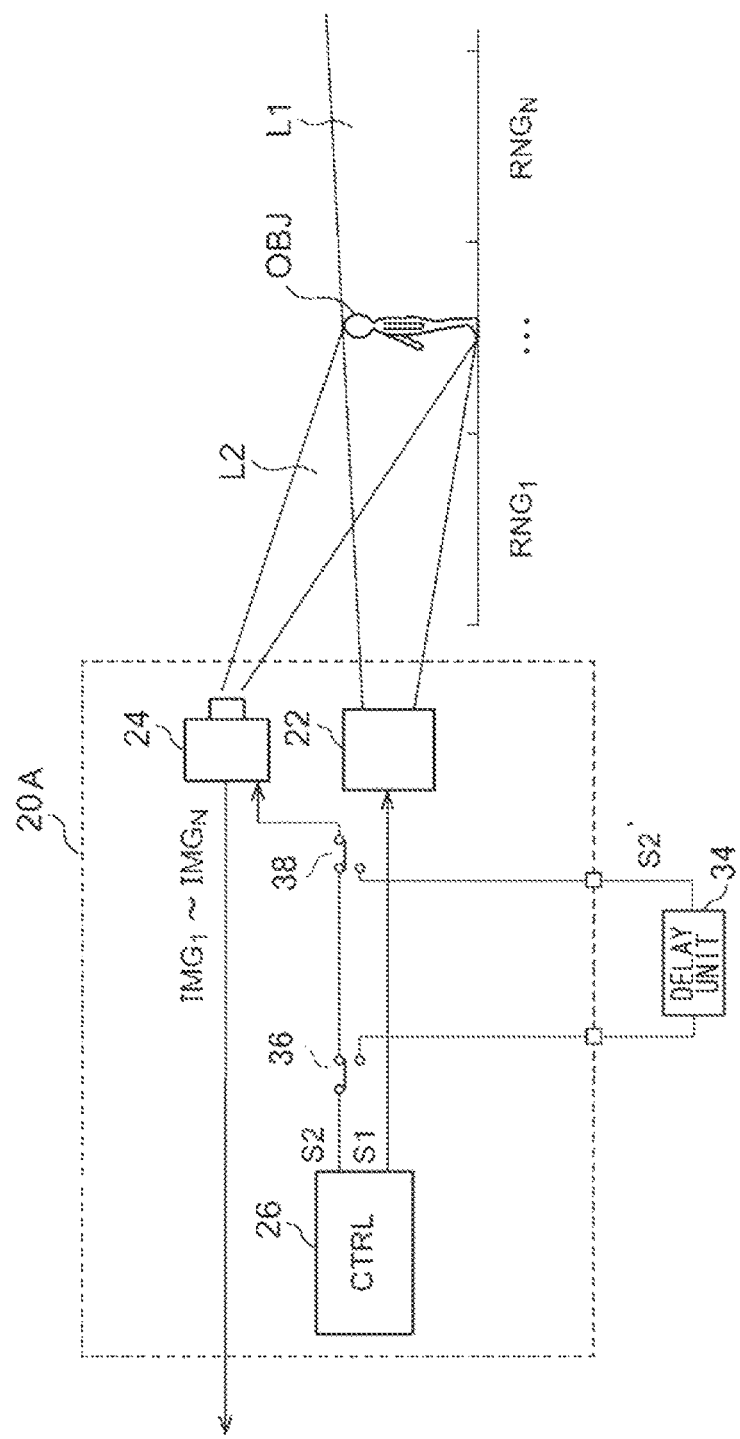
FIG. 57 is a second example configuration of the gating camera shown in FIG. 53.

FIG. 57 is a diagram showing a second example configuration of the gating camera 20A shown in FIG. 53. The point of difference between the gating cameras 20A shown in FIGS. 57 and 56 is that, in the gating camera 20A shown in FIG. 57, the delay unit 34 is detachably mounted on the gating camera 20A.

Embodiment 5-3

Figure 58:
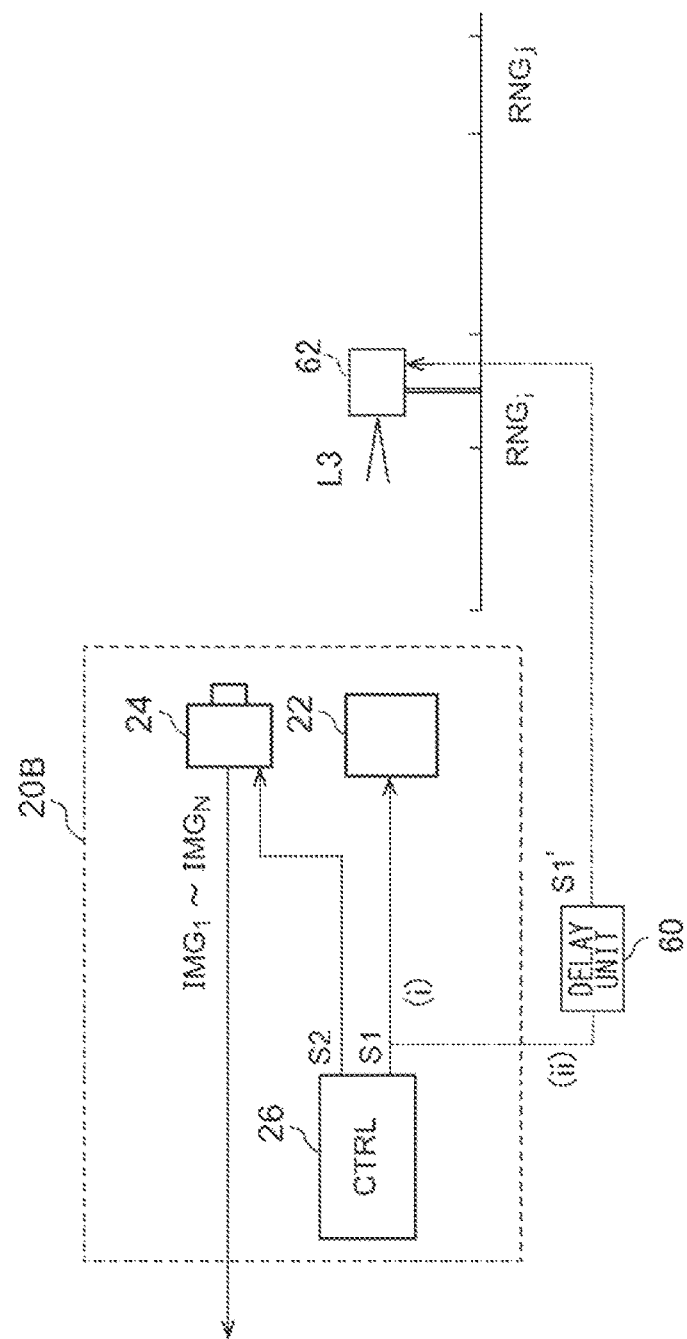
FIG. 58 is a diagram showing a gating camera according to an embodiment 5-3.

FIG. 58 is a diagram showing a gating camera 20B according to an embodiment 5-3. The gating camera 20B includes an illumination apparatus 22, an image sensor 24, and a controller 26. The gating camera 20B is configured such that, in the testing process, the light emission timing signal S1 can be output via an external delay unit 60 to an external reference light source 62. With the embodiment 5-3, in the testing process, the illumination apparatus 22 is not used. In this state, testing is executed regarding whether or not the image sensor 24 and the controller 26 operate normally. The reference light source 62 is arranged such that it faces the gating camera 20B. The reference light source 62 emits light according to the delayed light emission timing signal S1'. The above is the configuration of the gating camera 20B.

The gating camera 20B provides substantially the same operation as that shown in FIG. 46. The point of difference from that shown in FIG. 46 is that the external reference light source 62 is employed instead of the reference reflector REF. Furthermore, in the testing process, the illumination apparatus 22 is set to a non-emission mode. The reference light source 62 is arranged in the i-th range $RNG_i$. The j-th range $RNG_j$ is the focus of the gating camera 20B.

In FIG. 58, the light path length of the emitted light L3 from the reference light source 62 is half the light path length in a case in which the probe light L1 is emitted from the illumination apparatus 22, and reflected light L2 returns by reflection. Accordingly, the delay amount t of the delay unit 60 is represented by $\tau=(d_{MINj}-d_{MINi})/c$.

As a result of image capture, when the slice image $IMG_j$ thus captured includes an image of the emitted light from the reference light source 62, judgment is made that the gating camera 20B operates normally.

It should be noted that the same testing system can be built using the gating camera 20 shown in FIG. 52 as the system using the gating camera 20B shown in FIG. 58.

Embodiment 5-4

Figure 59:
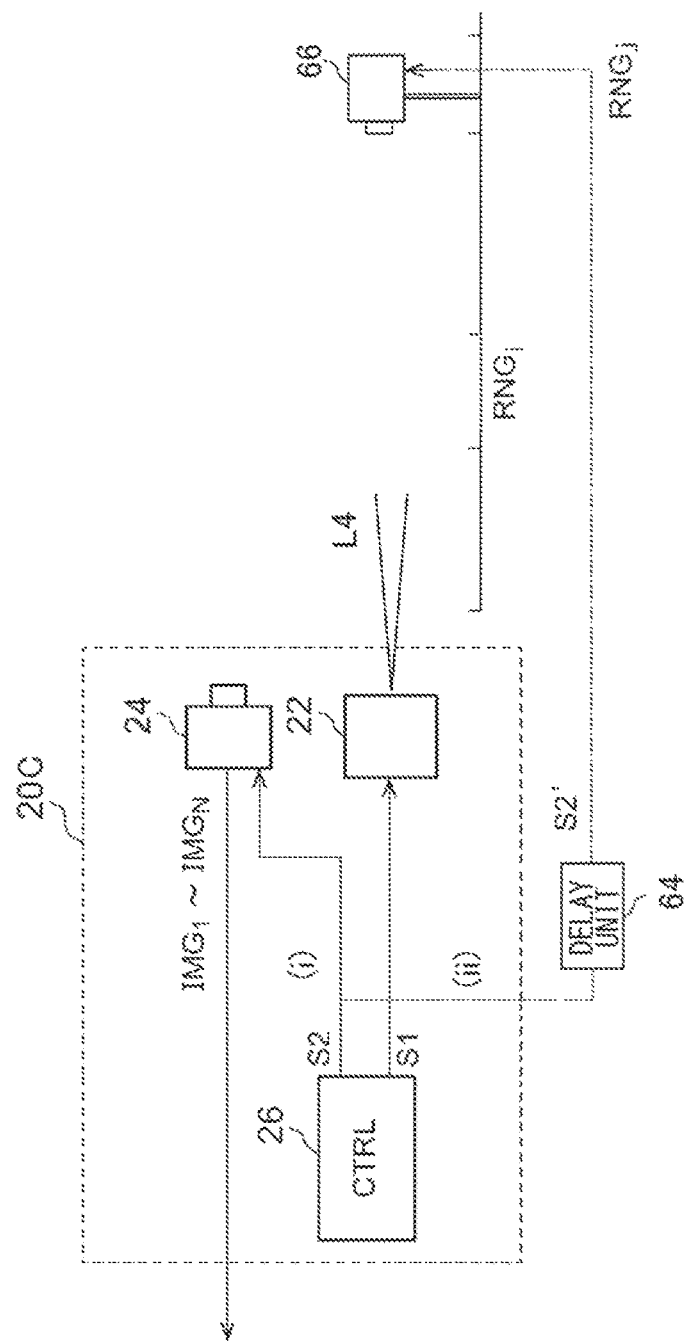
FIG. 59 is a diagram showing a gating camera according to an embodiment 5-4.

FIG. 59 is a diagram showing a gating camera 20C according to an embodiment 5-4. The gating camera 20C includes an illumination apparatus 22, an image sensor 24, and a controller 26. The gating camera 20C is configured such that, in the testing process, the light emission timing signal S2 can be output via an external delay unit 64 to an external reference camera 66. With the embodiment 5-4, in the testing process, the image sensor 24 is not used. In this state, testing is executed regarding whether or not the illumination apparatus 22 and the controller 26 operate normally. The reference camera 66 is arranged such that it faces the gating camera 20C. The reference camera 66 captures an image of the emitted light L4 from the illumination apparatus 22 based on the delayed image capture timing signal S2'. The above is the configuration of the gating camera 20C.

Description will be made regarding the testing of the gating camera 20C. In the testing process, the image sensor 24 is not used. The reference camera 66 is arranged in the j-th range $RNG_j$. The gating camera 20C is set to a state in which it is able to measure the i-th range $RNG_i$.

In FIG. 59, the light path length of the emitted light L4 from the illumination apparatus 22 is half the light path length in a case in which, as shown in FIG. 46, the probe light L1 is emitted from the illumination apparatus 22, and reflected light L2 returns by reflection. Accordingly, the delay amount τ of the delay unit 64 is represented by $\tau=(d_{MINj}-d_{MINi})/c$.

As a result of image capture, when the output image of the reference camera 66 includes an image of the emitted light from the illumination apparatus 22, judgment is made that the gating camera 20C operates normally.

It should be noted that the same testing system can be built using the gating camera 20A shown in FIG. 57 as the system using the gating camera 20C shown in FIG. 59.

Usage

Figure 60:
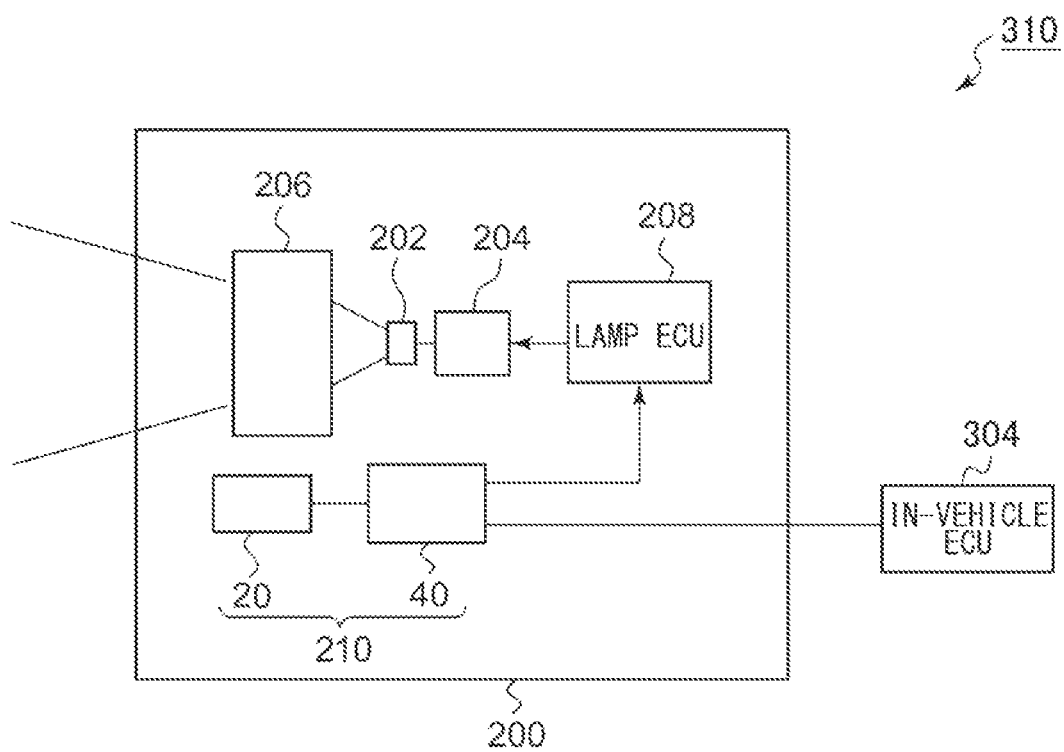
FIG. 60 is a block diagram showing an automotive lamp provided with an object detection system.

FIG. 60 is a block diagram showing the automotive lamp 200 provided with the object detection system 210. The automotive lamp 200 forms the lamp system 310 together with the in-vehicle ECU 304. The automotive lamp 200 includes a light source 202, a lighting circuit 204, and an optical system 206. Furthermore, the automotive lamp 200 is provided with the object detection system 210. The object detection system 210 includes the gating camera 20 described above and a processing device 40.

The processing device 40 is configured to identify the kind of an object based on the multiple slice images $IMG_1$ through $IMG_N$ that correspond to the range $RNG_1$ through $RNG_N$ generated by the gating camera 20. The processing device 40 is provided with the classifier 42 implemented based on a prediction model generated by machine learning. The algorithm employed by the classifier 42 is not restricted in particular. Examples of the algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The processing device 40 may be configured as a combination of a processor (hardware component) such as a Central Processing Unit (CPU), Micro Processing Unit (MPU), microcontroller, or the like, and a software program to be executed by the processor (hardware component). Also, the processing device 40 may be configured as a combination of multiple processors. Alternatively, the processing device 40 may be configured as a hardware component alone.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

Embodiment 6

First, description will be made regarding problems relating to an embodiment 6. As a result of investigating an arrangement in which multiple slice images captured by a gating camera are combined so as to generate a single image, the present inventors have recognized the following problems.

FIGS. 61A and 61B are diagrams for explaining the problems relating to image combining. FIG. 61A shows multiple slice images $IMG_1$ through $IMG_N$. Here, for ease of understanding, description will be made assuming that the images are each configured as a one-dimensional image plotted with the pixel position as the horizontal axis and with the pixel value as the vertical axis. In this example, description will be made assuming that an object exists only in the i-th range. Accordingly, the i-th slice image $IMG_i$ includes an image of the object. If light (disturbance light) that differs from the probe light is input to the infrared camera, this light is recorded as a noise component. The noise component is included in all the slice images. FIG. 61B shows an image obtained by combining the multiple slice images by simple addition. In a case in which the slice images are combined in such a simple manner, this leads to drastic degradation of the S/N ratio.

It should be noted that such problems described above are by no means within the scope of common and general knowledge of those skilled in this art. Furthermore, it can be said that the knowledge described above has been uniquely recognized by the present inventors.

The present invention relating to an embodiment 6 has been made in view of such a situation. Accordingly, it is an exemplary purpose of an embodiment of the present invention to provide an image capture apparatus that is capable of generating a combined image with improved image quality.

Overview of Embodiment 6

An embodiment disclosed in the present specification relates to an image capture apparatus. The image capture apparatus incudes: a gating camera structured to divide a field of view in a depth direction into multiple ranges, to capture an image for each range while changing a time difference between light emission and exposure, and to generate multiple slice images that correspond to the multiple ranges; and an image processing device structured to combine the multiple slice images so as to generate a combined image. The image processing device is structured to detect a no-object-existing region in which no object exists for each of the multiple slice images, to apply noise reduction processing to the no-object-existing region, and to combine the multiple slice images thus subjected to the noise reduction processing.

With such an arrangement in which multiple slice images are combined after noise is removed from the no-object-existing region, this provides the combined image with improved image quality.

Also, when the image processing device detects an object-existing region in which an object exists in a given slice image, the image processing device may judge that a region in a different slice image that overlaps the object-existing region thus detected is a no-object-existing region. In principle, the gating camera is configured to detect the reflected light from an object positioned at the nearest distance in the depth direction. Accordingly, in a case in which the ranges are designed such that they do not overlap in the depth direction, when reflection is detected from an object in a region of a given slice image, an image detected in the same region in a different slice image is regarded as a noise image. This allows such a noise image to be removed.

Also, the image capture apparatus may set pixel values of multiple pixels included in the no-object-existing region to zero.

Also, when multiple pixels having pixel values that are larger than a threshold value consecutively exist, the image processing device may judge a region including these pixels to be a region in which an object exists.

Description will be made below regarding an embodiment 6 with reference to the drawings.

Embodiment 6-1

Figure 62:
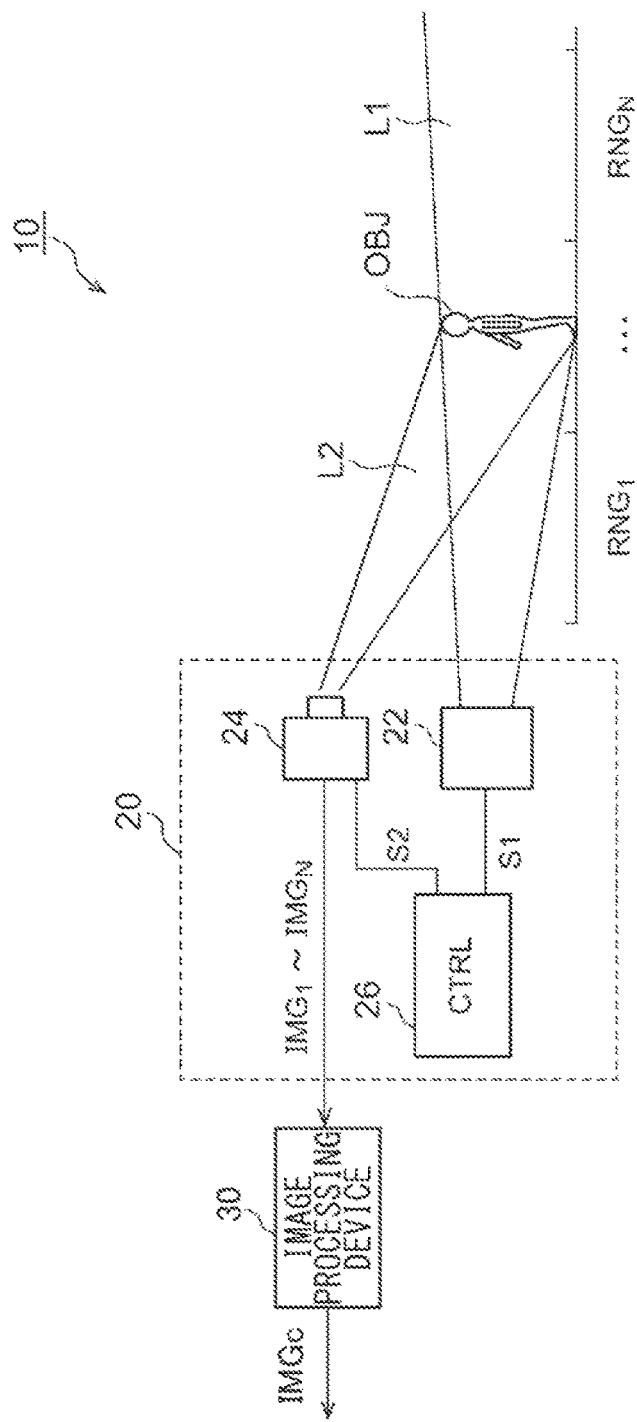
FIG. 62 is a diagram showing an image capture apparatus according to an embodiment 6-1.

FIG. 62 is a block diagram showing an image capture apparatus 10 according to an embodiment 6-1. The image capture apparatus 10 includes a gating camera 20 and an image processing device 30. For example, the image capture apparatus 10 is mounted on a vehicle such as an automobile, motorcycle, or the like. The image capture apparatus 10 captures an image of an object OBJ that exists in the vicinity of the vehicle.

The image capture apparatus 10 mainly include a gating camera 20 and an image processing device 30. The gating camera 20 includes an illumination apparatus 22, an image sensor 24, and a controller 26. The gating camera 20 captures images for a plurality of N (N≥2) ranges $RNG_1$ through $RNG_N$ divided in the depth direction. The ranges may be designed such that adjacent ranges overlap at their boundaries in the depth direction.

The illumination apparatus 22 emits probe light L1 in front of the vehicle in synchronization with a light emission timing signal S1 supplied from the controller 26. As the probe light L1, infrared light is preferably employed. However, the present invention is not restricted to such an arrangement. Also, visible light having a predetermined wavelength may be employed. Also, ultraviolet light may be employed.

The image sensor 24 is configured to support exposure control in synchronization with an image capture timing signal S2 supplied from the controller 26, and to output a slice image IMG. The image sensor 24 is sensitive to the same wavelength as that of the probe light L1. The image sensor 24 captures an image of reflected light (returned light) L2 reflected by the object OBJ.

The controller 26 changes the light emission timing signal S1 and the image capture timing signal S2 for each range RNG, so as to change the difference in the timing between the light emission operation of the illumination apparatus 22 and the exposure operation of the image sensor 24. The gating camera 20 generates the slice images $IMG_1$ through $IMG_N$ that correspond to the multiple ranges $RNG_1$ through $RNG_N$. Accordingly, in principle, the i-th slice image $IMG_i$ includes only an image of an object included in the corresponding range $RNG_i$.

Figure 63:
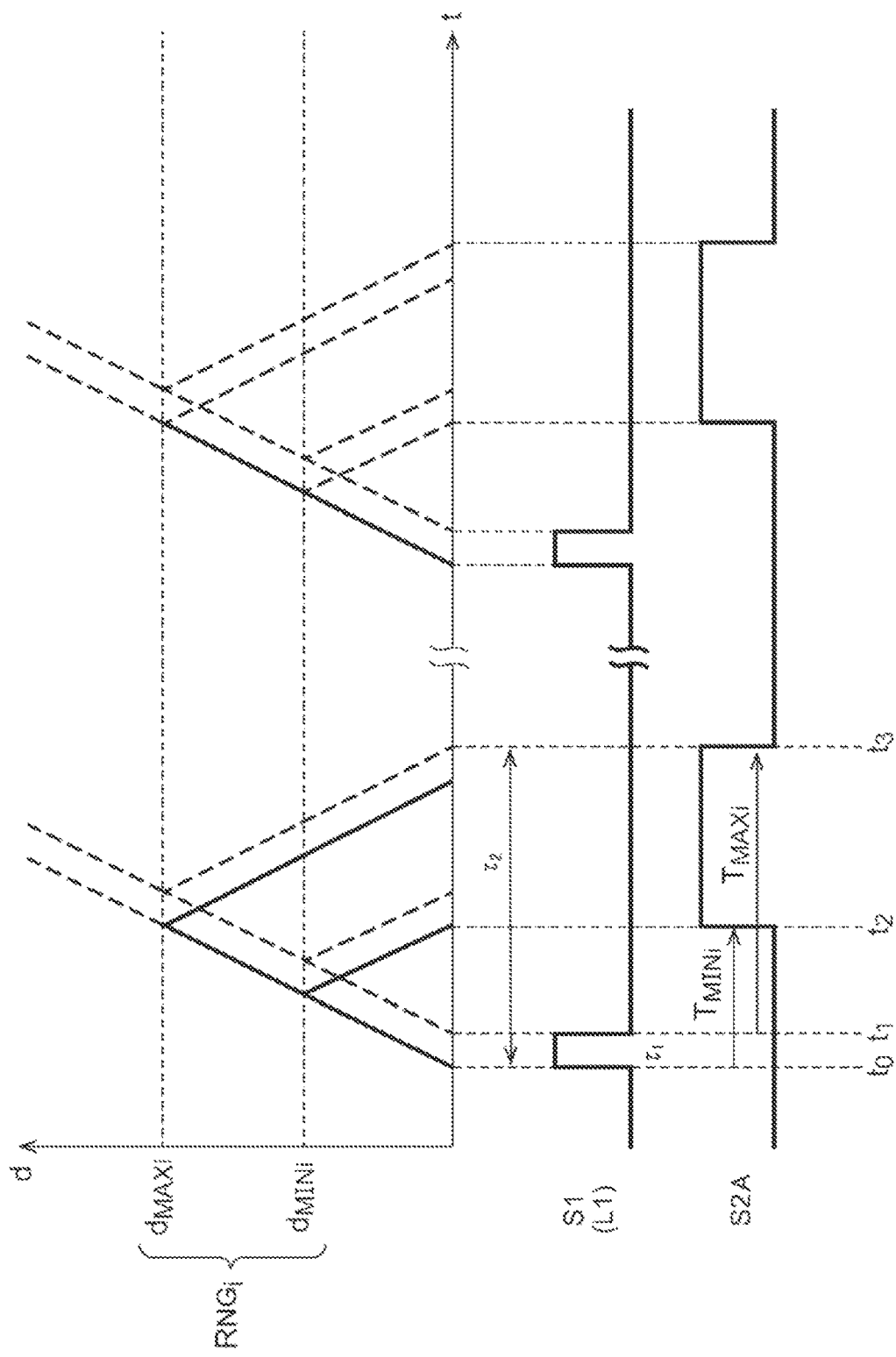
FIG. 63 is a diagram for explaining the operation of the gating camera.

FIG. 63 is a diagram for explaining the basic operation of the gating camera 20. FIG. 63 shows the operation when the i-th range $RNG_i$ is measured. The illumination apparatus 22 emits light during a light-emitting period τi from the time points $t_0$ to $t_1$ in synchronization with the light emission timing signal S1. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the illumination apparatus 22 at a given time point, to the arrival of the light at the distance $d_{MINi}$, up to the return of the reflected light to the image sensor 24, is represented by $T_{MINi}=2\times d_{MINi}/c$. Here, c represents the speed of light.

Similarly, the round-trip time $T_{MAXi}$, which is a period from the departure of light from the illumination apparatus 22 at a given time point, to the arrival of the light at the distance $d_{MAXi}$, up to the return of the reflected light to the image sensor 24, is represented by $T_{MAXi}=2\times d_{MAXi}/c$.

When only an image of an object OBJ included in the range $RNG_i$ is to be captured, the controller 26 generates the image capture timing signal S2 so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times. In this case, preferably, the controller 26 may repeatedly execute the above-described exposure operation multiple times with a predetermined period $\tau_2$.

Figure 64A:
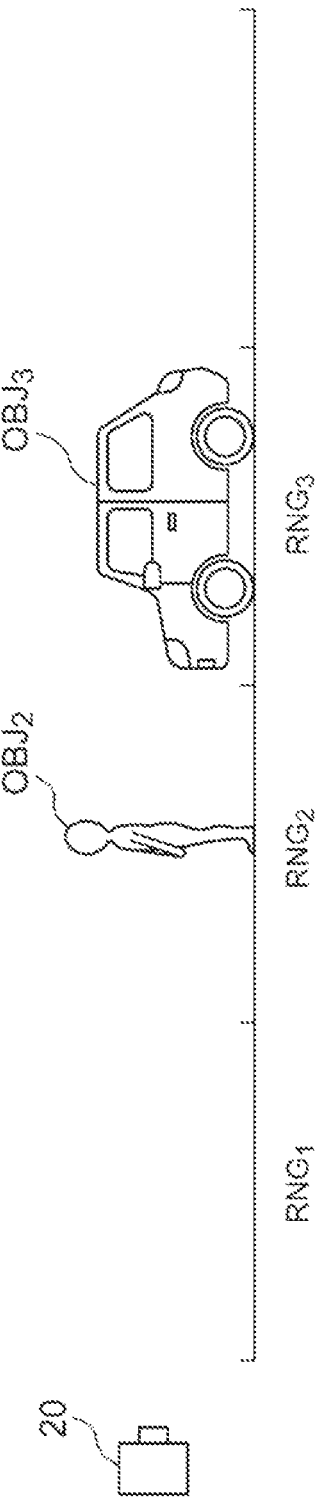
FIGS. 64A and 64B are diagrams for explaining the images generated by the gating camera.
Figure 64B:
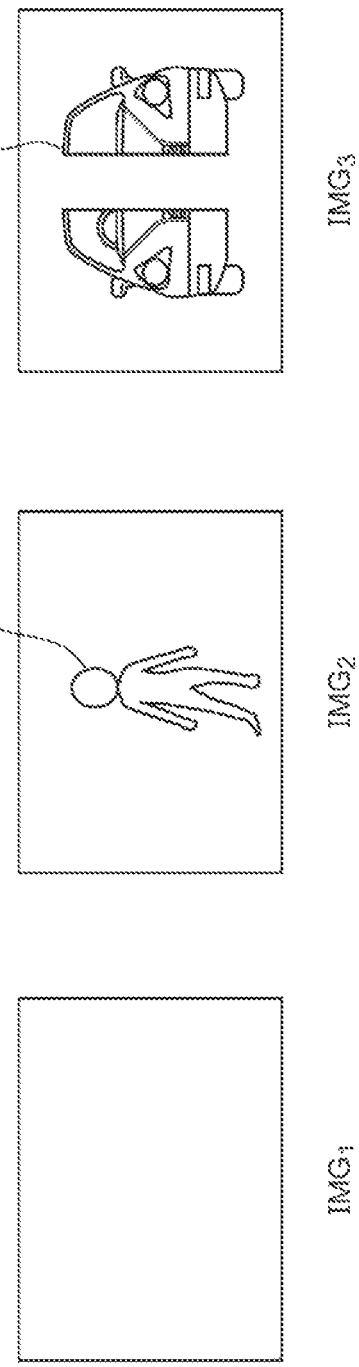

FIGS. 64A and 64B are diagrams for explaining an image generated by the gating camera 20. FIG. 64A shows an example in which an object (pedestrian) $OBJ_2$ exists in the range $RNG_2$, and an object (vehicle) $OBJ_3$ exists in the range $RNG_3$. FIG. 64B shows multiple slice images $IMG_1$ through $IMG_3$ acquired in the situation shown in FIG. 64A. When the slice image $IMG_1$ is captured, the image sensor is exposed by only the reflected light from the range $RNG_1$. Accordingly, the slice image $IMG_1$ includes no object image.

When the image $IMG_2$ is captured, the image sensor is exposed by only the reflected light from the range $RNG_2$. Accordingly, the image $IMG_2$ includes only the object image $OBJ_2$. Similarly, when the image $IMG_3$ is captured, the image sensor is exposed by only the reflected light from the range $RNG_3$. Accordingly, the image $IMG_3$ includes only the object image $OBJ_3$. As described above, with the gating camera 20, this arrangement is capable of capturing object images in the form of separate images for the respective ranges.

Returning to FIG. 61, the processing device 30 combines the multiple slice images $IMG_1$ through $IMG_N$ that correspond to the multiple ranges $RNG_1$ through $RNG_N$, which are captured by the gating camera 20, so as to generate a combined image IMGc.

The image processing device 30 judges a region (no-object-existing region) in which no object exists for each of the multiple slice images $IMG_1$ through $IMG_N$. For example, for each slice image IMG #, when pixels having a pixel value that is larger than a predetermined threshold value consecutively exist, the image processing device 30 may judge a region including such pixels to be an object-existing region. Furthermore, the image processing device 30 judges the regions other than the object-existing region to be no-object-existing regions. Alternatively, the image processing device 30 may execute edge extraction for each slice image $IMG_\#$. With this, the image processing device 30 may judge that a region surrounded by an edge is an object-existing region. Conversely, the image processing device 30 may judge the area outside the edge to be a no-object-existing region.

The image processing device 30 applies noise reduction processing to the no-object-existing region for each of the multiple slice images $IMG_1$ through $IMG_N$.

For example, as the noise removal, the pixel values of the no-object-existing region may be set to zero for each slice image $IMG_j$. Alternatively, the image processing device 30 may multiply the pixel values of the no-object-existing region by a factor that is smaller than 1. The slice image thus subjected to noise removal is represented by $IMGa_j$.

Subsequently, the image processing device 30 combines the multiple slice images $IMGa_1$ through $IMGa_N$ thus subjected to noise removal so as to generate a combined image IMGc.

Figure 65:
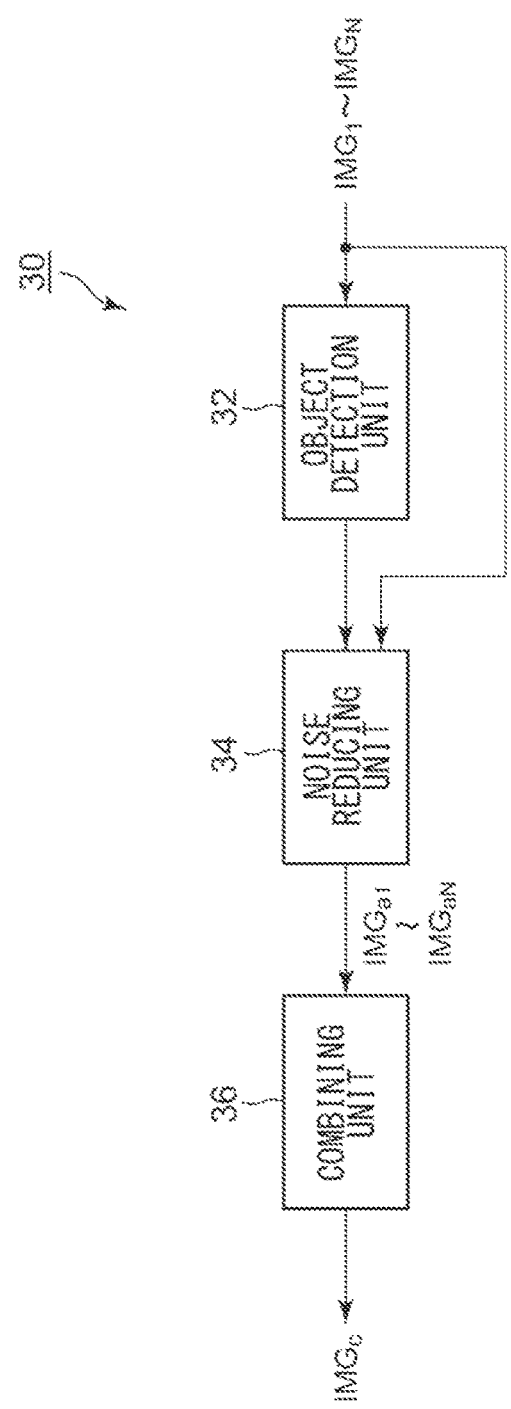
FIG. 65 is a function block diagram showing an image processing device.

FIG. 65 is a function block diagram showing the image processing device 30. The image processing device 30 includes an object detection unit 32, a noise reducing unit 34, and a combining unit 36. The object detection unit 32 detects the object-existing region and the no-object-existing region for each of the multiple slice images $IMG_1$ through $IMG_N$. The object detection unit 32 supplies information that indicates the no-object-existing region for each slice image to the noise reducing unit 34. The noise reducing unit 34 applies noise reduction processing to the no-object-existing regions for each of the multiple slice images $IMG_1$ through $IMG_N$. The combining unit 36 combines the slice images $IMGa_1$ through $IMGa_N$ thus subjected to the noise reduction processing, so as to generate a combined image.

The image processing device 30 may be configured as a hardware component such as a field programmable gate array (FPGA), application specified IC (ASIC), or the like. Alternatively, the image processing device 30 may be configured as a combination of a processor (hardware component) such as a Central Processing Unit (CPU), Micro Processing Unit (MPU), microcontroller, or the like, and a software program to be executed by the processor (hardware component). Also, the image processing device 30 may be configured as a combination of multiple processors.

Figure 66:
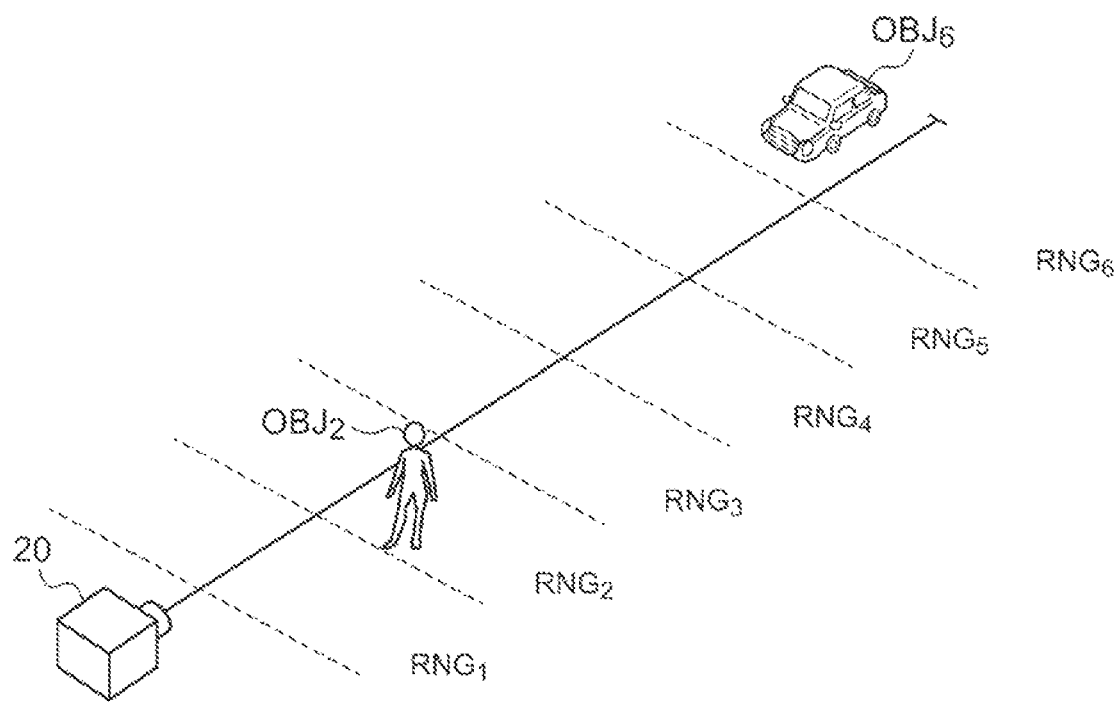
FIG. 66 is a perspective view of an image capture situation.

The above is the configuration of the image capture apparatus 10. Next, description will be made regarding the image capture apparatus 10. FIG. 66 is a perspective view showing an image capture situation. Description will be made below assuming that the number N of the ranges is six. Description will be made regarding an example in which an object (human) $OBJ_2$ and an object (automobile) $OBJ_6$ exist in the ranges $RNG_2$ and $RNG_6$, respectively.

Figure 67A:
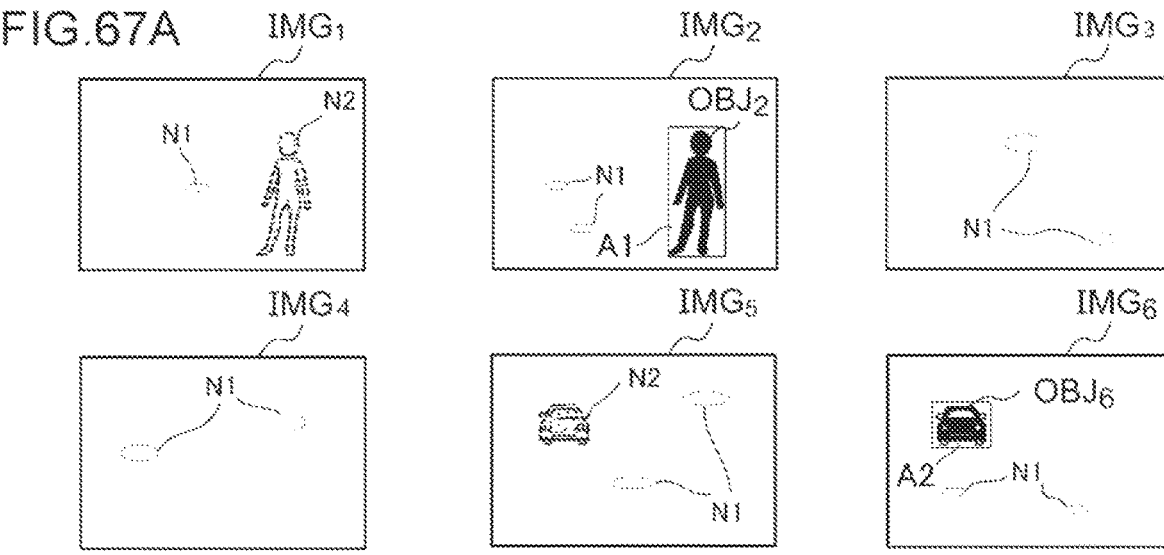
FIGS. 67A through 67C are diagrams for explaining image combination processing by the image processing device.
Figure 67B:
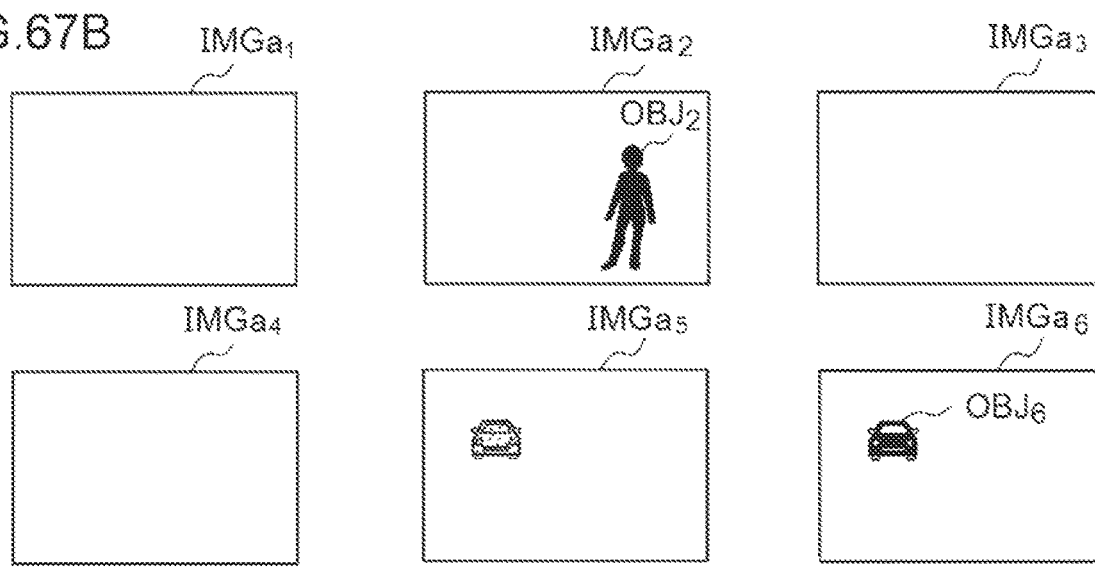
Figure 67C:
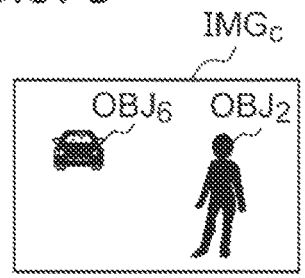

FIG. 67A through 67C are diagrams for explaining the combining processing by the image processing apparatus 30. FIG. 67A shows the multiple slice images $IMG_1$ through $IMG_6$ acquired in the situation shown in FIG. 66. Here, "N1" indicates noise due to extraneous light. "N2" indicates noise due to an object included in the adjacent range.

Directing attention to the slice image $IMG_2$, the slice image $IMG_2$ includes a clear object image of the object $OBJ_2$. The region including the object image $OBJ_2$ is judged to be an object-existing region A1. Furthermore, the area outside the object-existing region A1 is judged to be a no-object-existing region. In the same manner, directing attention to the slice image $IMG_6$, the slice image $IMG_6$ includes a clear object image of the object $OBJ_6$. The region including the object image $OBJ_6$ is judged to be an object-existing region A2. Furthermore, the area outside the object-existing region A2 is judged to be a no-object-existing region.

Directing attention to the slice images $IMG_3$ and $IMG_4$, there is no region in which the pixel values thereof exceed a threshold value. Furthermore, no edge is detected. Accordingly, judgment is made that the entire region is a no-object-existing region.

Directing attention to the slice image $IMG_1$, the slice image $IMG_1$ includes an image of the noise N2 that occurs due to the object $OBJ_2$ included in the adjacent range. In this example, the pixel values of the noise N2 region are sufficiently small. Furthermore, no edge is detected. Accordingly, the noise N2 region is judged to be a no-object-existing region. The same can be said of the slice image $IMG_5$. That is to say, the noise N2 region is judged to be a no-object-existing region.

FIG. 67B shows the slice images $IMGa_1$ through $IMGa_6$ subjected to the noise reduction processing. The pixel values of the no-object-existing regions are set to zero for each slice image IMGa, thereby removing the noise components N1 and N2.

FIG. 67C shows the combined image IMGc obtained by combining the slice images $IMGa_1$ through $IMGa_6$ thus subjected to the noise reduction. As shown in FIG. 67C, with the image capture apparatus 10, the noise N1 due to the extraneous light can be removed. Furthermore, this also allows the noise N2 due to an object in the adjacent range to be removed.

Figure 68A:
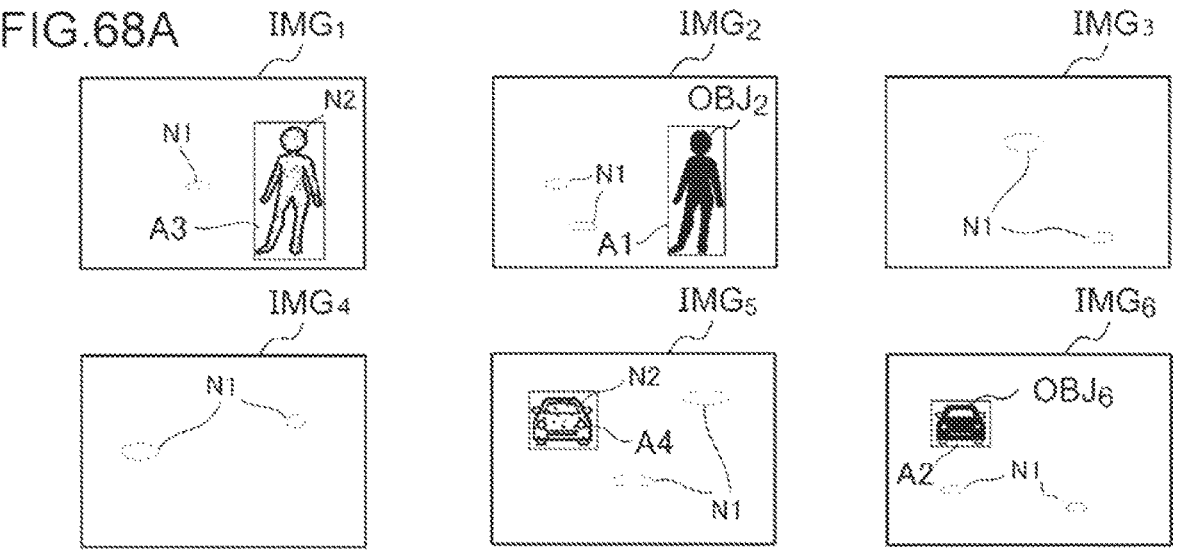
FIGS. 68A through 68C are diagrams each showing another example of the operation of an image capture apparatus according to an embodiment 6-1.
Figure 68B:
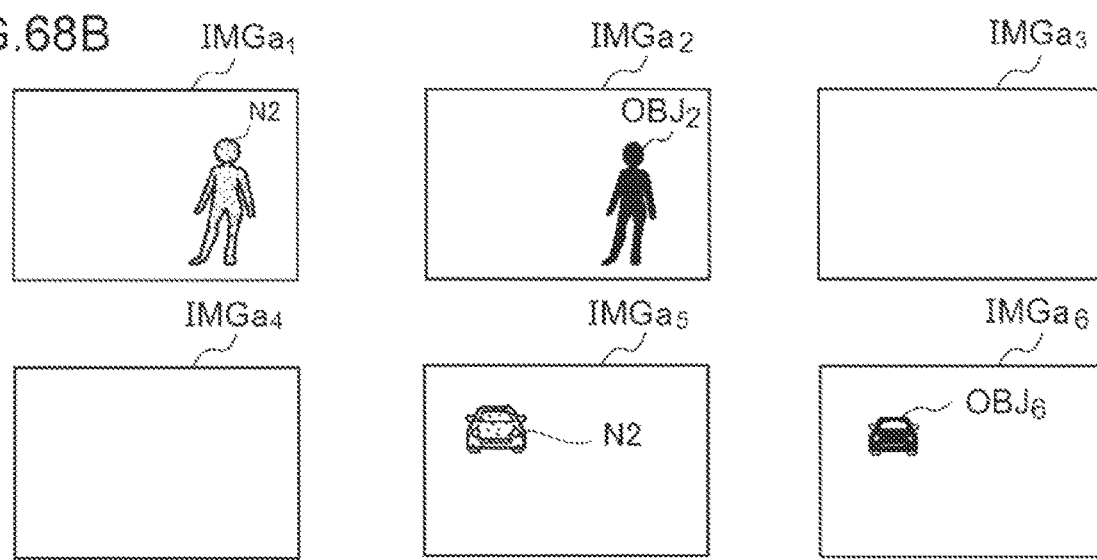
Figure 68C:
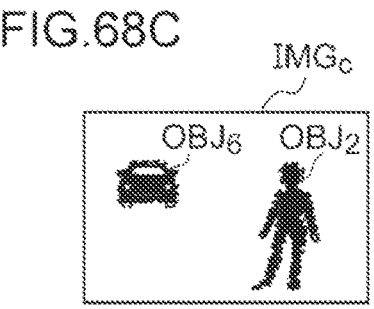

Referring to FIGS. 68A through 68C, description will be made regarding problems that can occur in the processing provided by the embodiment 6-1. FIGS. 68A through 68C are diagrams showing another example of the operation of the image capture apparatus 10 according to the embodiment 6-1.

FIG. 68A shows the slice images $IMG_1$ through $IMG_6$ acquired in the situation shown in FIG. 66 as with the example shown in FIG. 67A. Directing attention to the slice image $IMG_1$, the slice image $IMG_1$ includes the noise N2 due to the object $OBJ_2$ in the adjacent range that is stronger than that in FIG. 67A. Description will be made assuming that the pixel values of the noise N2 region are large to an extent that allows an edge to be detected. In this case, the region including the noise N2 is falsely judged to be an object-existing region A3. The same can be said of the slice image $IMG_5$. That is to say, the region including the noise N2 is falsely judged to be an object-existing region A4.

As a result, in FIG. 68B, the noise N2 remains in each of the slice images $IMGa_1$ and $IMG_5$ thus subjected to the noise reduction processing. As a result, in some cases, the combined image shown in FIG. 68C has a problem of the occurrence of a blurred edge in an object image or a problem of degraded image contrast. In order to solve this problem, there is a need to carefully determine the threshold value to be used for detection of an object-existing region. In a case in which the threshold value is designed to be an excessively large value, such an arrangement has the potential to lead to false judgment of a noise region although an actual object exists.

Embodiment 6-2

With an embodiment 6-2, the problems that occur in the embodiment 6-1 are solved. The image capture apparatus 10 has the same overall configuration as that shown in FIG. 62. However, there is a difference in the operation of the image processing device 30 between the embodiments 6-1 and 6-2.

In the embodiment 6-2, when an object-existing region is detected in a given slice image $IMG_i$, the same region in a different slice image $IMG_j$ (j≠i) that overlaps the object-existing region thus detected is determined to be a no-object-existing region.

Figure 69A:
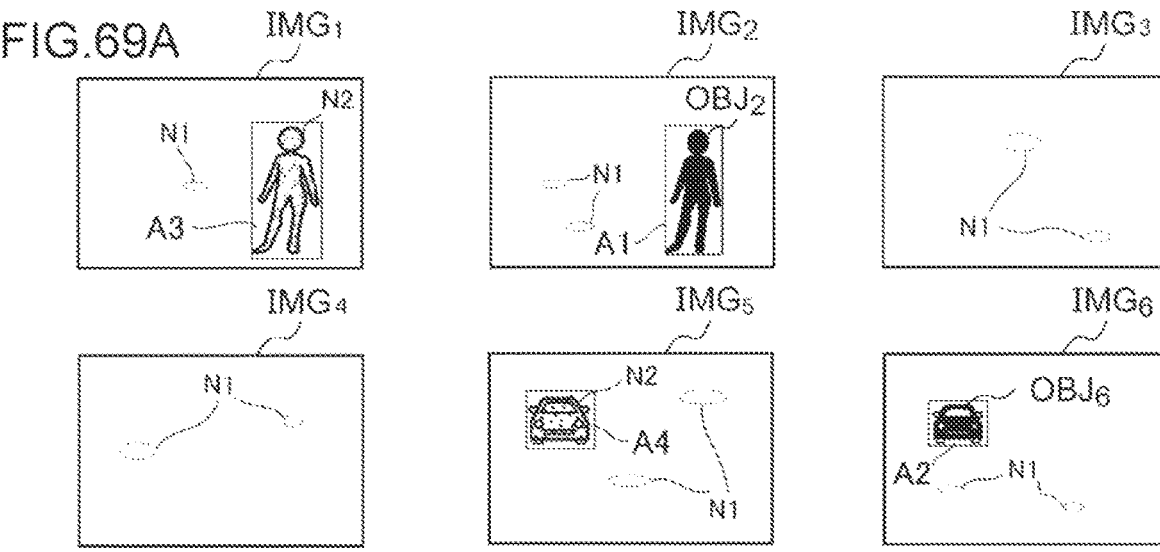
FIGS. 69A through 69C are diagrams for explaining image combination processing according to an embodiment 6-2.
Figure 69B:
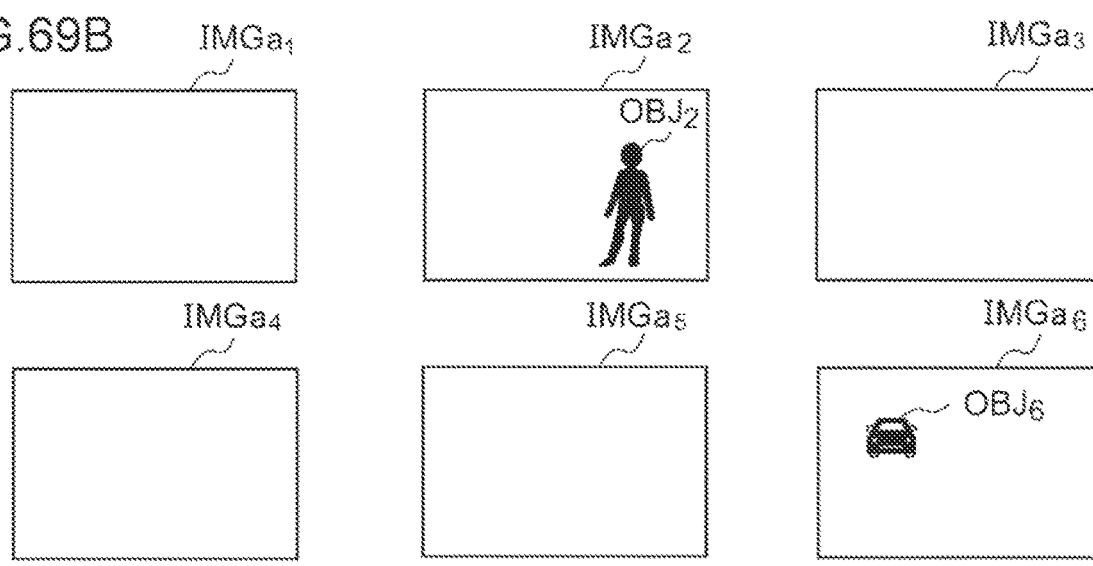
Figure 69C:
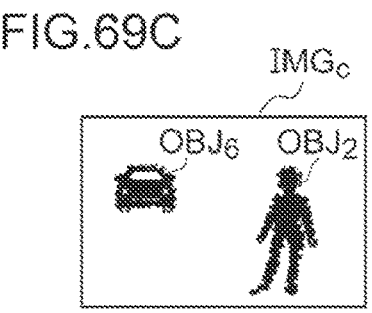

FIGS. 69A through 69C are diagrams for explaining combining processing according to the embodiment 6-2. FIG. 69A is the same as FIG. 68A. Referring to the slice image $IMG_1$ shown in FIG. 69A, a strong edge is detected for the noise N2. However, an object-existing region A1 is detected in a different slice image $IMG_2$. Accordingly, correct judgement can be made for the slice image $IMG_1$ that the region thereof including the noise N2 that overlaps the object-existing region A1 is a no-object-existing region. Also, in the same manner, correct judgment can be made for the slice image $IMG_5$ that the region thereof including the noise N2 is a no-object-existing region.

As a result, as shown in FIG. 69B, the effects of the noise N2 are removed from each of the slice images $IMG_1$ and $IMG_5$ thus subjected to the noise correction. As shown in FIG. 69C, this allows the combined image IMGc to be acquired with high image quality.

In the embodiment 6-1, the slice images are each processed independently so as to judge the object-existing regions and the no-object-existing regions. In contrast, in the embodiment 6-2, the object-existing regions and the no-object-existing regions are judged with reference to the multiple slice images, i.e., based on the relation between the multiple slice images. This arrangement is capable of preventing false judgement. In particular, the gating camera has a characteristic of detecting only the reflected light from an object at the nearest distance. Accordingly, it is not possible for two (or three or more) slice images to include the same image of an object at the same pixel position or in the same region. In the embodiment 6-2, with such an arrangement using this feature, the noise and the object can be distinguished in a sure manner.

It should be noted that, when two slice images have an overlapping object-existing region detected at the same time, the object-existing region including larger pixel values may be extracted as a correct object-existing region from among the two slice images. On the other hand, the object-existing region detected in the other slice images may be judged to be a no-object existing region.

Embodiment 6-3

Description has been made in the embodiments 6-1 and 6-2 regarding an arrangement in which, after the object-existing regions and the no-object-existing regions are judged, the noise removal processing is executed. However, the present invention is not restricted to such an arrangement. Also, such processing may be executed for each pixel.

That is to say, the pixel values at the same pixel position are compared for all the slice images $IMG_1$ through $IMG_N$. Furthermore, the pixel having the largest pixel value from among the slice images $IMG_1$ through $IMG_N$ is judged to be an effective pixel. The other pixels are each judged to be noise pixels. The pixel values of the noise pixels are each set to zero, or are each multiplied by a coefficient that is smaller than 1 so as to reduce the pixel value. After this processing is executed for all the pixels, the multiple slice images $IMG_1$ through $IMG_N$ may be combined.

Usage

Figure 70:
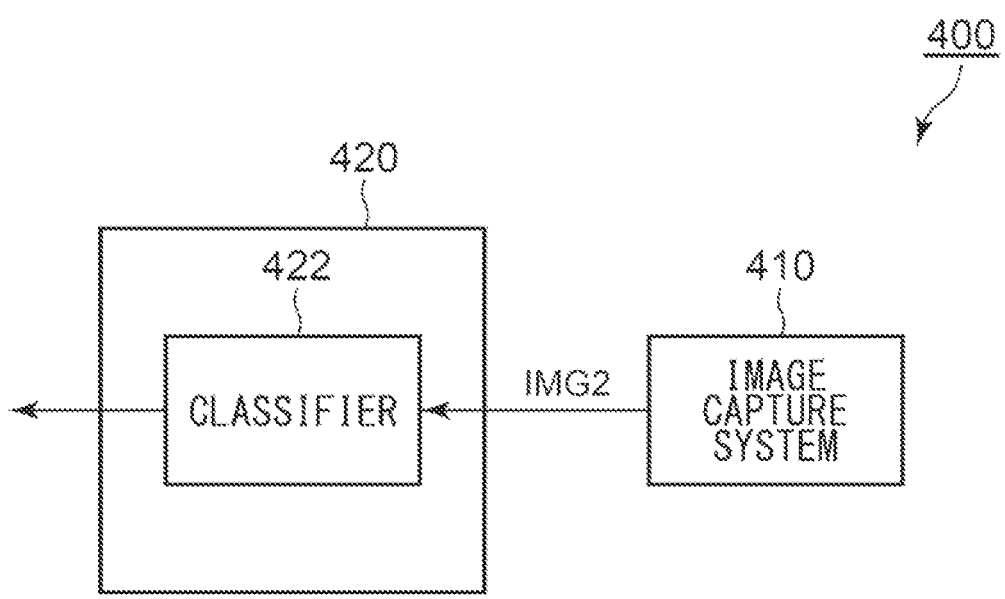
FIG. 70 is a block diagram showing an object identification system provided with an image capture apparatus.

FIG. 70 is a block diagram showing an object identification system 400 provided with an image capture apparatus. The image identification system 400 includes an image capture apparatus 410 and a processing device 420. The image capture apparatus 410 corresponds to the image capture apparatus 10 described in the embodiments 6-1 and 6-2. The image capture apparatus 410 generates a combined image IMGc.

The processing device 420 is configured to be capable of identifying the position and the kind (category, class) of an object based on the combined image IMGc. The processing device 420 may include a classifier 422. The processing device 420 may be configured as a combination of a processor (hardware component) such as a Central Processing Unit (CPU), Micro Processing Unit (MPU), microcontroller, or the like, and a software program to be executed by the processor (hardware component) such as a microcontroller. Also, the processing device 420 may be configured as a combination of multiple processors. Alternatively, the processing device 420 may be configured as a hardware component alone.

The classifier 422 may be implemented based on a prediction model generated by machine learning. The classifier 422 judges the kind (category or class) of an object included in an input image. The algorithm employed by the classifier 422 is not restricted in particular. Examples of the algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed. The processing device 420 and the image processing apparatus 30 of the image capture apparatus 410 may be implemented on the same processor or the same FPGA.

Also, the output of the object identification system 400 may be used for the light distribution control of the automotive lamp, Also, the output of the object identification system 400 may be transmitted to the in-vehicle ECU so as to support autonomous driving control.

Figure 71:
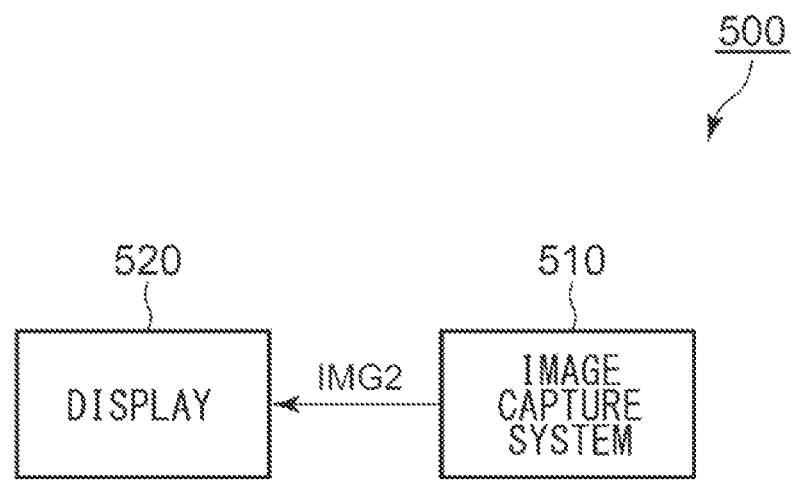
FIG. 71 is a block diagram showing a display system provided with an image capture apparatus.

FIG. 71 is a block diagram showing a display system 500 provided with an image capture apparatus. The display system 500 includes an image capture apparatus 510 and a display 520. The image capture apparatus 510 corresponds to the image capture apparatus 10 described in the embodiments 6-1 and 6-2. The image capture apparatus 510 generates a combined image IMGc with improved image quality. The display 520 displays the combined image IMGc. The display system 500 may be configured as a digital mirror. Also, the display system 500 may be configured as a front view monitor or a rear view monitor that covers a blind spot.

Figure 72:
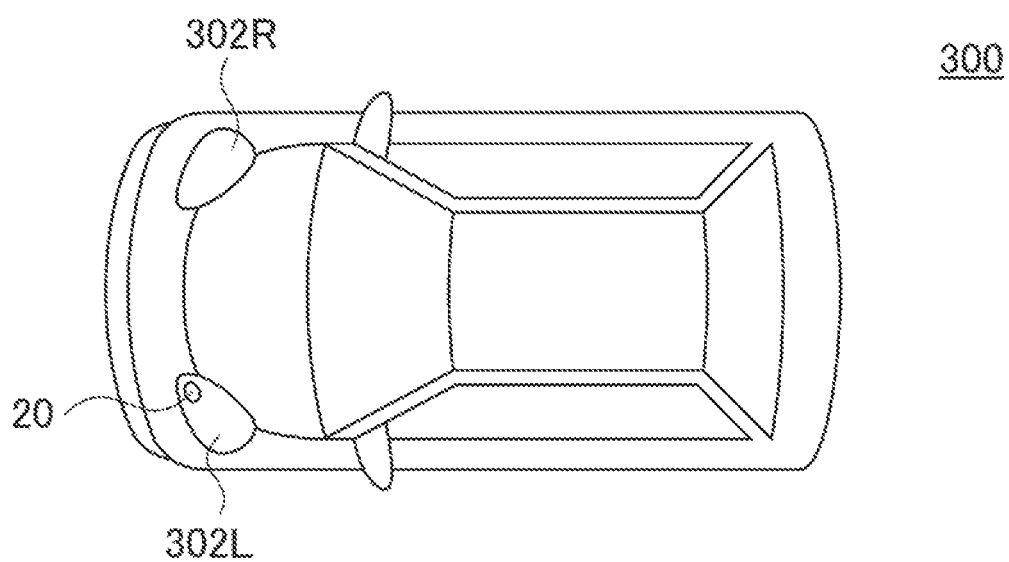
FIG. 72 is a diagram showing an automobile provided with an object identification system.

FIG. 72 is a block diagram showing an automobile 300 provided with the object identification system 400. The automobile 300 is provided with headlamps 302L and 302R. All or part of the components of the object identification system 400 are built into at least one from among the headlamps 302L and 302R. Each headlamp 302 is positioned at a frontmost end of the vehicle body, which is most advantageous as a position where the gating camera 20 is to be installed for detecting an object in the vicinity.

Figure 73:
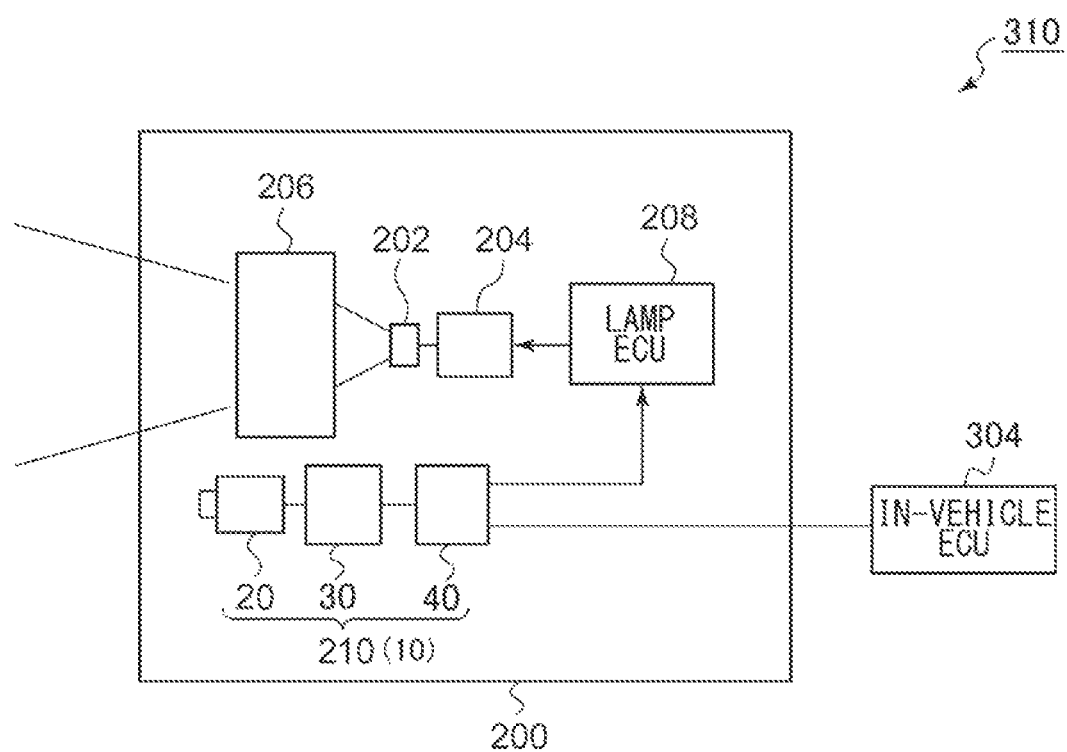
FIG. 73 is a block diagram showing an automotive lamp provided with an object detection system.

FIG. 73 is a block diagram showing the automotive lamp 200 provided with the object detection system 210. The automotive lamp 200 forms the lamp system 310 together with the in-vehicle ECU 304. The automotive lamp 200 includes a light source 202, a lighting circuit 204, and an optical system 206. Furthermore, the automotive lamp 200 is provided with the object detection system 210. The object detection system 210 corresponds to the object identification system 400 described above. The object detection system 210 includes the gating camera 20, the image processing device 30, and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted. The function of the processing device 40 for supporting the object detection may be implemented on the in-vehicle ECU 304.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

Clauses Describing Features of the Disclosure

Clause 18. An object identification system comprising:
a gating camera structured to divide a field of view in a depth direction into a plurality of ranges, and to capture an image for each range while changing a time difference between light emission and exposure, so as to generate a plurality of slice images that correspond to the plurality of ranges; and
a processing device structured to have a plurality of first correction characteristics defined corresponding to the plurality of ranges, to correct each of the plurality of slice images using the corresponding first correction characteristics, and to judge a kind of an object based on the plurality of slice images thus corrected.

Clause 19. The object identification system according to Clause 18, wherein the first correction characteristics that correspond to each range are changed according to a measurement environment.

Clause 20. The object identification system according to Clause 18, wherein the processing device holds a plurality of second correction characteristics defined corresponding to the plurality of ranges,
and wherein the processing device corrects each of the plurality of slice images using the corresponding second correction characteristics, and combines the plurality of slice images thus corrected.

Clause 21. The object identification system according to Clause 20, wherein an image obtained by combining the plurality of corrected slice images is displayed on a display.

Clause 22. An automobile comprising the object identification system according to Clause 18.

Clause 23. An automotive lamp comprising the object identification system according to Clause 18.

Clause 24. A processing device to be used so as to form an object identification system together with a gating camera structured to divide a field of view in a depth direction into a plurality of ranges, and to capture an image for each range while changing a time difference between light emission and exposure, so as to generate a plurality of slice images that correspond to the plurality of ranges, the processing device comprising:
a first correction unit structured to have a plurality of first correction characteristics defined corresponding to the plurality of ranges, and to correct each of the plurality of slice images using the corresponding first correction characteristics; and
a classifier structured to judge a kind of an object based on the plurality of corrected slice images.

Clause 25. The processing device according to Clause 24, further comprising:
a second correction unit structured to have a plurality of second correction characteristics defined corresponding to the plurality of ranges, and to correct each of the plurality of slice images using the corresponding second correction characteristics; and
a combining unit structured to combine the plurality of slice images corrected by the second correction unit so as to generate an image to be displayed on a display.

Clause 26. An image display system comprising a gating camera structured to divide a field of view in a depth direction into a plurality of ranges, and to capture an image for each range while changing a time difference between light emission and exposure, so as to generate a plurality of slice images that correspond to the plurality of ranges; and a processing device structured to combine the plurality of slice images so as to generate a combined image to be displayed on a display.

Clause 27. The image display system according to Clause 26, wherein the processing device is structured to have a plurality of correction characteristics defined corresponding to the plurality of ranges, to correct each of the plurality of slice images using the corresponding correction characteristics, and to combine the plurality of corrected slice images.

Clause 28. The image display system according to Clause 27, wherein the correction characteristics that correspond to each range are changed according to a measurement environment.

Clause 29. An automobile comprising the image display system according to Clause 26.

Clause 30. A processing device to be used so as to form an image display system together with a gating camera structured to divide a field of view in a depth direction into a plurality of ranges, and to capture an image for each range while changing a time difference between light emission and exposure, so as to generate a plurality of slice images that correspond to the plurality of ranges, the processing device comprising:

a combining unit structured to combine the plurality of slice images so as to generate an image to be displayed on a display.

Clause 31. The processing device according to Clause 30, further comprising a correction unit structured to have a plurality of correction characteristics defined corresponding to the plurality of ranges, and to correct each of the plurality of slice images using the corresponding correction characteristics, wherein the combining unit is structured to combine the plurality of slice images corrected by the correction unit.

Clause 32. A gating camera structured to divide a field of view in a depth direction into a plurality of ranges, and to generate a plurality of slice images that correspond to the plurality of ranges, the gating camera comprising:

an illumination apparatus structured to emit probe light according to a light emission timing signal;

an image sensor structured to capture an image of reflected light according to an image capture timing signal; and a controller structured to generate the light emission timing signal and the image capture timing signal with a time difference defined for each range, wherein, in a testing process, the gating camera is structured to be capable of applying an offset to the time difference between the light emission timing signal and the image capture timing signal.

Clause 33. The gating camera according to Clause 32, structured to allow an external delay unit to be connected on a path of the light emission timing signal.

Clause 34. The gating camera according to Clause 32, further comprising a delay unit to be inserted on a signal path of the light emission timing signal in a testing process.

Clause 35. The gating camera according to Clause 32, structured to allow an external delay unit to be connected on a signal path of the image capture timing signal.

Clause 36. The gating camera according to Clause 32, further comprising a delay unit to be inserted on a signal path of the image capture timing signal.

Clause 37. A gating camera structured to divide a field of view in a depth direction into a plurality of ranges, and to generate a plurality of slice images that correspond to the plurality of ranges, the gating camera comprising:

an illumination apparatus structured to emit probe light according to a light emission timing signal;

an image sensor structured to capture an image of reflected light according to an image capture timing signal; and a controller structured to generate the light emission timing signal and the image capture timing signal with a time difference defined for each range, wherein, in a testing process, the gating camera is structured to be capable of outputting the light emission timing signal to an external reference light source via an external delay unit.

Clause 38. A gating camera structured to divide a field of view in a depth direction into a plurality of ranges, and to generate a plurality of slice images that correspond to the plurality of ranges, the gating camera comprising:

an illumination apparatus structured to emit probe light according to a light emission timing signal;

an image sensor structured to capture an image of reflected light according to an image capture timing signal; and a controller structured to generate the light emission timing signal and the image capture timing signal with a time difference defined for each range, wherein, in a testing process, the gating camera is structured to be capable of outputting the image capture timing signal to an external image sensor via an external delay unit.

Clause 39. A testing method for a gating camera structured to divide a field of view in a depth direction into a plurality of ranges, and to generate a plurality of slice images that correspond to the plurality of ranges, wherein the gating camera comprises:

an illumination apparatus structured to emit probe light according to a light emission timing signal;

an image sensor structured to capture an image of reflected light according to an image capture timing signal; and a controller structured to generate the light emission timing signal and the image capture timing signal with a time difference defined for each range, and wherein the testing method comprises:

arranging a reflector in the i-th (i represents an integer) range;

operating the controller in a state in which an image of the j-th (j>i) range can be captured; and apply a predetermined delay to the light emission timing signal.

40. A testing method for a gating camera structured to divide a field of view in a depth direction into a plurality of ranges, and to generate a plurality of slice images that correspond to the plurality of ranges, wherein the gating camera comprises:

an illumination apparatus structured to emit probe light according to a light emission timing signal;

an image sensor structured to capture an image of reflected light according to an image capture timing signal; and a controller structured to generate the light emission timing signal and the image capture timing signal with a time difference defined for each range, and wherein the testing method comprises:
arranging a reflector in the j-th (j represents an integer) range;
operating the controller in a state in which an image of the i-th (I<j) range can be captured; and
apply a predetermined delay to the image capture timing signal.

Clause 41. An image capture apparatus comprising:
a gating camera structured to divide a field of view in a depth direction into a plurality of ranges, to capture an image for each range while changing a time difference between light emission and exposure, and to generate a plurality of slice images that correspond to the plurality of ranges; and
an image processing device structured to combine the plurality of slice images so as to generate a combined image,
wherein the image processing device is structured to detect a no-object-existing region in which no object exists for each of the plurality of slice images, to apply noise reduction processing to the no-object-existing region, and to combine the plurality of slice images thus subjected to the noise reduction processing.

Clause 42. The image capture apparatus according to Clause 41, wherein, when the image processing device detects an object-existing region in which an object exists in a given slice image, the image processing device judges that a region in a different slice image that overlaps the object-existing region thus detected is a no-object-existing region.

Clause 43. The image capture apparatus according to Clause 41, structured to set pixel values of a plurality of pixels included in the no-object-existing region to zero.

Clause 44. The image capture apparatus according to Clause 41, wherein, when a plurality of pixels having pixel values that are larger than a threshold value consecutively exist, the image processing device judges a region including these pixels to be a region in which an object exists.

Clause 45. An automobile comprising:
the image capture apparatus according to Clause 41;
and a classifier structured to judge a king of an object included in a combined image generated by the image capture apparatus based on the combined image.

Clause 46. An automobile comprising:
the image capture apparatus according to Clause 41;
and a display apparatus structured to display a combined image generated by the image capture apparatus.

Clause 47. An image processing device structured to execute:
processing for detecting a no-object-existing region in which no object exists for each of a plurality of slice images captured by a gating camera;
processing for noise reduction in the no-object-existing region; and
processing for combining the plurality of slice images thus subjected to noise reduction.

Clause 48. The image processing device according to Clause 47, wherein, when the image processing device detects an object-existing region in which an object exists in a given slice image, the image processing device judges that a region in a different slice image that overlaps the object-existing region thus detected is a no-object-existing region.

What is claimed is:

1. A gating camera structured to divide a field of view in a depth direction into a plurality of ranges, and to generate a plurality of slice images that correspond to the plurality of ranges, the gating camera comprising:
an illumination apparatus configured to emit probe light;
a first image sensor;
a second image sensor; and
a controller configured to control a timing of emission of the probe light by the illumination apparatus and a timing of image capture by the first image sensor and the second image sensor,
wherein the controller is configured to control the first image sensor and the second image sensor such that the first image sensor and the second image sensor receive reflected light from different respective ranges corresponding to one emission of the probe light from the illumination apparatus, and
wherein the controller further is configured to:
assign odd-numbered ranges of the plurality of ranges to the first image sensor such that the first image sensor receives reflected light from the odd-numbered ranges; and
assign even-numbered ranges of the plurality of ranges to the second image sensor such that the second image sensor receives reflected light from the even-numbered ranges.

2. The gating camera according to claim 1, wherein the first image sensor is assigned to a range
that is closer to the gating camera than is a range to which the second image sensor is assigned.

3. The gating camera according to claim 2, wherein the first image sensor is configured to have an angle of view that is larger than that of the second image sensor.

4. The gating camera according to claim 1, to be mounted on a vehicle.

5. The gating camera according to claim 4, wherein the first image sensor is mounted on a right-side lamp, and the second image sensor is mounted on a left-side lamp.

6. An automobile comprising:
the gating camera according to claim 1; and
at least one processor configured to process the plurality of slice images captured by the gating camera.

7. An automotive lamp comprising the gating camera according to claim 1.

* * * * *